(12) United States Patent
Venkatesan et al.

(10) Patent No.: US 10,976,496 B2
(45) Date of Patent: Apr. 13, 2021

(54) DUAL CORE WAVEGUIDE

(71) Applicant: POET Technologies, Inc., San Jose, CA (US)

(72) Inventors: Suresh Venkatesan, Los Gatos, CA (US); Miroslaw Florjanczyk, Kanata (CA); Trevor Hall, Ottawa (CA); Peng Liu, Kanata (CA); Jing Yang, Singapore (SG)

(73) Assignee: POET Technologies, Inc., San Jose, CA (US)

( * ) Notice: Subject to any disclaimer, the term of this patent is extended or adjusted under 35 U.S.C. 154(b) by 0 days.

(21) Appl. No.: 16/532,770

(22) Filed: Aug. 6, 2019

(65) Prior Publication Data

US 2020/0257053 A1  Aug. 13, 2020

Related U.S. Application Data

(60) Provisional application No. 62/803,805, filed on Feb. 11, 2019.

(51) Int. Cl.
 *G02B 6/30* (2006.01)
 *G02B 6/12* (2006.01)

(52) U.S. Cl.
 CPC ............. *G02B 6/305* (2013.01); *G02B 6/30* (2013.01); *G02B 6/12016* (2013.01)

(58) Field of Classification Search
 None
 See application file for complete search history.

(56) References Cited

U.S. PATENT DOCUMENTS

| | | | | |
|---|---|---|---|---|
| 6,253,015 B1* | 6/2001 | Ukrainczyk | ........... | B82Y 20/00 385/129 |
| 6,922,508 B2* | 7/2005 | Glebov | .................... | G02F 1/31 385/43 |
| 2004/0105644 A1* | 6/2004 | Dawes | .................. | G02B 6/122 385/129 |
| 2004/0202429 A1* | 10/2004 | Margalit | ................ | B82Y 20/00 385/49 |
| 2010/0040327 A1* | 2/2010 | Deki | .................... | G02B 6/1228 385/28 |
| 2011/0235968 A1* | 9/2011 | Na | ........................... | G02B 6/26 385/28 |
| 2015/0117818 A1* | 4/2015 | Matsumoto | ............ | G02B 6/305 385/43 |
| 2016/0085026 A1* | 3/2016 | Yamasaki | ............ | G02B 6/1228 385/43 |
| 2019/0271810 A1* | 9/2019 | Ring | ...................... | G02B 6/132 |

FOREIGN PATENT DOCUMENTS

| | | | |
|---|---|---|---|
| JP | 55-2262 A | * | 1/1980 |
| JP | 63-94205 A | * | 4/1988 |
| JP | 2015-191110 A | * | 11/2015 |

* cited by examiner

*Primary Examiner* — Michael Stahl
(74) *Attorney, Agent, or Firm* — Tue Nguyen

(57) ABSTRACT

The invention described herein pertains to the structure and formation of dual core waveguide structures and to the formation of optical devices including spot size converters from these dual core waveguide structure for the receiving and routing of optical signals on substrates, interposers, and sub-mount assemblies.

20 Claims, 22 Drawing Sheets

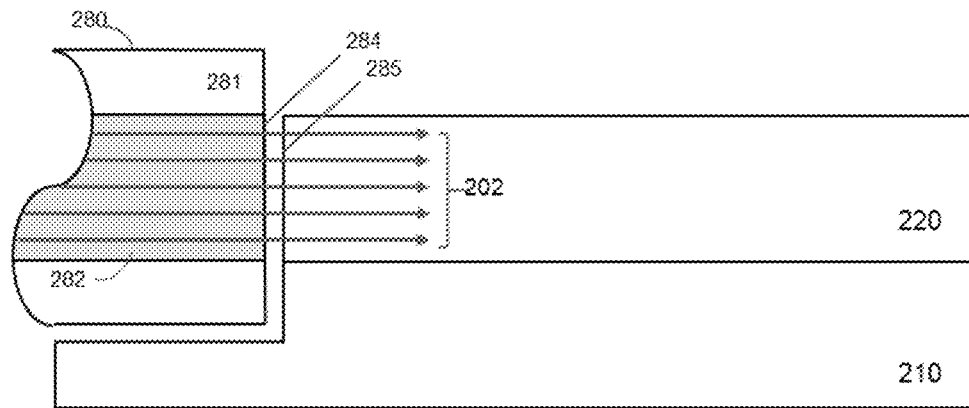
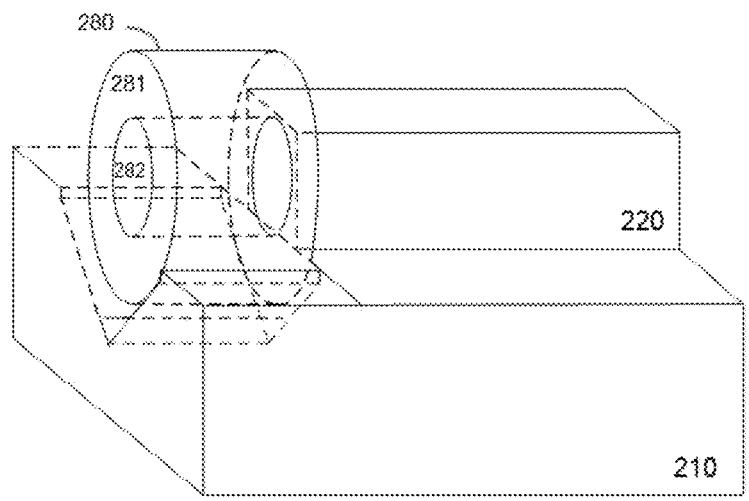
Figure 2

(e)

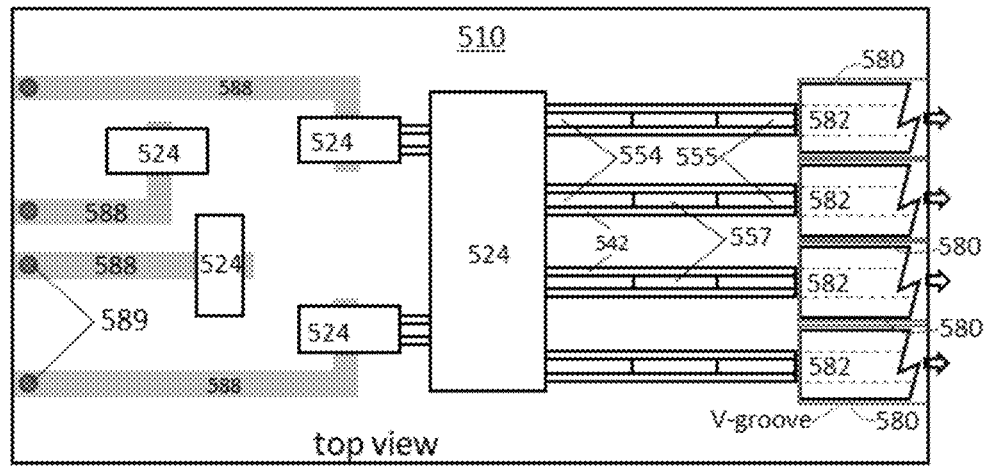
(c) Top View of PIC
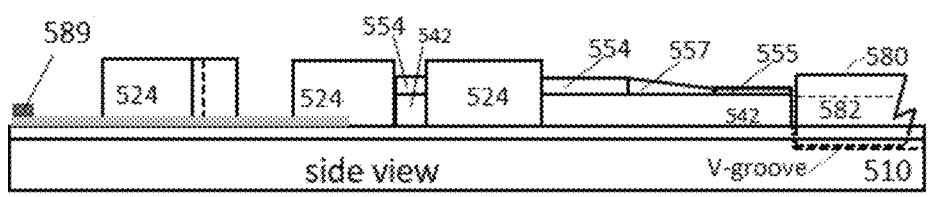
(d) Side view of PIC
Figure 5 (continued)

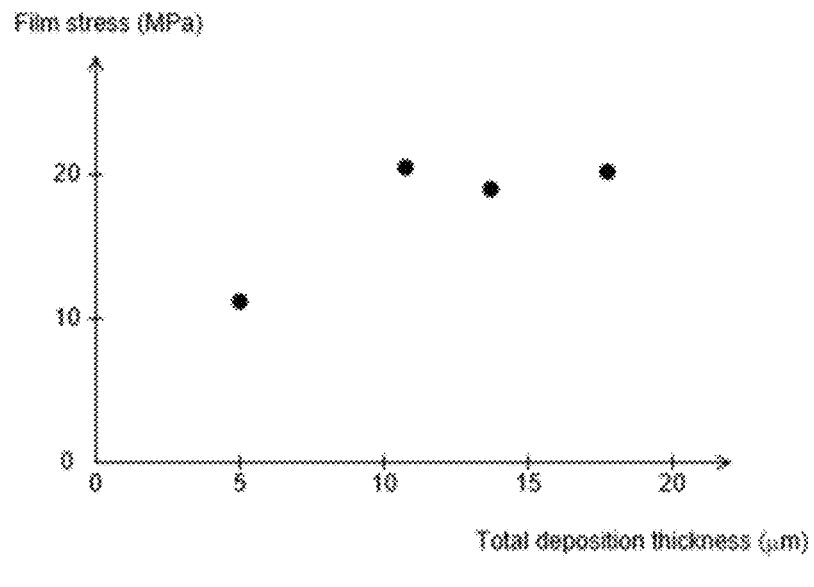
(a)
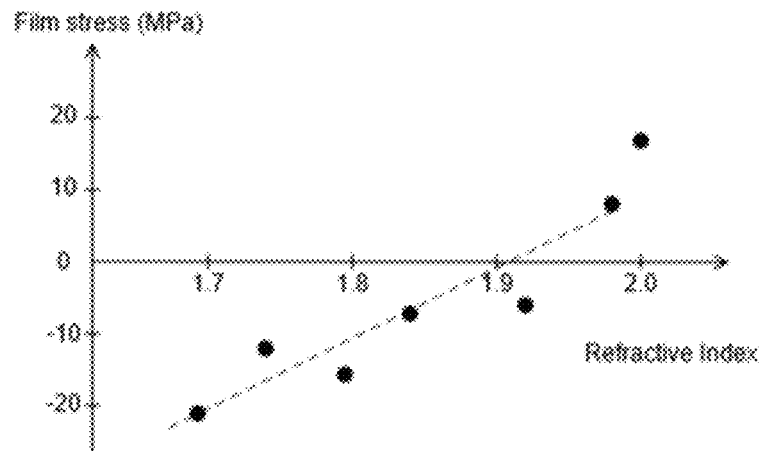
(b)
Figure 12

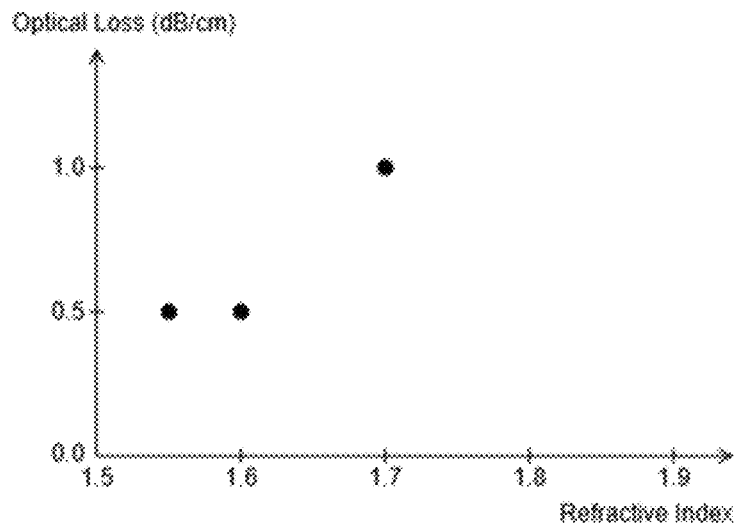
(a)
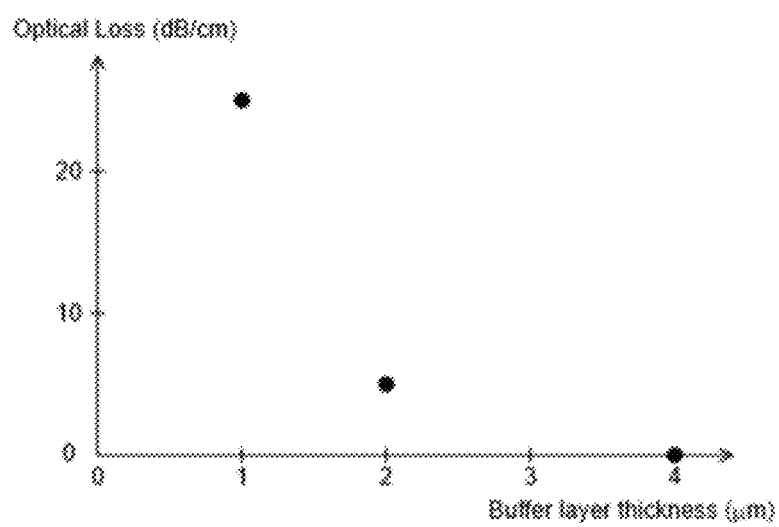
(b)
Figure 13

Forming a stack of SiON dielectric films at low temperature having low stress and low optical loss   1493

(a)

Forming a stack of SiON dielectric films with each film having low stress and low optical loss   1495

(b)

Forming a stack of SiON dielectric films with low stress and low optical loss on a substrate, including an optional buffer layer, one or more optional bottom spacer layers, a lower waveguide core comprised of a repeating stack of one or more dielectric layers, an optional spacer layer, an upper waveguide core comprised of a repeating stack of one or more dielectric layers, and an optional top layer   1497

Patterning the stack to form a waveguide, a spot size converter, or other optical device   1499

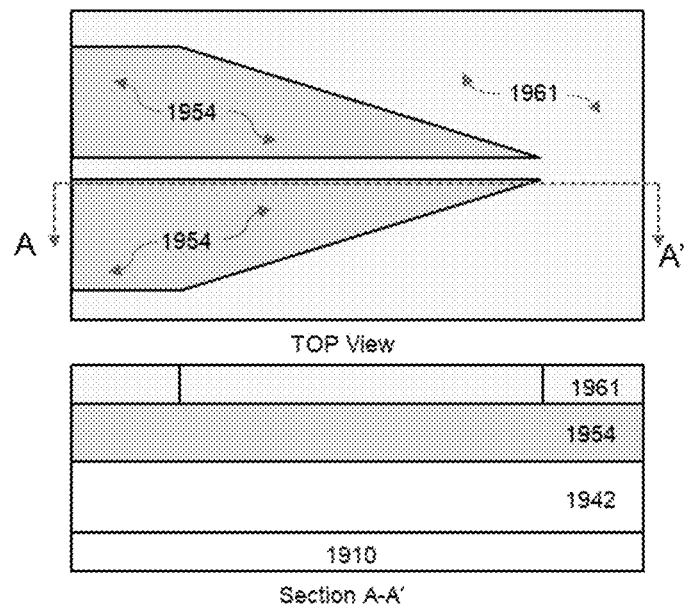
(a) Pre-etch
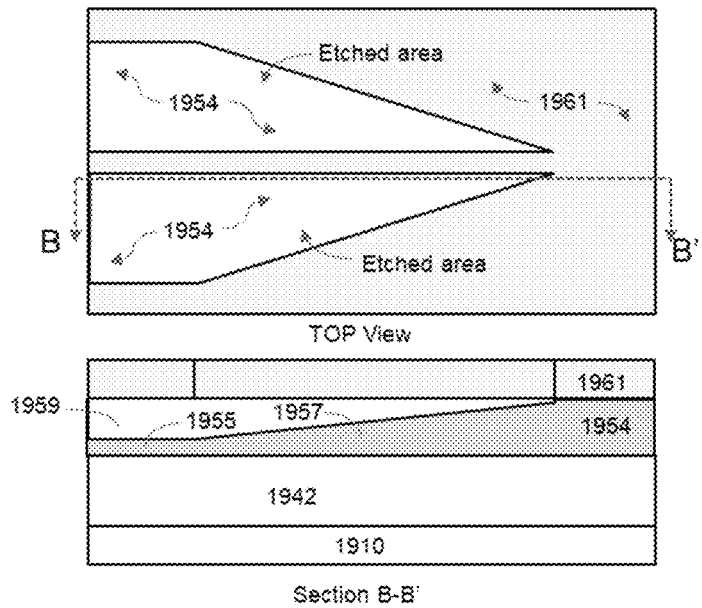
(b) Post-etch
Figure 19

DUAL CORE WAVEGUIDE

The present patent application claims priority from U.S. Provisional application 62/803,805, and is related to U.S. Provisional application 62/621,659 and U.S. Non-Provisional application Ser. No. 16/036,151, 16/036,179, 16/036,208, and 16/036,234, all of which are herein incorporated by reference in their entirety.

FIELD OF THE INVENTION

The present invention relates to optoelectronic communication systems, and more particularly to a method for interfacing optoelectronic circuits with optical fibers and optical devices.

BACKGROUND

In Photonic Integrated Circuits (PICs), various types and quantities of optical, electronic, optoelectronic, and electrical functionalities are commonly combined on a substrate, an interposer or a submount assembly. Interposers are used in the fabrication of optical and electronic devices as a platform upon which discrete circuit elements are combined to perform a specific function or set of functions. In optical assemblies, for example, a set of components such as a sending device, a receiving device, and a waveguide device are combined to create a transceiver. In this example, a laser (sending device), a photodetector (receiving device), and an arrayed waveguide (waveguide) are combined on a substrate. The substrate, or platform upon which the devices are combined, is often referred to as an interposer or a sub-mount, and the combination of the interposer with the components is often referred to as a sub-mount assembly. The sub-mount assembly is a platform for assembling and interconnecting discrete devices such as lasers, photodetectors, and other devices such as waveguides into a functional product. Similar subassemblies have been used in industrial applications in electronics that include integrated circuits, photonic integrated circuits, sensors, biomedical devices, among others.

Optical fibers are typically used to deliver optical signals that carry information to the sub-mount assemblies for processing. Optical fibers are also used to receive processed signals from the devices mounted on the submount assembly for long and short range transmission to other devices, network elements, or points of use, for example. Single mode fibers (SMFs), for example, can be attached to the sub-mount assemblies and aligned with optical devices that are mounted on the substrate. The SMFs have a core diameter that is typically on the order of 10 microns. Waveguides, when implemented on the sub-mount assembly, however, can be considerably smaller in cross section. The significant difference in size between the mounted optical fibers that interface with the sub-mount assembly and the waveguides or optical devices that receive the signals on the sub-mount assembly impose strict alignment and focusing requirements on the interface between the optical fiber and the receiving structure on the substrate. The strict alignment requirements can necessitate costly polishing of the incoming fiber terminations. Additionally, lenses are often required between the mounted fibers and the receiving waveguide to reduce the spot size of the incoming signal to the dimensions of the receiving waveguide. Material choices for cases in which the receiving device is a waveguide, or more particularly, a planar waveguide, include, for example, dielectric materials such as silicon oxide, silicon nitride, and silicon oxynitride, polymers, and semiconductors such as indium phosphide. In some instances, planar waveguides are formed directly on a substrate as in the case of a polymer or dielectric layer, for example, and in other instances, hybrid structures are formed in which discrete waveguide devices or components are mounted on a substrate, interposer, or sub-mount assembly.

In addition to the use of optical fibers for delivering optical signals to, and receiving optical signals from, the sub-mount assembly, optoelectrical and optical devices on the sub-mount assembly can also be aligned with optical devices mounted on, or in proximity to, the sub-mount assembly or interposer. In instances in which optoelectrical and optical devices are used to deliver or receive optical signals to or from a sub-mount assembly or interposer, the relaxed alignment tolerances available with integrated planar waveguides provide a desirable benefit in terms of ease of manufacturing. Much of the expense associated with the implementation and manufacturing of photonic integrated circuits is generally attributed to packaging. And coupling to the fiber is one of the most critical and cost intensive operations. Techniques that can be used to reduce alignment costs, or that reduce the complexity of the alignment operation are advantageous to furthering the state of the art and the wider acceptance in the market for packaged optoelectronic devices. Ideally, techniques are developed that provide for passive alignment of devices and components in the optical circuits.

Thus, there is a need in the art for a waveguide structure that can receive signals from optical fibers and optoelectrical devices without the need for strict alignment tolerances or lenses.

SUMMARY

The present invention discloses a thick, planar, dual core waveguide structure from which an optical spot size converter is fabricated. The thick dual core waveguide structure is formed on a substrate, in embodiments, from a stack of silicon oxynitride films that exhibit low stress and low optical signal loss. Optical spot size converters fabricated from these thick stacks of silicon nitride films provide a means for the coupling of optical signals to and from optical fibers and optoelectronic devices to photonic integrated circuits (PICs).

The dual core waveguide structures enabled by the thick stacked structure of silicon oxynitride films can provide direct and near-direct optical signal coupling to optical fibers via a lower core that is substantially thickness-matched to the core diameter of proximally positioned optical fibers, and a thinner upper core that facilitates single mode propagation for low loss signal processing.

For the thick lower core, coupling of optical signals to a PIC from optical fibers is achievable without unduly stringent alignment requirements and without the need for the lenses that are typically required to focus the incoming and outgoing optical signals in systems for which the optical fibers and the receiving or sending waveguides are not thickness matched. A limitation of the thickness matched lower waveguide core, for thicknesses typical of single mode optical fibers on the order of 8-10 microns, for example, is the potential for the signal to propagate in undesirable propagation modes for which signal losses can be significant. Thick waveguide cores can be susceptible to multiple optical propagation modes, particularly in thick planar waveguides, and more particularly in thick planar waveguides with curvature, and as such are susceptible to high levels of signal loss. To overcome the potential for incoming signal loss, and to overcome the potential for propagation in undesirable modes, incoming signals are transferred from an optical fiber to the thick bottom core, and then to a thinner upper core designed for single mode propagation of the transferred optical signals. The stable, single mode propagation in waveguides such as that of the upper core is preferable for processing of the encoded optical signals in the PICs.

In embodiments, incoming optical signals that are transferred from the optical fibers to the thick bottom core of the dual core waveguide, are subsequently directed from the thick bottom core, through a tapered section, to the upper core of the dual core waveguide. The index of refraction of the thinner upper core is higher than that of the lower core to facilitate the transition of the signal from the thick bottom core to the thinner upper core effectively reducing the spot size of the incoming signals and providing a single, stable propagation mode in the upper core. In embodiments, the thickness of the upper core, in the direction of the optical signal propagation, is gradually increased to facilitate transfer of the signal from the lower core to the upper core. In transitioning from the thick lower core to the thinner upper core with a higher index of refraction, the spot size of the optical signal is reduced to allow stable single mode propagation as required by the PIC.

In some embodiments, the same or a similar structure is used to expand the spot size through a tapered section for which the thickness of the thinner upper core of the dual core waveguide is reduced along the optical propagation path. The reduction in thickness of the upper core through the tapered section facilitates transfer of outgoing optical signals from the thin upper core into the thick bottom core, and subsequently to optical fibers.

Using an exemplary fabrication process as described herein, the thick dual waveguide structures comprised of the thick lower core and the thinner upper core can be formed that provide low stress and low optical signal propagation loss, and enable the formation of the spot size converter structure, also described herein. Patterning methods commonly used in the art are used in embodiments to form precision dimensional tolerances and to form the tapered section that facilitates the transition of the optical signals from the thick bottom core to the thinner upper core.

The thickness of the upper single mode waveguide of the dual core waveguide, in embodiments, affects the extent of the coupling of the optical signals between the upper and lower waveguides. For upper waveguide thicknesses of approximately 0.5 microns, optical signals are primarily carried in the lower waveguide core, but can be loosely coupled to the thin upper core. An increase in the thickness of the upper waveguide core to thicknesses of approximately 1-3 microns, for example, with the introduction of a tapered upper waveguide section, enables transitioning of the optical signals to the upper waveguide core, and enables single mode propagation in the upper core substantially independent of the propagation in the lower core.

In embodiments, the upper waveguide core is increased in thickness through tapered portions of the optical device circuit to provide the required thickness in the upper core of the dual core waveguides. These regions of increased thickness in the upper core of the dual waveguide structure allow for more reliable processing of the optical signals for such tasks as multiplexing and demultiplexing, among others, particularly in optical waveguide structures containing bends and curvature. Curvature in the optical waveguides is necessary for, and allows for, the creation of optical device structures such as arrayed waveguides that facilitate optical signal processing.

The tapering of the waveguides in the vertical direction, hereafter referred to as vertical tapering, provides one approach for the formation of an adiabatic transition region for moving the signal from the thick bottom core to the thinner upper core of the dual core waveguide structure. In other embodiments, lateral tapering, or tapering in the horizontal direction perpendicular to the receiving facet of the thick lower waveguide core is used in addition to the vertical tapering of the upper core. Additionally, the vertical tapering can vary linearly, nearly linearly, super-linearly, or sub-linearly with the length of the tapered section to transition the optical signal from the lower core to the upper core of the dual core waveguide.

In embodiments, a receiving portion of the dual core waveguide is fabricated from the combination of a lower waveguide of approximately 8-10 microns in thickness with a thin, upper waveguide core of approximately 0.5 micron in thickness. This receiving section is substantially thickness matched to an incoming optical fiber of approximately 8-10 microns in thickness or to the thickness of an optoelectronic device and receives signals from the optical fibers or optoelectronic devices that are mounted in proximity to a receiving end or facet of the dual core waveguide structure. In these and other embodiments, the receiving portion guides optical signals to a tapered portion through which the optical signals are substantially transitioned to a thick upper core of approximately 1-3 microns of the dual core waveguide.

In other embodiments, outgoing optical signals propagate in the waveguide from the thick portion of the waveguide, through the tapered portion and out the receiving portion to the optical fiber or optoelectronic device. The same or similar device structures can be used in embodiments to receive optical signals from optical fibers or optoelectronic devices, and to deliver optical signals to the optical fibers and optoelectronic devices varying only with the direction of propagation of the optical signals. In embodiments in which the dual core waveguide structure is formed into a spot size converter, optical signals with relatively large cross-sections from optical fibers or optoelectronic device, are reduced in cross section as these signals progress through the transition from the thick receiving and tapered portions to the single mode upper core of the dual core waveguide.

These and other embodiments of the dual core waveguide structure will be made evident within the Detailed Description provided herein.

BRIEF DESCRIPTION OF THE DRAWINGS

FIG. 2. (a) Cross sectional schematic drawing of a thick planar waveguide structure that is matched in thickness to the core of a mounted optical fiber, and (b) three-dimensional perspective drawing of a thick planar waveguide structure that is matched in thickness to the core of a mounted optical fiber;

FIG. 12. Measured film stress in accordance with embodiments for (a) dielectric films deposited at various film thicknesses, and (b) dielectric films of various refractive indexes;

FIG. 13. Measured optical losses in accordance with embodiments for (a) dielectric films of various refractive indexes and (b) dielectric waveguide film structures with various bottom buffer layer film thicknesses;

FIG. 14. Steps for forming some embodiments of the inventive dielectric film structure (a) at low temperature and having low stress and low optical loss, (b) with each dielectric film deposited at low temperature and having low stress and low optical loss, and (c) that include a substrate with a buffer layer, one or more optional bottom spacer layers, a repeating stack of one or more dielectric layers, one or more optional top spacer layers, and an optional top layer, followed by patterning of the stack to form a waveguide;

FIG. 19. Embodiment of a method for forming the tapered portion of the upper waveguide of a dual core waveguide structure: (a) structure shown with mask layer prior to etching of the upper waveguide layer, and (b) after etching of the upper core of the dual core waveguide layer to form the tapered portion using an aspect ratio dependent etch process.

DETAILED DESCRIPTION

Figure 1:
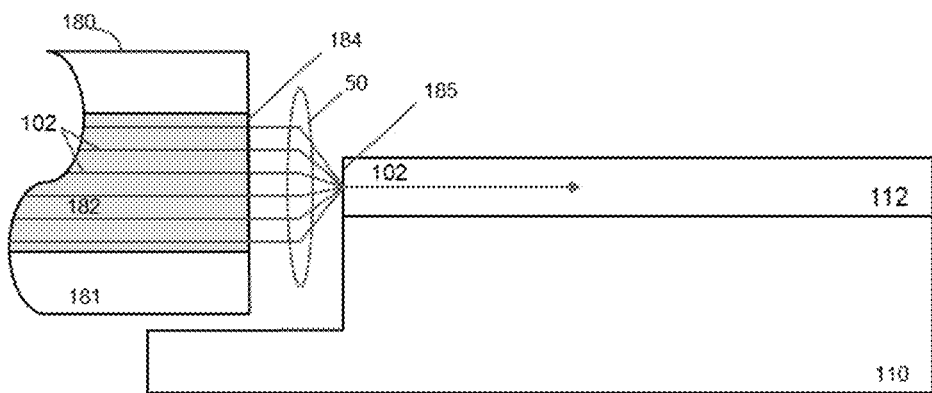
FIG. 1. Cross sectional schematic drawing of a planar waveguide structure with optical lens between a mounted optical fiber and a thin planar waveguide (Prior Art)

The present invention is directed to photonic integrated devices and more particularly to dielectric waveguides and dielectric structures on semiconductor substrates.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. Various changes may be made in the function and arrangement of elements without departing from the spirit and scope as set forth in the appended claims.

A "substrate" as used herein and throughout this disclosure refers to, but is not limited to, a surface upon which planar waveguide structures, semiconductor devices, optical devices, photonic devices, optoelectronic devices, electronic devices, and the like can be deposited, grown, placed or otherwise formed. This may include, but is not limited to silicon, InP, GaAs, silica, a polymer, a ceramic, a metal, a glass, or a combination thereof.

An "optical waveguide", "dielectric waveguide", or "waveguide" as used herein and throughout this disclosure refers to, but is not limited to, a dielectric medium or combination of medium invariant along the direction of propagation, supporting the propagation of optical signals typically within a predetermined wavelength range. An optical waveguide may be at least one of an isolated structure comprising at least a core and, in some applications, a cladding. For example, an optical fiber is a form of a waveguide, typically circular in cross section including, but not limited to flexible optical waveguides formed from extruded glass, extruded doped silica, extruded chalcogenide glasses, and polymer. Additionally, an optical waveguide, a dielectric waveguide, or a waveguide is a planar waveguide, formed on or within a substrate. For example, planar waveguides that support the propagation of optical signals substantially parallel to the plane of a substrate, interposer, or sub-mount assembly and includes, but is not limited to, optical waveguides formed within AlGaAs—GaAs material systems, InGaAsP—InP material systems, ion-exchanged glass, ion-exchanged ferroelectric materials (e.g. proton exchanged LiNbO3), doped ferroelectric materials (e.g. titanium doped lithium niobate), silica-on-insulator, silica-on-silicon, doped silicon, ion implanted silicon, polymer on silicon, silicon oxynitride on silicon, polymer on silicon, Silicon-On-Isolator (SOI) and polymer on polymer.

An "optical fiber" as used herein, and throughout this disclosure refers to a flexible optical waveguide that transmits optical signals over a predetermined wavelength range.

This includes, but is not limited to, step-index optical fibers, graded-index optical fibers, silica optical fibers, chalcogenide glass optical fibers, and polymer optical fibers. Such optical fibers may be multimode fibers that support multiple modes. Such optical fibers may be circular, thereby supporting multiple modes that are at least one of laterally, vertically, and radially symmetric modes, rectangular thereby supporting multiple modes laterally but single mode vertically, rectangular supporting multiple modes laterally with limited modes vertically (e.g. 2-5), as well as waveguides with similar or other cross-sections. Such optical fibers may be discrete, in ribbon format assembled from discrete optical fibers with discrete claddings per optical fiber, in ribbon format with common cladding between optical fibers, optical fibers embedded in a polymer flexible film, and optical fibers attached to a polymer flexible film.

A "waveguide core" as used herein, and throughout this disclosure refers to the signal carrying portion of a waveguide through which a substantial portion of an optical signal propagates. A "dual core waveguide" is a waveguide or waveguide structure, typically a planar waveguide, comprised of two waveguide cores. A "multicore waveguide" is a waveguide or waveguide structure, typically a planar waveguide, comprised of two or more waveguide cores "Silicon oxynitride" as used herein, and throughout this disclosure, refers to materials comprised of stoichiometric and non-stoichiometric combinations of the elements of silicon, oxygen, and nitrogen, and includes silicon oxides and silicon nitrides. "Silicon oxynitride" films may be doped, either intentionally or unintentionally, and may contain desirable and undesirable impurities. Examples of materials that might be intentionally or unintentionally incorporated into silicon oxynitride include hydrogen, phosphorous, boron, sodium, among others. The refractive indices of "Silicon oxynitride" films typically lie within the range of approximately 1.4 to 2.0.

A "multiplexer" (MUX) as used herein, and throughout this disclosure, refers to a device that combines a plurality of source channels and provides a single combined output. This includes, but is not limited to, passive multiplexers, active multiplexers with transmitters and wavelength division multiplexers, active multiplexers with receivers, transmitters and wavelength division multiplexers, unidirectional multiplexers and bidirectional multiplexers.

A "demultiplexer" (DMUX) as used herein, and throughout this disclosure, refers to a device that receives multiple signals from a single input line or channel and routes these signals into multiple output lines or channels. This includes, but is not limited to, passive demultiplexers, active demultiplexers with receivers and wavelength division multiplexers, active demultiplexers with receivers, transmitters and wavelength division multiplexers, and unidirectional demultiplexers.

An "interposer" as used herein and throughout this disclosure refers to, but is not limited to, a substrate that provides mechanical support and electrical or optical interface routing from one or more electrical, optical, and optoelectrical devices to another. Interposers are typically used to route optical or electrical connections from various devices or die that are mounted on, or connected to, the interposer. An "optical interposer" is an interposer that provides for the optical interfacing between optical devices mounted or connected thereon.

A "sub-mount assembly" as used herein and throughout this disclosure refers to, but is not limited to, an assembly that includes a substrate, typically an interposer, that is populated with one or more optical, optoelectrical, and electrical devices.

A "sub-mount or submount" as used herein and throughout this disclosure refers to, but is not limited to, a substrate used in a sub-mount assembly, such as a substrate, an interposer, or any type of mechanical support structure.

A "substrate" as used herein and throughout this disclosure refers to, but is not limited to, a mechanical support upon which an interposer is formed. Substrates may include, but not be limited to, silicon, indium phosphide, gallium arsenide, silicon, silicon oxide-on-silicon, silicon dioxide-on-silicon, silica-on-polymer, glass, a metal, a ceramic, a polymer, or a combination thereof. Substrates may include a semiconductor or other substrate material, and one or more layers of materials such as those used in the formation of an interconnect layer.

"Propagation mode" as used herein and throughout this disclosure refers to, but is not limited to, the characteristic light intensity distribution or field intensity distribution of propagating light, in for example free space or within a waveguide.

The "effective index of refraction", as used herein and throughout this disclosure, refers to the value of the mode effective index of refraction for a composite waveguide consisting of multiple layers.

Referring to FIG. 1 a cross sectional schematic view of a planar waveguide structure on a substrate is shown. In a planar waveguide, optical signals travel in a substantially horizontal direction parallel or substantially parallel to the plane of the substrate surface as shown in the prior art depicted in FIG. 1. One or more optical fibers 180 are typically mounted to the periphery of a substrate 110, interposer, or sub-mount assembly to deliver optical signals 102 to the planar waveguide 112. In many applications, the optical fiber 180 is a single mode fiber of circular cross section with a core diameter of approximately 8-10 microns. In silicon photonic systems, the thickness of planar waveguides 112 is typically on the order of a few microns, and is limited by the buildup of stress. And although not required, the width of the planar waveguide is typically of the same dimension as the thickness, thus creating a square cross-section for the planar waveguide.

In the prior art shown in FIG. 1, a lens 50 is inserted in the optical path between the optical fiber 180 mounted at the edge of the substrate 110 and the planar waveguide 112 to focus the optical signal 102 from the relatively large core 182 of the optical fiber 180 to the much thinner planar waveguide 112. The diameter of a typical single mode optical fiber 180 used in communication networks for the transmission of optical wavelengths in the range of 1100 to 1600 nm is typically 8-10 microns. Typical dielectric planar waveguides, on the other hand, are on the order of less than a micron to a few microns in thickness. In general, dielectric waveguides are susceptible to increasing stress with increasing film thickness, hence limiting the tolerable thicknesses of dielectric waveguides. Dimensional differences between the diameter of the core 182 of the optical fiber 180 and the planar waveguides 112 in many applications that utilize dielectric waveguides, require tight alignment tolerances between the planar waveguides 112 and the optical fibers 180 to limit losses in the optical signal 102 in transitioning from the optical fiber 180 to the planar waveguide 112. The tight spatial and angular alignment tolerances and the need for lens 50 between the end 184 of the optical fiber 180 and the end facet 185 of the planar waveguide 112, increase the complexity of the overall assembly relative to preferable alternatives in which the tolerances can be widened and for which the lenses 50 can be eliminated. Tight alignment tolerances can also require costly polishing or finishing of the fiber termination 184. Alternatively, passive alignment techniques, if available, are preferable over the active alignment techniques that require a more complex procedure for providing suitable alignment and optimization of the signal transmission across the optical fiber/planar waveguide interface.

Referring to FIG. 2a, an optical fiber 280 with cladding 281 is shown in proximity to the edge facet 285 of a thick planar waveguide 220 on substrate 210. The edge facet 284 is substantially aligned to the planar waveguide edge facet 285 without the requirement for the lens 50 (as was shown in FIG. 1.) A three-dimensional perspective drawing of this structure is shown in FIG. 2b. Thick planar waveguides enable direct transmission of the optical signal 202 from an optical fiber 280, or a similarly positioned optoelectronic or optical device without the requirement for the focusing lens 50 that is shown in FIG. 1. Thick planar waveguides on the order of the diameter of the core 282 of the optical fiber 280 are known in the art, and are typically polymers. Dielectric films are preferred over polymers due to their inherent dimensional and material stability, the capability to control the optical properties of these materials, and the available knowledge base for the formation and patterning of these films, among other benefits. Thick dielectric film structures, however, are susceptible to prohibitively increasing stress with increasing film thickness. High film stress can lead to deformation of the substrate, delamination of the films, and other undesirable effects.

In addition to the potential problems that arise with the formation of thick dielectric planar waveguides, planar waveguides with thicknesses on the order of the core diameter of a typical single mode optical fiber can allow for optical signal propagation in undesirable or non-optical modes. Preferably, optical signals are limited to single mode propagation once the signals have been received into a photonic integrated circuit, for example, for signal processing operations such as multiplexing and demultiplexing, among others.

In Provisional application 62/621,659, a thick dielectric structure suitable for use in forming thick planar waveguides, on the order of the diameter of single mode fibers, is included for reference herein in its entirety. In Provisional application 62/621,659, thick dielectric film structures are formed from stacks of silicon oxide and silicon oxynitride layers with low stress and with controllable optical properties that are suitable in some embodiments for receiving optical signals from proximally positioned optical fibers without stringent alignment requirements and without the requirement for the use of lenses 50 as further described herein. The advantages of thick silicon oxynitride film structures for use in planar waveguides include dimensional stability, controllable optical properties, the availability of known patterning methods, and the capability to achieve passive alignment of optical fibers and planar waveguides, among others.

Referring to FIG. 3a, a dual core waveguide 360, in embodiments, is shown comprised of a thick lower core 342 and a thinner upper core 354. The dual core planar waveguide structure 360, in some embodiments, utilizes a thick dielectric film structure 342, similar to the thick film structure 220 described in FIG. 2, but with the addition of a second waveguide core 354 positioned above the thick lower core 342. A three-dimensional perspective drawing of this structure is shown in FIG. 3b. In some embodiments, the thick lower waveguide core 342 is substantially thickness-matched to the core diameter of one or more mounted single mode optical fibers 380. Generally, as the thickness of a planar waveguide is increased, the susceptibility for optical signals traveling within the waveguide to propagate in less desirable, non-fundamental propagation modes is increased. The magnitude of the thickness of the lower waveguide core 342, renders optical signals traveling within it more susceptible to transitioning to higher order propagation modes.

Figure 3:
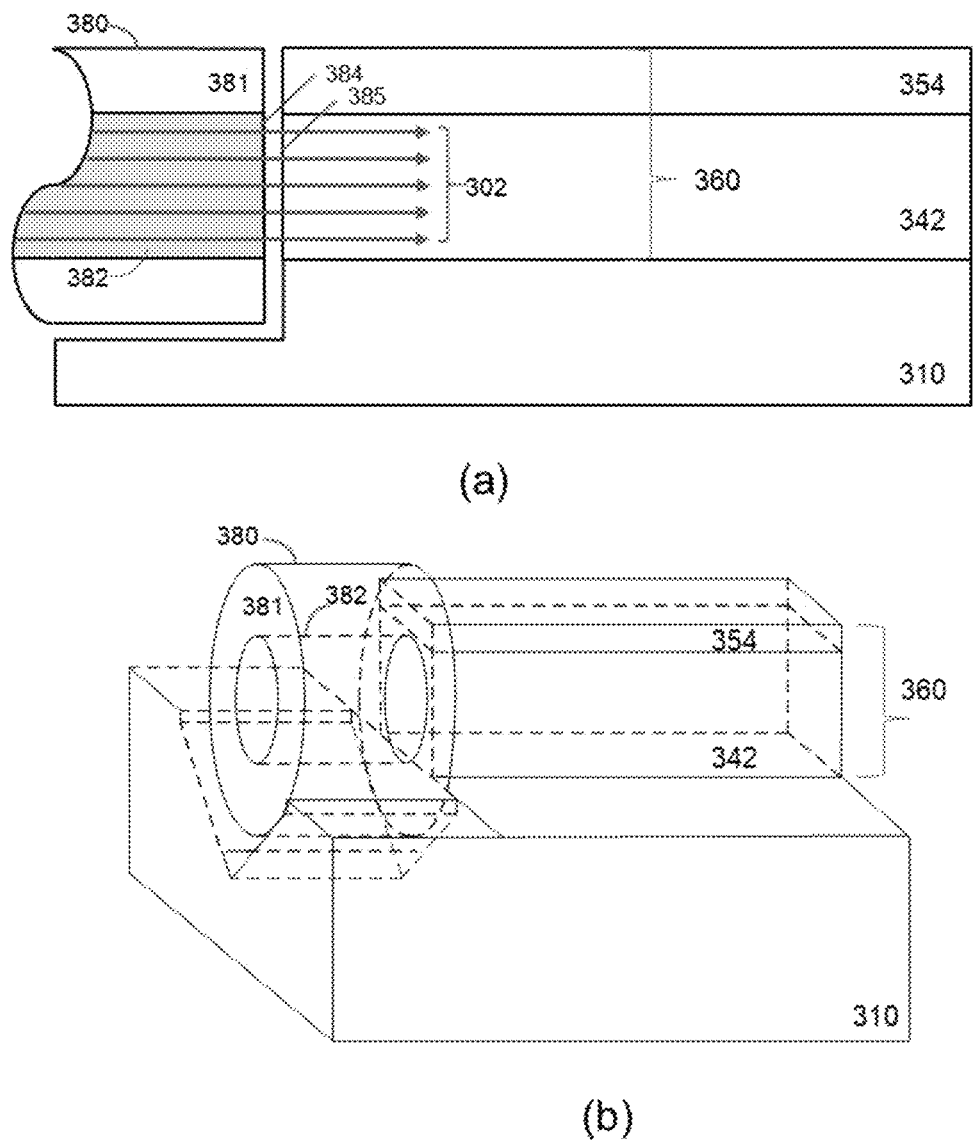
FIG. 3. (a) Cross sectional schematic view of a dual core waveguide structure with a single mode waveguide core layer shown above a thick waveguide core, and (b) three-dimensional perspective drawing of a dual core waveguide structure with a single mode waveguide core layer shown above a thick waveguide core.

The addition of the single mode waveguide 354 over the thicker multimode waveguide 342 provides a parallel optical signal propagation path within which preferable single mode propagation can be enabled and directed as described herein. In embodiments, for upper waveguide core 354 on the order of 0.5 microns in thickness, optical signal 302 traveling in the dual core structure remains weakly coupled between the two cores. As the thickness of the upper core 342 is increased, and with proper selection of the relative indices of refraction of the lower core 342 and the upper core 354, the propagation of the optical signals can be effectively directed between the two cores as further described herein. Structures, such as those shown in FIG. 3, provide firstly a thick waveguide structure 342 for receiving an optical signal 302 from an optical fiber 380 with core 380 and cladding layer 381 or optoelectronic device (not shown), without the requirements for tight dimensional tolerances of the edge facets 384, 385, or without the requirements for a focusing lens 50, or both, and secondly, a thin waveguide structure 354 for single mode propagation of optical signals 302. Tight dimensional tolerances include the surface finish of the facet surfaces for the optical fiber and the planar waveguide, and the distance and parallelism between the end of the optical fiber and the edge of the planar waveguide adjacent to the optical fiber, for example.

In some embodiments, the single mode core 354 of a dual core waveguide is positioned below the thicker core 342.

Referring to FIG. 4a, a cross sectional illustration of the dual core waveguide 460 is shown in which the upper waveguide core 454 is comprised of a thin portion 455, a tapered portion 457, and a thick portion. The index of refraction is higher for the upper waveguide core 454 relative to the thick bottom core 442. An incoming optical signal 402 propagates from the core 482 of the optical fiber (with cladding layer 481) to the thick bottom core 442, and in embodiments, a portion of the optical signal 402 may propagate in the thin portion 455 of the upper waveguide core 454. Some coupling of the optical signal 402 is anticipated in some embodiments between the thin waveguide core 455 and the thick bottom core 442 as the signal propagates substantially through the portion of the thick bottom core 442 that lies beneath the thin upper waveguide core 455. Optical signal 402 propagates through the thick portion 442 beneath the thin upper waveguide core 455 to the tapered portion 457 of the upper waveguide core 454. The optical signal 402 adiabatically transitions from a region of lower index of refraction in the lower core 442 to the region of higher index of refraction in the upper core 454. That is to say, that in transitioning, the propagation of the optical signal moves substantially to the upper core 454. In transitioning to the single mode upper core 454 of the dual core waveguide structure 460, the optical signal 402 becomes substantially non-coupled between the two waveguides, propagating primarily in the thick portion of the upper core 454, and less so in the bottom core 442.

Figure 4:
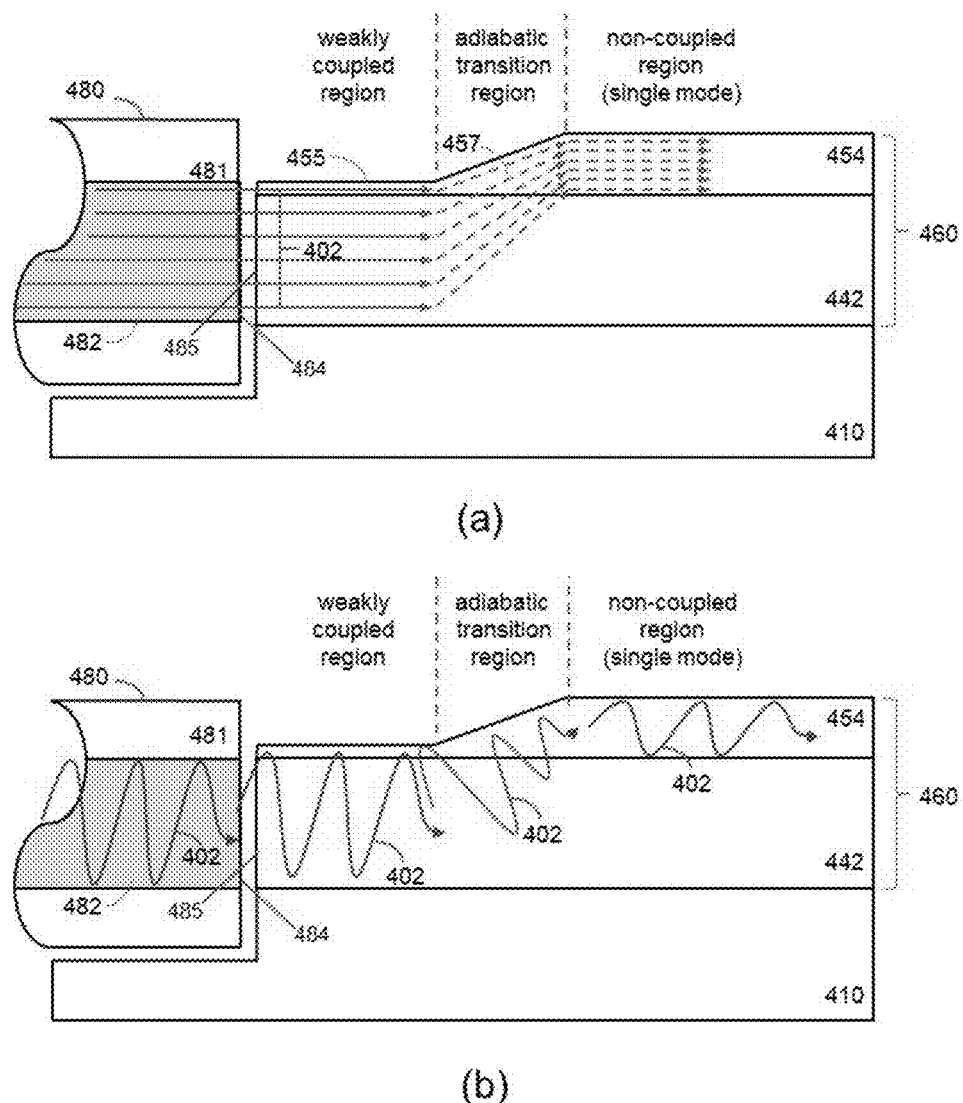
FIG. 4. (a) Cross sectional schematic view of a dual core waveguide structure with a single mode waveguide layer shown above a thick planar waveguide with a tapered adiabatic transition region, (b) cross sectional schematic view of a dual core waveguide structure showing an embodiment of the optical signal path from the bottom core to the top core, (c) three-dimensional perspective drawing of an embodiment of a dual core waveguide structure with vertical tapering, (d) three-dimensional perspective drawing of an embodiment of a dual core waveguide structure with lateral and vertical tapering, (e) three-dimensional perspective drawing of an embodiment of a dual core waveguide structure with lateral and vertical tapering.
Figure 4:
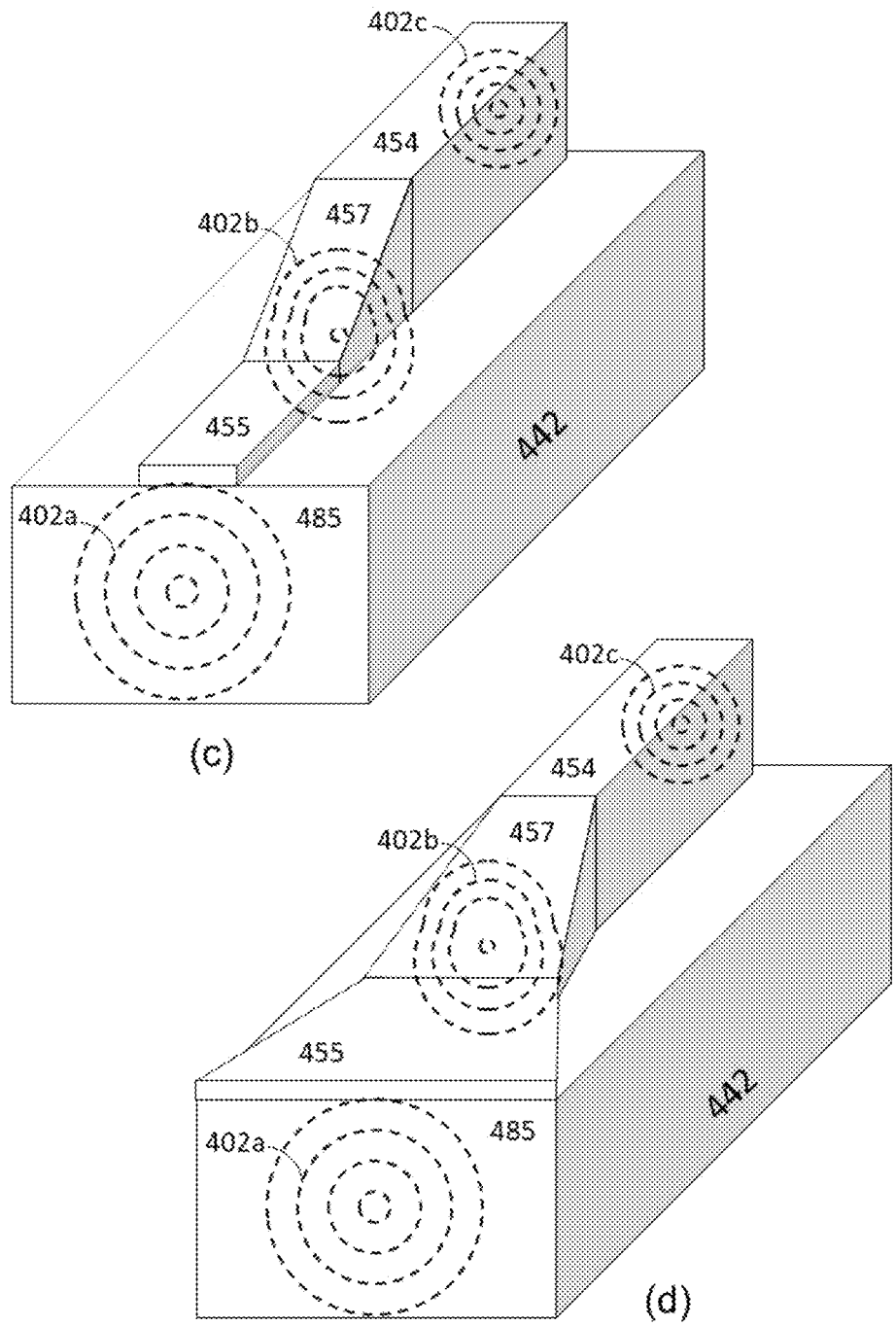
Figure 4:
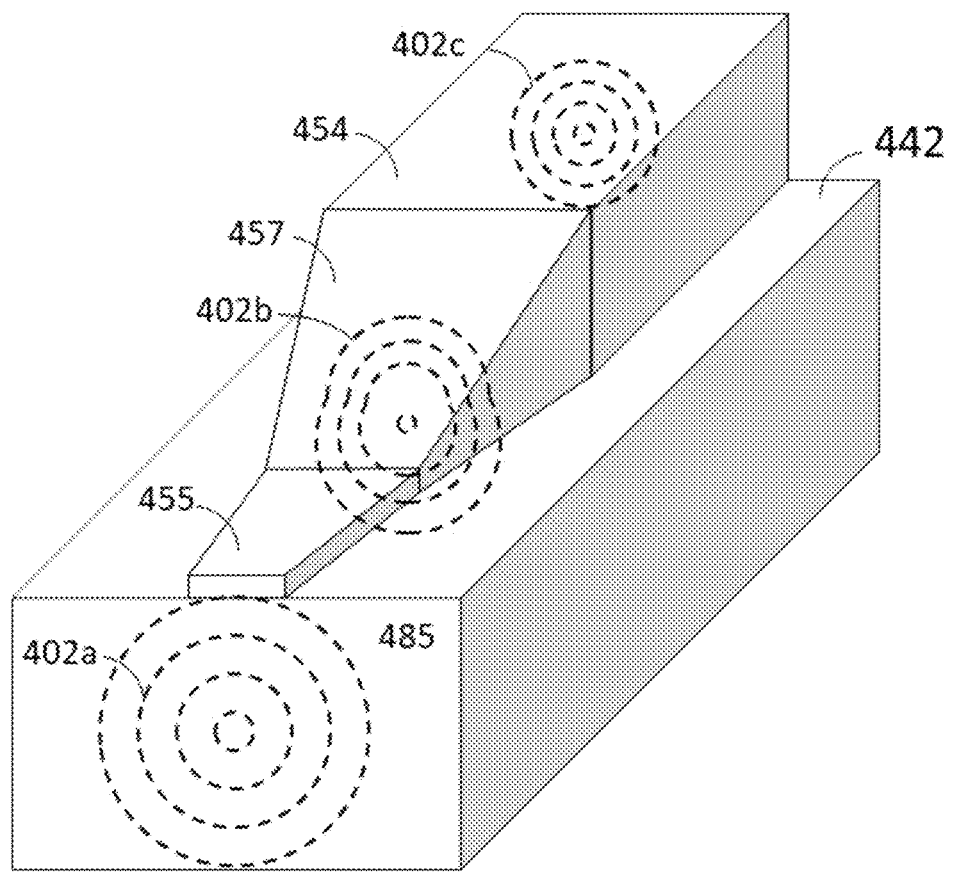

Referring to FIG. 4b, the anticipated behavior of an optical signal 402 traveling from the optical fiber 480, through the weakly coupled thin portion 455 of the upper waveguide core 454, and then through the tapered portion 457 and into the thick portion of the upper waveguide core 454 is shown. The incoming signal 402 from the optical fiber 480, which is circular in cross section, typically propagates in a single mode. As the optical signal, however, moves into the thick planar waveguide 442, in some embodiments, it becomes susceptible to propagating in a number of higher order modes. The susceptibility to transition to higher order propagation modes is largely due to the thickness and shape of the lower waveguide core, the thickness of which can be on the order of 6-15 microns. In embodiments in which the optical signal 402 exhibits propagation in a higher order mode, the propagation is not expected to be significantly affected by the presence of the thin weakly coupled upper waveguide portion 455, although the optical signal 402 has a propensity to move into the thin portion 455 in typical circumstances in which the upper waveguide core 454 has a higher index of refraction relative to the lower core 442. As the optical signal 402 transitions adiabatically in the tapered portion 457 of the upper waveguide core 454, propagation of the optical signal 402 transitions to a more stable single mode form in the upper core 454 than in the less restrictive lower core 442. Single mode propagation is preferable in many optical devices used in optical signal processing. Conversion of the single mode signal in the lower core 442 to the more confined and more stably directed single mode signal in the upper core 454 can be accomplished with a spot size converter, the function for which is provided with the dual waveguide structure shown in FIG. 4. That is, the dual core structure shown in FIGS. 4a and 4b, in embodiments, performs the function of a spot size converter. The optical signal 402 from the single mode fiber 480 that enters the lower core 442 of the dual core waveguide 460 is essentially a large diameter single mode signal that is redirected and confined into a more stable form with a smaller cross section or spot size within the thinner upper core 454. While the increased thickness of the bottom core 442 can allow for propagation in a number of higher order modes in some embodiments, this increased thickness is more suited to the reception of the optical signal 402 from the substantial thickness matching between the lower core 442 and the optical fiber core 482 in comparison to an approach of attempting to guide the optical signal 402 directly into the thinner upper core 442, or any form of thin planar waveguide in which the optical fiber core 482 is not substantially thickness matched. The thickness matching between the optical fiber core 482 and the thick lower core 442 that receives the optical signal 402 is beneficial for a number of reasons that include the ability to eliminate the use of lenses between the end of the optical fiber 484 and the planar waveguide end facet 485, the ability to significantly reduce, relax, or eliminate the polishing of the optical fiber end 484, and the ability to tolerate reduced alignment tolerances between the optical fiber end 484 and the planar waveguide end 485 in the fiber-to-substrate mating configuration.

The portion of the dual waveguide structure 460 within which the upper core 454 is a thinned upper core region 455, on the order of 0.5 microns in thickness for a silicon oxynitride film, for example, typically has an index of refraction that is higher than that of the lower core 442 to promote movement of the optical signal 402 from the lower core 442 into the upper core 454. The thickness of the thick portion of the upper core 454 for comparison is approximately 2 microns for a silicon oxynitride film, a thickness that provides a preferentially more stable single mode propagation for the optical signal 402 relative to signals propagating in the much thicker lower core 442. The thicknesses of the upper core 454 and the lower core 442 can vary, as can the stoichiometry of the silicon oxynitride used in these layers.

The tapered transition region 457 between the lower core 442 and the upper core 454 is provided in numerous ways, in embodiments, to effectively reduce the volume through which the optical signal 402 propagates as this signal transitions from the high-volume lower core 442 to the reduced volume of the upper core 454. In general, tapering is accomplished, in embodiments, with vertical tapering or a combination of vertical and lateral tapering.

In a vertically tapered upper core waveguide section 457, the thickness of the upper core 454 in tapered transition region 457 varies as shown, for example, in FIG. 4c. FIG. 4c shows a three-dimensional illustration of the upper waveguide core 454 in which a thin upper waveguide core section 455 is increased in thickness through the tapered section 457 to a thicker layer region 454 beyond the tapered section 457. In embodiments in which the tapered section 457 is only vertically tapered or substantially vertically tapered, the change in thickness of the upper core 454 is the only change, or at least the primary change in the dimension of the cross-section of the upper waveguide core 454. In upper core waveguides that are vertically tapered, a large cross-sectional optical signal 402 propagating in the lower core is directed upward in embodiments from an increase in the refractive index in the upper core 454 through the vertically tapered section 457, and as the signal is guided through the tapered section 457, the cross sectional area of the signal 402 is reduced and is ultimately confined to the cross sectional area of the thick portion of the upper waveguide core 454. The volume reduction of the upper core of the dual core waveguide 460 effectively acts to reduce the spot size or cross sectional area of the optical signal 402 through the transition portion 457 and the directed movement of the optical signal 402 with the increased index of refraction in the upper core, which promotes movement of the signal 402 from the larger lower core 442 to the smaller upper core 454.

Alternatively, the tapered section 457 can consist of vertical and lateral tapering in which both the thickness and the width of the upper core 454 change with position from the thin upper core portion 455 through the tapered section 457 to the thick portion of the upper waveguide core 454 as illustrated in FIG. 4d and FIG. 4e. In the embodiment shown in FIG. 4d, the thin upper waveguide core portion 455 is shown to narrow in width along a direction parallel to the optical signal propagation path. Also shown in the embodiment in FIG. 4d, the width of the upper waveguide core 454 continues to narrow in the tapered section 457. The height of the upper waveguide core 454 increases in the tapered portion 457 in the embodiment shown in FIG. 4d, as was the case in the embodiment shown in FIG. 4c, until the waveguide core 454 reaches its full thickness beyond the tapered section 457. Conversely, in the embodiment shown in FIG. 4e, the thin upper waveguide portion 455 is shown to increase in width in the direction parallel to the optical signal propagation path. The width of the upper waveguide core 454 continues to widen in the tapered portion 457 in the embodiment shown in FIG. 4e. The height of the upper waveguide core 454 increased in the tapered portion 457 in the embodiment shown in FIG. 4e until the waveguide core 454 reaches its full thickness beyond the tapered section 457.

The vertical tapering in embodiments as shown in FIGS. 4c and 4d, for example, can consist of a wide range of continuous or discontinuous changes in the vertical dimension of the upper core 454. Similarly, lateral tapering of the upper core 454 of the dual core waveguide 460 can also consist of any continuous or discontinuous change in the lateral dimension of the upper core 454 as the upper waveguide transitions from the thin portion 455 through the tapered section 457 to the thick portion 454 as shown in FIG. 4d.

As has been noted, the dual core waveguide 460 is comprised of the lower waveguide core 442 and the upper waveguide core 454, and upper waveguide core 454 is comprised of a thin portion 455, a tapered portion 457, and a thick portion. In a dual core waveguide structure with both lateral and vertical tapering, the width of the thin upper waveguide core section 455 transitions to a different width in at least a portion of the tapered section 457 to at least an initial width for the thick upper waveguide region 454 as shown in FIG. 4d. In some embodiments, the width of the upper core in the tapered section 457 is varied continuously from the start of the tapered section 457 to the end of the tapered section 457. In other embodiments, the width of the upper core in the tapered section 457 is varied in multiple stages, with partial decreases in the width of the upper waveguide core 454 with each stage.

The lateral transition in the width of the thin section 455 of the upper waveguide core 454 in an embodiment is a linear transition, with a linearly changing reduction in the width of the waveguide 455. In other embodiments, the changes in the width of the waveguide section 455 changes super-linearly with distance from the edge facet 485. In yet other embodiments, all or a portion of the waveguide section 455 changes with a sub-linear dependence with distance from the edge facet 485. In some embodiments, the thickness of the thin upper waveguide core section 455 can be varied with distance along the direction of propagation.

In other embodiments, the width of the upper core in the tapered section 457 is varied continuously and in steps as the width of the upper core 454 of the dual core waveguide 460 transitions from the thin upper core section 455 to the thick upper core section 454. Stepped transitions in lateral tapering, and vertical tapering as well, may be preferable in some embodiments, to simplify the lithographic patterning and subsequent etch processes. A stepped vertical transition might be implemented with a number of photomasks and etch steps, for example, to accomplish the transition from the thin portion 455 to the thick portion of the upper waveguide core 454.

As the signal 402 transitions through the portion of the dual waveguide structure 460 in which the upper waveguide core is a tapered section 457 and into the thick portion of the upper waveguide 454, the optical signal 402 transitions to having a preferable and stable single mode propagation characteristic. Maintaining a single fundamental propagation mode is preferable in many subsequent stages in the optical circuit within which the optical signal is processed, decoded, or encoded. The large diameter signal 402a (as shown in FIGS. 4c and 4d) received from the optical fibers 480 transitions to a smaller diameter signal in the spot size conversion structures in FIG. 4c and FIG. 4d as shown. The cross-sectional diameter of the propagating optical signal, a large diameter signal 402a in the lower waveguide core 442 that lies below the thin upper core segment 455, is reduced in cross-section as for example, optical signal 402b, as it transitions through tapered section 457 to the smaller cross sectional signal 402c in the upper core 454.

Figure 5:
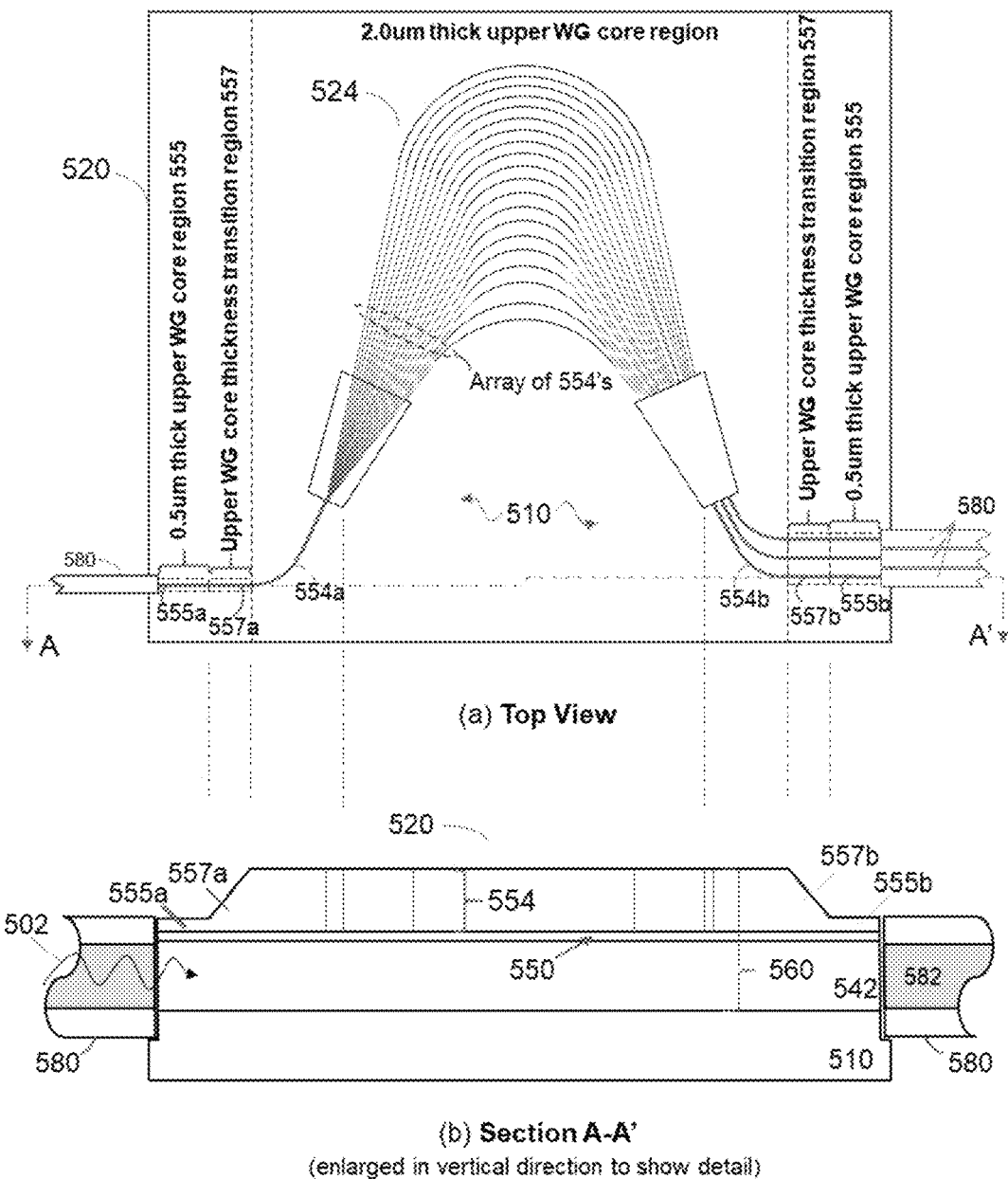
FIG. 5. (a) Top down schematic view of an exemplary optical circuit that includes an arrayed waveguide, (b) cross-sectional schematic view showing upper waveguide core thickness at various locations in the optical path from the incoming optical fiber to the output fibers, (c) top-down schematic drawing of a photonic integrated circuit showing optical fibers aligned to dual core waveguide structures, and (d) side view schematic drawing of a PIC with optical fibers aligned to dual core waveguide structures.

Referring to FIG. 5a, a top-down view is shown of an exemplary optical circuit element 524 on a sub-mount 520 in which some beneficial features of the dual core waveguide structure 560 are described. In an embodiment, an optical device 524 is formed from a dual core waveguide structure 560 on a substrate, interposer, or sub-mount 520 with optical fibers 580. Optical fibers 580 can be used to deliver optical signals to, or receive optical signals from, waveguides and devices on sub-mount 520. For simplicity, the structure 520 is hereafter referred to as a sub-mount. Sub-mount 520 can be a substrate, an interposer, a sub-mount, a sub-mount assembly, or any type of mechanical support structure for which the dual core waveguide can be formed, or mounted. Optical circuit element 524 in the embodiment shown in FIG. 5 is an arrayed waveguide, although the optical element 524 can be any optical device, waveguide, optoelectrical device, or electro-optical device to which the inventive dual core waveguide 560 on sub-mount 520 is used to transfer, receive, deliver, or propagate optical signals 502 from either optical fibers 580 or an optical or optoelectronic device. A dual core planar waveguide structure 560 is formed on the submount 520 in embodiments in films formed on the sub-mount 520. In other embodiments, the dual core planar waveguide is a discrete device that is formed partly or in its entirety and then mounted on the sub-mount 520. In an embodiment, optical fiber 580 provides optical signals 502 to lower core 542 of the dual core waveguide 560 at an input location on the sub-mount 520. V-grooves (as shown in FIGS. 2 and 3 but not highlighted in FIG. 5) in the substrate or sub-mount 520 are used in some embodiments to facilitate the mounting of optical fibers 580, 582.

Other details of the submount 520 shown in FIG. 5a include the array of the upper waveguide cores 554 and the spacer layer 550. In the embodiment shown in FIG. 5, the field area shows spacer layer 550. In other embodiments, the spacer layer 550 and the bottom waveguide core 542 are also patterned. Patterning of the bottom core 542, in some embodiments, can improve the performance of the arrayed waveguide. The width of the bottom core 542 in some embodiments is wider than the thickness of the bottom core 542, but not so wide as to produce undesirable interference between the optical signals in adjacent waveguides.

FIGS. 5a and 5b show schematic views of an embodiment of a dual core waveguide configured with an optical device, namely an arrayed waveguide. The structure of the dual core waveguide provides favorable benefits to the coupling of arrayed waveguides and optical fibers as described herein. The selection of the arrayed waveguide as an exemplary structure is not intended to limit the applicability of the dual core waveguide to this or other optical and optoelectrical devices, but rather is shown as an exemplary embodiment of a type of device for which the dual core waveguide structure and the spot size converter formed therefrom, can be favorably implemented.

In an exemplary optical device configuration as shown in the cross-section view in FIG. 5b, the optical signal 502 enters the lower core 542 (at left side of FIG. 5) of the dual core waveguide 560 The thickness of the lower core 542 of the dual core waveguide 560 is substantially matched to the core of the optical fiber 580, as shown. For reference, the core of the optical fiber is the portion of the fiber through which the optical signal substantially propagates, in contrast to the cladding or sheath layers, which are typically much thicker than the core diameter. Optical signal 502 is received by the lower core 542 of the dual core waveguide 560, and is weakly coupled to the upper core 555a as it propagates in the lower waveguide core 542. In general, the differences in the refractive index, typically lower in the bottom core 542 and higher in the upper core 554, will promote movement of the optical signal 502 to the region of higher refractive index in the upper core. In the thin upper core section 555a, the thinness of the upper core and the correspondingly weak coupling prevent movement and propagation into the upper core, but as the signal further propagates to the tapered section 557a, the optical signal will undergo an adiabatic transition from the lower core 542 through the tapered section 557a (not to scale) to the thick upper core of waveguide core 554a of the dual core waveguide 560, and in doing so, will undergo a reduction in the cross-sectional size of the propagating signal 502 as it moves into the upper core 554a due to the smaller volume of the upper waveguide core 554 in comparison to the lower core 542. For the purposes of clarification, the suffix "a" denotes the input side of the structure shown in FIG. 5, and is intended to distinguish from the output side (denoted with a "b") of the structure as shown at the right side of the structures shown in FIG. 5. In the absence of an "a" or "b" designation, either designation is implied. In some embodiments, the optical signals enter the structure shown at the left side of the cross-sectional structure shown in FIG. 5b and first encounter the thinned portion 555a of the upper waveguide core and subsequently the tapered section 557a, and the thick upper core portion of the waveguide core 554a. Upon propagation of the signal through the optical device 524, the optical signal exits at the right side of the cross-sectional structure shown in FIG. 5b encountering the output sections of the upper waveguide cores 554b, the tapered section 557b, and the thinned portion 555b. As shown in the top-down view, multiple upper cores 524b are formed at the output of the arrayed waveguide 524. In this embodiment, the combined sub-mount 520 with arrayed waveguide 524 is a demultiplexer device. Alternatively, the input signals are provided in the optical fibers 582 at the right side of the device structure shown in the cross section of FIG. 5b, directed at first into the thin upper core section 555b, tapered section 557b, and thick waveguide core 554b, and then through the arrayed waveguide 524, and into the thick waveguide core 554a, tapered section 557a, and thinned section 555a, and output from the substrate through optical fiber 580. In this configuration, the device functions as a multiplexer.

The configurations described above are intended to illustrate key elements in practice for the dual core waveguide structure 560 in which the dual core waveguide 560 is formed onto a substrate 520, and further formed into a spot size converter, and in which the spot size converter is incorporated into optical devices such as a multiplexer or demultiplexer. In practice, the optical device 524 can be any optical device that benefits from the features of a thick optical signal receiving waveguide and a thinner single mode waveguide. In embodiments, the optical device 524 can be one or more optical devices. In other embodiments, the optical device 524 is one or more of a waveguide, a grating, a filter, a blocker, a prism, a combiner, a multiplexer, a de-multiplexer, a splitter, or any of a wide range and type, or combinations of optical devices. The thick receiving waveguide 542 is substantially thickness-matched to the cores of mounted optical fibers and the upper waveguide core 554 is a single mode core that allows for substantially decoupled propagation of an optical signal that is significantly smaller in cross section than the incoming optical signal 502. In embodiments, a tapered section 557 is formed to facilitate the transition of the optical signal from the receiving core 542 to the single mode core 554.

In some embodiments, the combined sections 555, 557, and 554 provide the functionality of a spot size converter to provide single mode optical signal propagation in the upper core 554 of the dual core waveguide 560. Single mode optical signal 502 propagates with the reduced cross-sectional size of the upper waveguide core 554 relative to the lower core 542 in exemplary embodiments. In some embodiments, the further propagation of the optical signal 502 beyond the tapered section 557a in the optical device 524 on sub-mount 520 occurs substantially in the upper core 554 of the dual core waveguide 560.

Upper waveguide core 554 can include a waveguide element, such as a multiplexer or other optical device, to split the signal.

The arrayed waveguide 524, in an embodiment, is a demultiplexing device that provides a means for the separation of a composite incoming signal, consisting of multiple wavelengths of light, into its constituent signals. The arrayed waveguide 524 is an example of an optical device that benefits from the features of the inventive dual core waveguide 560, and particularly in embodiments in which a spot size converter is formed from the dual core waveguide 560. In an embodiment, a spot size converter is formed from the dual core waveguide 560 to receive an optical signal 502 in lower waveguide core 524 and convert a large cross-sectional optical signal 502 to an optical signal with a substantially smaller cross-section through a tapered section 557 formed in the upper core 554 of the dual waveguide structure 560. Other optical device structures and elements can also benefit from the dual core waveguide structure 560. Progression of the optical signal through the demultiplexing arrayed waveguide 524 results in a set of optical signals that are delivered to output optical fibers 582 in the embodiment shown. For simplicity, only three optical fibers are shown although one or any number of optical fibers 582 might be positioned at the output of an arrayed waveguide 524, for which the arrayed waveguide 524 is configured as a demultiplexer, to deliver the optical signals to a location on the same sub-mount 520 or elsewhere through output fibers 582, for example, for further processing. Conversely, in instances in which the arrayed waveguide 524 is a multiplexer, and optical fibers 582 provide the inputs to the arrayed waveguide, one or any number of optical fibers 582 can be positioned at the input of the arrayed waveguide 524, for which the arrayed waveguide is configured as a multiplexer, to deliver the optical signals to the arrayed waveguide 524.

In an embodiment of the exemplary structure shown in FIGS. 5a and 5b, fiber 580 delivers an optical signal to the thick lower waveguide 542, through tapered section 557a (not to scale) to the arrayed waveguide structure 524, and then again through tapered sections 557b at the output of an arrayed waveguide 524 that is configured for demultiplexing the incoming optical signal 502. For clarity in this exemplary description, the optical fibers 582 are on the output side of the arrayed waveguide 524. In embodiments, the arrayed waveguide 524 is a demultiplexing device from which the output of the arrayed waveguide 524 is directed into output fibers 582.

In yet other embodiments, the optical fibers 582 deliver one or more optical signals 502 to the arrayed waveguide 524 for multiplexing of the signals, and the output of the arrayed waveguide is directed to the optical fiber 580. In these embodiments, multiple optical signals are combined to form an output signal 502 that is delivered to optical fiber 580 from the thick waveguide core 542. In embodiments in which the optical fibers 582 or multiple planar waveguides deliver signals to the arrayed waveguide 524, the optical signals propagate from the optical fibers 582, into the thick bottom cores 542b, are directed upward to the tapered section 557b, and into the upper waveguide core 554b. Upon recombination in the arrayed waveguide 524, a single optical signal 502 that is a composite signal with multiple constituent wavelengths, propagates through the thick portion 554a of the upper waveguide core to the tapered section 557a within which the optical signal 502 is free to adiabatically expand into the thick lower core section 542 in the portion of the dual core waveguide 560 with the thin upper core 555a. As the optical signal 502 is expanded in the lower core 542, it can again be coupled to the optical fiber 580.

In other embodiments, the optical signals 502 are guided into additional optical devices, optoelectrical devices, waveguides, for example, after the demultiplexing in the arrayed waveguide 524. In FIGS. 5a and 5b, the optical device 524 is an arrayed waveguide. In other embodiments, the optical device 524 is an echelle grating, or other optical or optoelectrical device. Referring to FIGS. 5c and 5d, schematic views are shown in which the device 524a on submount 520 is one or more of an echelle grating or other optical or optoelectrical devices configured as a component of a PIC. One or more optical fibers 580 are mounted or otherwise configured in proximity to the substrate, interposer, or sub-mount 510, such that the optical signals can be transferred from the one or more optical fibers to one or more components of the PIC. In the configuration shown in FIGS. 5c and d, the one or more optical fibers 580 are aligned with dual core waveguide structures comprised of a thick lower core 542 and upper core 554. The thickness of the upper core 554 can vary with distance from the optical fiber 580 as shown in the exemplary embodiment in the schematic cross section provided in FIG. 5d. The cross-sectional schematic shows the thick lower core 542 in substantial alignment to the core of the optical fiber 580. The core of each of the optical fibers 580 is represented by the dotted lines within the top down and side views of the optical fiber 580. The thickness of the lower core 542 of the dual core waveguide is substantially matched to the diameter of the core of the optical fiber 580. In the figure, the cladding of the optical fiber is not shown to scale, and is typically much thicker than the core diameter. Accommodations for the cladding are typically made in the size of the V-groove within which the optical fibers 580 are supported, such that the core of the optical fiber 580, 582 are aligned to the receiving core 542 of the dual core waveguide. Additionally, the thickness of the substrate 510, also not drawn to scale, is typically much greater than shown in FIG. 5 relative to the thickness of the core of the optical fiber 580 than what is depicted in the drawing.

In an exemplary embodiment of the dual core waveguide configured with a PIC as depicted in FIG. 5c, for example, optical signals can be inbound from one or more of the optical fibers 580 to the PIC, or outbound from the PIC to one or more of the optical fibers. PICs can be comprised of one or more optical or optoelectrical device, and the dual core waveguides can be used in embodiments to deliver optical signals to, and receive optical signals from, the optical fibers 580 and the PIC. Additionally, the dual core waveguide structures can be used to provide optical connections between the various optical and optoelectrical devices 524a, 524b, 524c, 524d within the PIC as shown in FIG. 5c. Optical device 524a Metallization lines 588 are also shown in FIG. 5c and FIG. 5d that provide electrically interconnections for electrical and optoelectrical devices within the PIC. Electrical contacts 589 for connections to externally mounted devices, for examples, are also shown in FIGS. 5c and 5d.

Figure 6:
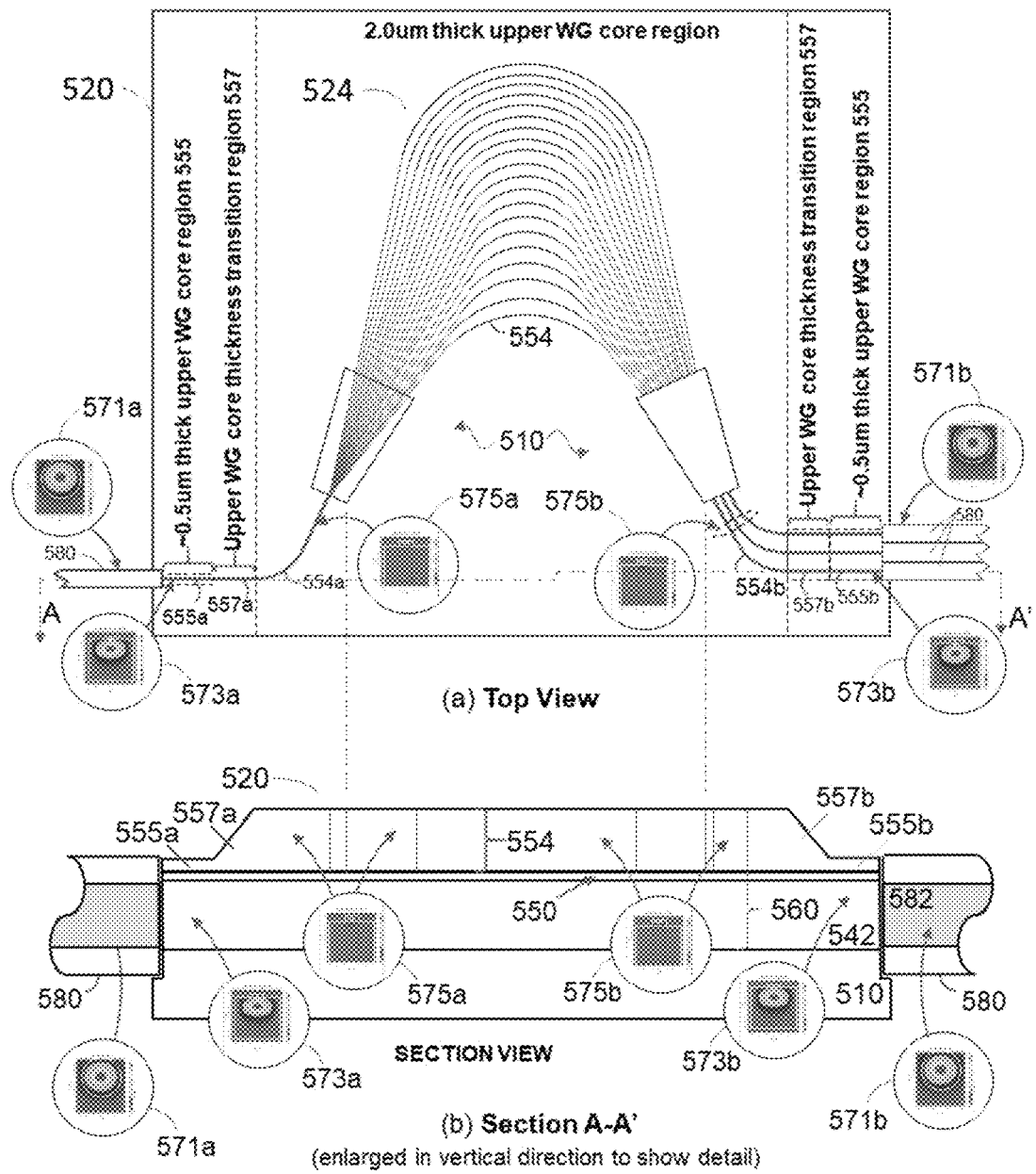
FIG. 6. (a) Top down view of an exemplary optical circuit that includes an arrayed waveguide showing anticipated propagation modes in the dual core waveguide structure at various locations in the optical path from the incoming optical fiber to the output fibers; the anticipated propagation modes are in the circled insets. (b) Cross sectional schematic view of the variation in thickness of the upper core of the dual core structure also showing the anticipated propagation modes in the dual core waveguide structure at various locations along the optical path.

Referring to FIG. 6, the planar optical circuit of FIG. 5 consisting of an arrayed waveguide device 524, is shown with anticipated propagation profiles of the optical signal 502 at various locations in the optical circuit. In the exemplary optical circuit shown in FIG. 6, an incoming optical signal is provided to the sub-mount 520 in the attached optical fiber 580 at the left-bottom of FIG. 6a, and propagates from the left edge of the device, through the arrayed waveguide 524, and out the right-bottom part of the circuit to the output fibers 582. The input to an arrayed waveguide, in some embodiments, is a multiplexed optical signal consisting of a number of distinct wavelengths of light. In an exemplary embodiment, the incoming optical signal is a composite signal of 16 wavelengths, centered around a wavelength of 1550 nm with increments of 20 nm between each sub-signal of the combined incoming signal. Other wavelengths and spacings between wavelengths are used in other embodiments. Typical wavelengths of light that are commonly used in optical communication networks are in the range of 1200 to 1700 nm. A commonly used wavelength, for example, is 1550 nm. In an embodiment, the incoming optical signal 502 is a multiplexed signal, and consists, for example, of a set of 16 different wavelengths, centered around 1550 nm in increments of 20 nm. In another embodiment, the incoming optical signal is a multiplexed signal consisting of eight wavelengths of light, centered around 1300 nm, in increments of 20 nm. In yet another embodiment, the incoming optical signal 502 is a multiplexed signal consisting of four wavelengths centered around 850 nm in increments of 15 nm. An arrayed waveguide provides a means for separating the various wavelengths in the incoming optical signal, and then providing distinct physical channels within which to direct the individual signals. In this example, the circuit contains sixteen output fibers 582, for example, to provide a unique channel for each of the demultiplexed wavelengths from the incoming signal 502.

Again referring to FIG. 6, the anticipated propagation modes are shown in the circled insets 571, 573, 575. (The suffix "a" attached to the insets refers to the input side of the device to the left of FIG. 6 and the suffix "b" refers to the output side to the right of FIG. 6.) The anticipated propagation mode, for example, for a typical incoming optical signal 502 in optical fiber 580 is axially symmetric as shown in inset 571a for the incoming optical fiber 580. As the optical signal 502 enters the thick lower core 542 of the dual core waveguide 560, a higher refractive index in the upper core 554 promotes some movement of the optical signal 502 to the upper core 555a, creating the asymmetric signal characteristic in the thin portion 555a of the dual core waveguide 560 as shown in the inset 573a. Full movement of the optical signal is limited by the physical volume in the upper core in the thin upper core segment 555a.

In embodiments, the length of the region 555a in the direction of propagation of the optical signal 502 will affect the intensity of the optical signal 502 at the input to the tapered section 557a. In embodiments, the section 555a is a straight section without curvature. In other embodiments, the section 555a is straight section without curvature and with a length in the direction of propagation of the optical signal 502 such that the signal intensity at the input to the tapered section is a maximum or near maximum. In other embodiments, the section 555a is straight section without curvature and with a length in the direction of propagation of the optical signal 502 such that the signal intensity at the input to the tapered section is at least adequate for signal processing. In an embodiment, the length of the section 555a is in the range of 100 to 500 microns. In other embodiments, the length of the section 555a is in the range of 50 to 1000 microns. In yet other embodiments, the length of the section 555*a* is such that a discernable signal is detected beyond the tapered section 557*a* for subsequent optical signal processing.

Further propagation of the optical signal 502 along the dual core waveguide structure 560 through the tapered section 557*a* has the anticipated result as shown in the inset 575*a* in which the signal is substantially present in the single mode upper core 554 of the dual core waveguide 560. In this section of the upper core 554, the optical signal is not limited by the waveguide volume as in segment 555*a*, but rather is confined to the smaller volume and higher index of refraction of the upper core 554, but with an increased susceptibility to propagate in single mode form. The approximate locations of the outline of the waveguides, relative to the modeled fields, for each of the insets is shown as a white outline. In inset 571*a*, for example, the white outline depicts the circular cross section of the core of the optical fiber. Similar outlines, rectangular in cross section are provided in insets 573 and 575.

In the embodiment shown in FIG. 6, as the optical signal 502 propagates through the tapered portion 557*a* of the upper waveguide core 554, the coupling of the optical signals 502 between the upper and lower cores of the dual core waveguide 560 are substantially reduced relative to the weak coupling anticipated in the thin upper waveguide section 555*a*. Optical signal processing in the arrayed waveguide structure 524 is accomplished preferably in the single mode thick portion of the upper core 554 in which the signals in the lower core 542 and the upper core 554 are substantially decoupled.

In the embodiment shown in FIG. 6*a*, the optical signal 502 traverses the arrayed waveguide 524 substantially in the single mode upper core 554 of the dual core waveguide 560 and exits at the right side of the device array as shown. In this embodiment shown in FIG. 6, the optical signal 502 propagates through a second tapered portion 557*b* of the upper waveguide 554*b* in which the upper core thickness is reduced to recouple and expand the cross-sectional area of the optical signal 502 in the lower waveguide 542. The progression of the optical signal 502 is shown in the inset 571*b* in the portion of the dual core waveguide 560 comprising the thick waveguide segment 554*b*; in the inset 573*b* for the portion of the dual core waveguide 560 comprising the thin waveguide segment 555*b*; and in the inset 575*b* for the single mode fiber 582. The embodiment shown in the top down view in FIG. 6*a* is further illustrated in the cross section shown in FIG. 6*b* within which the relative lateral dimensions of the various segments in the upper core 554, 555, 557 of the dual core waveguide 560 are aligned to highlight the specific features from the top-down view of FIG. 6*a* to the cross-section view of FIG. 6*b*. The top-down view and the cross-sectional view are not drawn to scale in FIGS. 5 and 6, but rather are intended to highlight the key features of the structure in a vertically-expanded and more detailed format in the cross-sectional view of FIG. 6*b*. At the leftmost side of the device structure, the upper waveguide core in segment 555*a* of the dual core waveguide, for example, is approximately 0.5 microns in thickness for a silicon oxynitride waveguide material. In an embodiment of the structure shown in FIG. 6, that includes an arrayed waveguide 524, the optical signal 502 enters the dual core waveguide structure 560 from the left. The optical signal 502 enters the lower core 542 of the dual core waveguide 560, and transitions to the upper core 554 in the transition region 557*a*, in which the upper core 554 of the dual core waveguide 560 is increased in thickness from 0.5 micron to 2 microns. In embodiments, the dimension of the tapered section 557*a* in the direction of signal propagation is in the range of 100-500 microns. In other embodiments, the lateral dimension of the tapered section is 50 to 1000 microns. In other embodiments, the lateral dimension of the tapered region 557 is 150 microns. In yet other embodiments, the tapered section 557 is such that the signal is substantially transferred from the lower core 542 to the upper core 554. The rate of transition of the optical signal 502 between the upper and lower cores of the dual core waveguide 560 can vary, and can depend in part on the refractive indices of the upper core and the lower core, and on the difference in the refractive index between the two cores. In the 2 micron thick portion of the upper core 554, the optical signal 502 is substantially propagating in the upper core 554 and is substantially decoupled from the lower core 542. Demultiplexing of the optical signal 502 occurs in the arrayed waveguide 524 which, in the embodiment shown, is substantially formed in the thick upper core 554 of the dual core waveguide 560. In embodiments, the thicker upper core 554 and the decoupling of the signal from the bottom core 542 enable the signal 502 to propagate through the curved elements of an optical device while maintaining at least adequate signal intensity for the subsequent decoding of the information from the incoming optical signal 502. In an exemplary embodiment, a decoding step pertains to the conversion of the optical signal to an electrical signal, for example. In the portion of the arrayed waveguide device structure 524 that contains curvature in the optical pathway, the optical losses are reduced with the increase in the thickness of the upper core 554 and the corresponding decoupling of the signal that occurs with the increased thickness of the upper core 554 of the dual core waveguide 560.

As the optical signal 502 is demultiplexed in the arrayed waveguide 524 (or other optical or optoelectrical device) in the embodiments shown in FIG. 4, FIG. 5, and FIG. 6, the signal traverses the tapered region 557*b* of the dual core device structure 560. The thickness of the upper core 554 of the dual core waveguide 560 transitions from the approximately 2 micron thick region to a thinner 0.5 micron region in this tapered portion 557*b*. In embodiments, the dimension of the tapered section 557 along the path of propagation is in the range of 100-500 microns. In other embodiments, the dimension of the tapered section along the path of propagation is 50 to 1000 microns. In other embodiments, the dimension of the tapered region along the path of propagation 557 is 150 microns. In yet other embodiments, the dimension of the tapered section 557 is such that the signal is substantially transferred from the lower core 542 to the upper core 554. The rate of transition of the optical signal 502 between the upper and lower cores of the dual core waveguide 560 can vary, and can depend in part on the refractive indices of the upper core and the lower core, and on the difference in the refractive index between the two cores. Beyond the output tapered region 557*b*, the optical signal 502 is further propagated in some embodiments, to individual output waveguides in some embodiments, output fibers 580 in other embodiments, and other waveguides, optical devices, or optoelectrical devices, for example in yet other embodiments.

In embodiments, the upper core 554 of the dual core waveguide 560 has a higher refractive index than the lower core. In embodiments of the dual core waveguide 560, the dual core structure 560 is fabricated from a polymer material or a dielectric material, or a combination of these materials. In other embodiments, the dual core waveguide 560 is fabricated from a stack of silicon nitride, silicon oxide, or silicon oxynitride layers, or a combination of these materials. In yet other embodiments, the dual core waveguide 560 is fabricated from a composite structure of multiple layers of silicon nitride, silicon oxide, and silicon oxynitride layers. In other embodiments in which the dual core structure 560 is a composite stack of layers, such as multiple silicon oxynitride layers, the upper core 554 of the dual core waveguide 560 has a higher effective refractive index than the effective refractive index of the lower core of the dual core waveguide 560. In this context, an effective refractive index for the upper core 554 of the dual core waveguide 560 refers to the refractive index of the grouped layers comprising the upper waveguide 554.

In embodiments, the thickness of the lower core 542 of the dual core waveguide 560 is on the order of the thickness of the core of the mounted optical fiber 580. In some embodiments, the thickness of the lower core 542 of the dual core waveguide 560 is 10 microns. In other embodiments, the thickness of the lower core is in the range of 5-15 microns. In other embodiments, the thickness of the lower core 542 of the dual core waveguide 560 is thickness matched to the dimensions of an optical signal 502 from an optoelectrical device mounted in proximity to a receiving portion of the lower core 542 of the dual core planar waveguide 560. In yet other embodiments, the thickness of the lower core 542 of the dual core waveguide structure is such that, when coupled to an optical fiber 580, an optical signal 502 transferred between the optical fiber 580 and the lower core 542 of the dual core waveguide 560 is substantially transferred so that at least a decodable signal is maintained in optical device 524 or other optical or optoelectronic device.

The arrayed waveguides 524 shown in FIG. 5 and in FIG. 6 provide exemplary embodiments for a dual core waveguide structure 560. In other embodiments, substrates 510 include optoelectronic devices in the optical circuit. In yet other embodiments, the arrayed waveguide 524 is a multiplexer in which multiple optical signals propagate through a portion of the dual core waveguide 560 to the arrayed waveguide 524 and are combined before exiting the arrayed waveguide 524. In yet other embodiments, a spot size converter is combined with one or more optical devices. In yet other embodiments, a spot size converter is formed from the combination of a thick lower core 542 and a single mode upper core 554. In yet other embodiments, the stacking order of the dual core waveguide structure 560 is reversed with the thin single core 554 of the waveguide 560 formed closer to the substrate 510 and the thick core 542 is formed above the thin single mode core 554 to form a spot size converter or other optical device.

In embodiments, the thick core 542 of the dual core waveguide 560 has a lower effective index of refraction than the effective index of refraction of the thinner upper core 554 to promote movement of the optical signal from the region of lower refractive index to the region of higher refractive index. In an exemplary embodiment, the effective refractive index of the thick lower core 542 of the dual core waveguide 560 is 1.65 and the effective refractive index of the thin upper core 554 is 1.7. In another embodiment, the effective refractive index of the thick lower core 542 of the dual core waveguide 560 is 1.68 and the effective refractive index of the upper core 554 of the dual core waveguide 560 is 1.71. Any of a range of refractive indices can be used in embodiments, for the lower core 542 and the upper core 554 of the dual core waveguide. And any of a range of differences in the refractive indices between the top core 554 and the bottom core 542 can be used embodiments of the dual core waveguide 560. Preferably, the indices of refraction for dual core waveguides 560 fabricated from silicon oxynitride films are in the range of 1.4 to 2.0.

Figure 7:
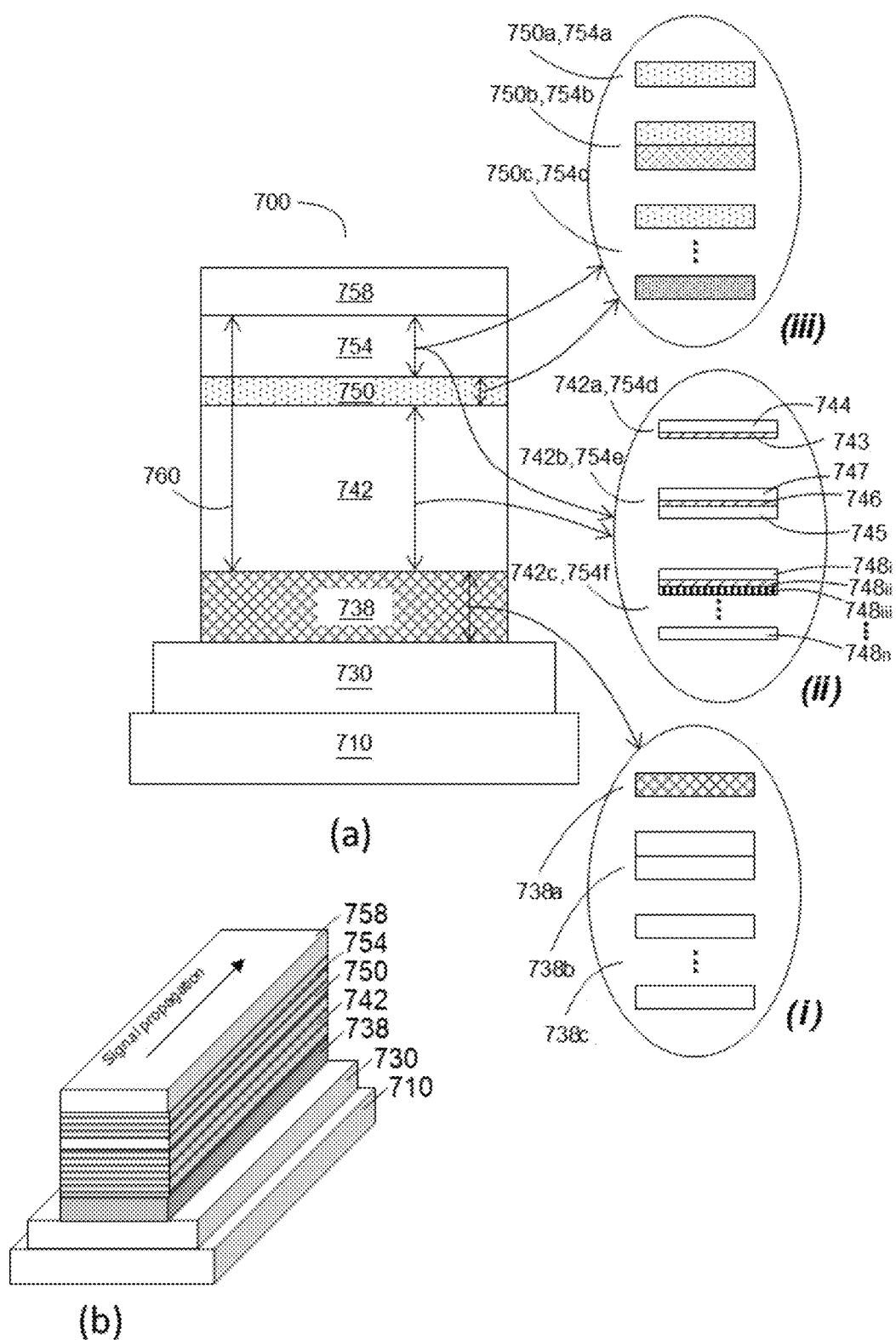
FIG. 7. (a) Cross sectional schematic drawing of an exemplary dual core waveguide structure, and (b) three-dimensional perspective drawing of the dual core waveguide structure shown in (a)

Referring to FIG. 7, embodiments of a stacked dielectric film structure 700, within which a dual core dielectric waveguide structure 760 is formed, is shown. The dual core dielectric waveguide structure 760 shown in the cross-sectional schematic in FIG. 7a is a stack of dielectric films formed on a substrate 710. Optical devices such as waveguides and spot size converters for example, can be formed from the film structures described in FIG. 7. The substrate 710 can be a substrate, an interposer, a sub-mount, a sub-mount assembly, or other combination of elements. The dual core waveguide 760, in embodiments, is a planar waveguide structure. In some embodiments, the dual core waveguide 760 is a component in an optoelectronic circuit, photonic integrated circuit, electronic circuit, or substrate for which a planar waveguide is combined with optical or optoelectronic devices, sensors, microelectromechanical device, or other device or devices. In an embodiment, the substrate 710 is silicon. In other embodiments, the substrate 710 is GaAs, InP, SiGe, SiC, or another semiconductor, or combination of these or other commonly used semiconductor materials. In yet other embodiments, the substrate 710 is aluminum nitride, aluminum oxide, silicon dioxide, quartz, glass, sapphire, or another ceramic or dielectric material. In yet other embodiments, the substrate 710 is a metal. And in yet other embodiments, the substrate 710 is a layered structure of one or more of a semiconductor, a ceramic, an insulator, a dielectric, and a metal. It is to be understood that the substrate 710 can be any material that provides a suitable mechanical support for the dual waveguide structure 760. It is to be further understood that a substrate 710 with an interconnect layer that contains electrical lines and traces, separated with intermetal dielectric material, is a substrate 710.

The dual core waveguide structure 760 includes a planar waveguide structure formed on substrate 710. In an embodiment, the dual core planar waveguide structure 760 includes a buffer layer 730, bottom spacer layer 738, a repeating stack of silicon oxynitride films 742a-742c that forms a first or lower core 742 of the dual core waveguide 760, an intermediate spacer layer 750, a second stack or layer 754 that forms a second or upper core 754 of the dual core waveguide 760, and an optional top layer 758. Optional top layer 758 is a cladding layer in some embodiments. In some embodiments, bottom spacer layer 738 is a cladding layer. In the discussion herein, descriptors such as top, bottom, upper, and lower are intended to provide relative positions of the various films in the structure and is not intended to limit the applicability of the structure. Reversal of the order of the films, for example, in the stack structure in embodiments with the substrate at the top remains within the scope of the current invention. Additionally, reversal of the relative positions of the lower core 742 with that of the upper core 754 also remains within the scope of the current invention.

In embodiments, buffer layer 730 is one or more layers of silicon dioxide or silicon oxynitride. In some embodiments, the buffer layer 730 is a layer of silicon oxynitride. In an embodiment, the buffer layer 730 is a silicon oxynitride layer, 5000 nm in thickness, with an index of refraction of 1.55. In other embodiments, the buffer layer 730 is silicon oxynitride with refractive index of 1.55 and is thicker than 2000 nm. In other embodiments, the buffer layer 730 is a silicon dioxide layer with a refractive index of approximately 1.445. In other embodiments, the buffer layer 730 is a silicon dioxide layer with a refractive index of approximately 1.445 that is greater than 2000 nm in thickness. In yet other embodiments, the buffer layer 730 is a silicon dioxide layer that is approximately 4000 nm in thickness and with a refractive index of approximately 1.445.

Buffer layer 730 can be a composite layer of one or more layers of silicon dioxide or silicon oxynitride with varying thicknesses that in some embodiments sum to greater than 4000 nm in total thickness. Similarly, the buffer layer 730, in some embodiments, can be a composite layer of one or more layers with varying refractive index, that when combined, provide a total thickness of greater than 4000 nm and an effective refractive index in the range of 1.4 to 2.02. In other embodiments, a buffer layer is thinner than 4000 nm. The buffer layer 730 is an optional layer and is not required for all applications. In an embodiment in which a demultiplexer is fabricated from an arrayed waveguide 524, for example, and the demultiplexing function is accomplished in the upper core 754 of a dual core waveguide structure 760, the use of a buffer layer 730 may not be required since the optical signal is guided from the lower waveguide to the upper waveguide in a short distance from the interface between mounted optical fiber 580 and the lower core 742 of the dual core waveguide structure 560, 760. The buffer layer 730, in some embodiments, provides a means for reducing the magnitude of the interaction between optical signals propagating within the waveguide cores 742, 754 in the dual waveguide structure 760 and the portions of the substrate 710 below the buffer layer 730. In other embodiments, the buffer layer 730 provides a means for vertical alignment of one or more layers of the planar waveguide with other features on the substrate, interposer, or sub-assembly, such as optical fibers and optoelectrical devices. As the thickness of the buffer layer 730 is increased, the relative heights of planar waveguides 742,754 within the dual waveguide structure 760 are also raised, for example, and the capability to change the relative height of the planar waveguide cores 742,754 relative to other devices on the substrate, interposer, or sub-mount assembly provides a useful means for alignment of the various optical, electrical, and optoelectrical components of a circuit or assembly within which the dual core waveguide structure 760 is utilized. In some embodiments, a buffer layer 730 is formed and a portion of the buffer layer 730 is etched or otherwise removed to provide a feature height that facilitates the vertical alignment of optical and optoelectrical devices that are formed or mounted on the full or partial layer of remaining buffer layer 730. In embodiments, a 5 micron thick buffer layer may be cleared of overlayers and etched so that a remaining buffer layer thickness of 2 micron is formed on the substrate 710. In these embodiments, a laser or other optoelectrical device is mounted on the thinned buffer layer to align the emission axis or plane of the laser or other optoelectrical device with the axis or plane of one of the waveguide cores in the dual core waveguide 760 to facilitate either emission of the laser into the aligned planar waveguide, or reception of an optical signal from the aligned planar waveguide for detectors or other receptive optical devices.

Referring again to FIG. 7a, and in particular to inset (i) in FIG. 7a, spacer layer 738 is shown. In embodiments, spacer layer 738 is one or more layers of silicon dioxide or silicon oxynitride. In other embodiments, the spacer layer 738 is a single spacer layer 738a of silicon oxynitride, 500 nm in thickness, with an index of refraction of 1.55. In some embodiments, single spacer layer 738 is a layer 738a of a single material, such as silicon dioxide. In other embodiments, single spacer layer 738a is a layer of silicon oxynitride. In yet other embodiments, single spacer layer 738a is a layer of silicon oxynitride with thickness in the range of 0 to 1000 nm. Although in some embodiments, a spacer layer 738 is included in the dual waveguide structure 760, in some other embodiments, the spacer layer 738, can be combined with the buffer layer, can be made very thin, or is not included. In embodiments, the index of refraction of the spacer layer is lower than the index of refraction of the lower core 742 of the dual core waveguide 760.

Spacer layer 738 can be a composite spacer layer 738b of one or more layers of silicon oxynitride or silicon dioxide. In an embodiment, composite spacer layer 738b includes two layers of silicon oxynitride with thicknesses of 250 nm and with an effective refractive index of approximately 1.55. In some embodiments, the sum of the thicknesses of the two layers in composite spacer layer 738b is in the range of 0 to 1000 nm.

Similarly, the spacer layer 738 can be a composite layer 738c of three or more layers with the same or varying thicknesses and refractive indices, that when combined, provide a total thickness in the range of 0 nm to 1000 nm and an effective refractive index in the range of approximately 1.4 to approximately 2.02. Increasing the number of layers in the spacer layer 738, and in the overall stacked dielectric structure 700 in general, can lead to a reduction in residual stresses and a reduction in the optical signal losses in waveguides fabricated using the inventive film structures in some embodiments relative to waveguide structures using fewer layers.

The combined thicknesses of the buffer layer 730 and the spacer layer 738 in embodiments provide vertical spatial separation between the lower waveguide core 742 that is formed above the spacer layer 738 and the substrate 710. This vertical spatial separation is necessary in some embodiments, to reduce, minimize, or eliminate the interaction of propagating optical signals in the lower core 742 with the substrate 710. The propagation of optical signals 502 with low optical loss through the lower waveguide core 742 requires some degree of confinement of the optical signal within the volume of the lower waveguide core with minimal interaction of the optical signals with the substrate 710 in embodiments for which the optical signals can be attenuated or otherwise reduced in interactions with the substrate material. Silicon and some other semiconductors, and metal layers in substrate interconnect layers, for example, can lead to significant attenuation of propagating optical signals in planar waveguides that are too close to the substrate to provide adequate separation between the propagating signals and the substrate. The combined thicknesses of the buffer layer 730 and the spacer layer 738, in embodiments, provide spatial separation between the layers of the inventive dual core dielectric waveguide structure 760 and the substrate 710 and reduce the interaction of propagating optical signals with materials in the substrate that can lead to attenuation of the optical signals. Additionally, the spacer layer 738 is used in some embodiments to establish the relative height of the lower waveguide core 742 and the upper waveguide core 754 that are formed above the spacer layer 738. As is the case with the buffer layer 730, the thickness of the spacer layer 738 can be used as a means to provide alignment of the planar waveguide cores 742, 754 that reside above the spacer layer 738 with optical fibers, optoelectrical devices, optical devices, and electrical devices formed, mounted, or placed in proximity to the planar waveguide structure 760 to affect the mutual operation or coupling between the planar waveguides 742,754 and other circuit components.

In embodiments, lower core 742 of the inventive dual core planar waveguide structure 760 is formed from a dielectric stack. In some embodiments, the dielectric film stack 742 is a layered structure of silicon oxynitride films.

Embodiments of the lower core 742 of the dual core planar waveguide structure 760 are shown in inset (ii) in FIG. 7a. In an embodiment, the lower waveguide core 742 of the dual waveguide structure 760 has a repeating stack 742a of two dielectric films in which the constituent films within the repeating stack structure 742a are of differing refractive indices. The full thickness of the lower waveguide layer 742, in some embodiments, is obtained by the formation of a dielectric stack structure in which the repeating stack 742a is repeatedly deposited or otherwise formed to achieve the ultimate thickness of the layer 742. The two dielectric films in the repeating stack 742a are deposited in some embodiments using a chemical vapor deposition process or plasma enhanced chemical vapor deposition process, for example, and the process for the deposition of the two films is repeated until the full thickness of the waveguide layer 742 is obtained. Differences in the refractive indices are obtained in some embodiments, from changes in the stoichiometric composition of the films. In embodiments, the changes in the stoichiometry of the films in the repeating film structure 742a is accomplished with changes in the process conditions used in the deposition of the films comprising the repeating film structure 742a. In an exemplary embodiment, the repeating stack structure 742a includes a first film 743 of 900 nm of silicon oxynitride with an index of refraction of 1.6 and a second film 744 of 50 nm of silicon oxynitride with an index of refraction of 1.7. In another embodiment, the repeating structure 742a includes a first film 743 of 40 nm of silicon oxynitride with an index of refraction of 1.7 and a second film 744 of 500 nm of silicon oxynitride with an index of refraction of 1.65. In yet another embodiment, the repeating structure 742a includes a first film 743 of 60 nm of silicon oxynitride with an index of refraction of 1.7 and a second film 744 of 500 nm of silicon oxynitride with an index of refraction of 1.65. It is to be understood that the order of the first film 743 and the second film 744 in embodiments can be reversed and remain within the scope and spirit of the invention. It should also be noted that the index of refraction of a film structure 742 comprised of multiple films will provide an effective index of refraction for the overall stack 742 that depends at least partly on the thickness of the individual layers in the film structure 742, the index of refraction of each of the layers in the film structure 742, and on the thicknesses and indices of refraction of the interfacial layers between the individual layers in the film structure, among other factors Additionally, the effective index of refraction of the overall film structure of the lower waveguide core 742 will depend on the method of formation or deposition of the constituent films and the stoichiometry of the films, among other factors, such as impurities and dopants present in the film structure.

In other embodiments, the lower waveguide core 742 has a repeating stack 742b of more than two dielectric films in which the constituent films 745-747 within the repeating structure 742b are of differing refractive indices, and in some embodiments, of the same or differing thicknesses. In an exemplary embodiment, repeating stack 742b includes a first film 745 of 400 nm of silicon oxynitride with an index of refraction of 1.6, a second film 746 of 500 nm of silicon oxynitride with an index of refraction of 1.65, and a third film 747 of 50 nm of silicon oxynitride with an index of refraction of 1.7. Repeating stack 742b in embodiments is repeated multiple times to provide the ultimate thickness of the first core 742 of the dual core waveguide structure 760.

In yet other embodiments, repeating stack 742c of the lower waveguide core 742 includes more than three layers for which the index of refraction, and in some embodiments the thickness, for the constituent layers is varied to achieve the total film thickness of the lower waveguide core structure 742. In the inset (ii) in FIG. 7a, film structure 742c shows embodiments for which the repeating stack 742c in the lower core 742 is comprised of a first layer 748i, a second layer 748ii, a third layer 748iii, and additional layers through 748n, where n is the nth layer of a multilayer repeating structure 742c comprising the repeating stack 742c. The repeating stack 742c is formed and repeated, wholly or in part, as necessary until an ultimate thickness is provided for the lower core 742 of the dual core waveguide 760. In an exemplary embodiment in which a large number of individual layers 748i-748n is used to form the lower core 742 of the dual core waveguide 760, for which the overall thickness of the lower waveguide core 742 is 9 microns, a repeating stack of 45 constituent layers of 100 nm each (in which case n=45) is used in which the repeating structure 742c need only be repeated twice to achieve the overall thickness. In yet other embodiments, the repeating structure 742c of the lower waveguide core dielectric stack 742 has a layered film structure that does not repeat because the total number of constituent films in the repeating stack provides the overall film thickness for the lower core 742 of the dual core waveguide 760 (for example, for 100 nm thick films, n=90). By contrast in an embodiment, for example, in which the repeating film structure 742a has two constituent films (n=2) with a combined thickness of 600 nm, the stack is repeated 15 times to reach an overall thickness of 9 microns for the dielectric film stack 742. Multiple layers in the repeating structure 742a-742c can facilitate a reduction in stress in the lower waveguide core 742, and ultimately in the overall dielectric film structure 700 in comparison to bulk films. That is, the number of layers that comprise the lower core 742 of the dual waveguide structure 760 facilitates a means for controlling the stress levels in the overall structure 700. The programmability of modern production equipment for the deposition of dielectric films has enabled wide flexibility in the number and thickness of films that can be programmed into a process recipe for the formation of film structures. This capability of modern film-deposition production equipment enables the formation of both large numbers of films, as in embodiments for repeating structure 742c comprised of layers 748n for which n can be a large number, and of large numbers of repetitions of multilayer film sets as in repeating structure 742a, comprised of a pair of films that is repeatedly deposited or otherwise formed a large number of times to achieve the required film thickness of the bottom waveguide core 742. A large number of films, for example, can be on the order of 10's of different layers, or more. In some embodiments, for example, the thickness and stoichiometry in every layer can be different from every other layer, and for structures with very thin layers, on the order of 10 nm for example, the number of films can be on the order of a hundred layers for a 10 micron thick waveguide core 742.

In other embodiments of the lower core 742 of the dual core waveguide 760, the repeating film structure is a composite structure of multiple repeating stacks. In embodiments, repeating structures comprised of multiple two-layer repeating structures 742a are used to form the lower waveguide core 742. For example, the repeating film structure 742a for an embodiment in which the first layer 743 is 900 nm and the second layer 744 is 50 nm has a total two-layer repeating stack thickness 742a of 950 nm, and when combined with a second two-layer repeating film structure 742a for an embodiment in which the first layer 743 is 800 nm and the second layer 744 is 60 nm, for a combined thickness of 860 nm, the resulting overall combined film thickness, when repeated 5 times, will provide a total thickness for the lower core 742 of 9050 nm ((900 nm+50 nm)+(800 nm+60 nm)× 5=9050 nm)). In embodiments, variations in the makeup of the lower core 742 provides a high level of flexibility in minimizing the resulting stress levels in the lower waveguide core 742 and the overall dual waveguide structure 700, and for controlling the effective index of refraction of the resulting lower waveguide core 742. In an embodiment, the effective index of refraction for the lower waveguide core 742 comprised of multiple two-layer repeating structures 742a is 1.6. In another embodiment, the effective index of refraction for the lower waveguide core 742 comprised of multiple two-layer repeating structures 742a is 1.65. In yet other embodiments, the effective index of refraction for the lower waveguide core 742 comprised of multiple two-layer repeating structures 742a is less than the refractive index of the upper core 754 of the dual core waveguide 760. And in yet other embodiments, the effective index of refraction for the lower waveguide core 742 comprised of multiple two-layer repeating structures 742a is in the range of approximately 1.4 to 2.0.

In other embodiments, the repeating two-layer stack 742a is combined with a three-layer stack 742b to provide a combined five-layer repeating stack. In yet other embodiments, other combinations of one or more two-layer repeating stacks 742a are combined to provide a combined multilayer repeating stack. In yet other embodiments, one or more two-layer repeating stacks 742a are combined with one or more three-layer repeating stacks 742b to provide a combined multilayer repeating stack. And in yet other embodiments, one or more two-layer repeating stacks 742a are combined with one or more three-layer repeating stacks 742b and one or more multilayer stacks 742c to provide a combined multilayer repeating stack. In embodiments, variations in the makeup of the lower core 742 provides a high level of flexibility in minimizing the resulting stress levels in the lower waveguide core 742 and the overall dual waveguide structure 700, and for controlling the effective index of refraction of the resulting lower waveguide core 742. In an embodiment, the effective index of refraction for the lower waveguide core 742 comprised of combinations of multiple repeating structures 742a-742c is 1.6. In another embodiment, the effective index of refraction for the lower waveguide core 742 comprised of multiple combinations of repeating structures 742a-742c is 1.65. In yet other embodiments, the effective index of refraction for the lower waveguide core 742 comprised of multiple repeating structures 742a-742c is less than the refractive index of the upper core 754 of the dual core waveguide 760. And in yet other embodiments, the effective index of refraction for the lower waveguide core 742 comprised of multiple repeating structures 742a-742c is in the range of 1.4 to 2.0.

Generally, the overall thickness of the lower core 742 in embodiments provides low optical loss for optical signals transmitted through the resulting dual core waveguide structure 760. The multilayer structure ensures low stress in the resulting film structure and enables thick waveguides (2000 nm to 25000 nm) to be formed. Waveguide structures 742 are thus sufficiently thick to enable transmission of the optical signals with little interaction of the transmitted optical signals with the substrate, interaction levels that could lead to undesired attenuation of the transmitted signals. Additionally, first core 742 of the dual core waveguide 760 is thickness-matched in some embodiments to the cores of mounted optical fibers 580 that are mounted on, or are located in proximity to, the substrate, interposer, or submount assembly. Alternatively, in embodiments, in which the first core 742 of the dual core waveguide 760 is aligned to receive signals from mounted optoelectrical devices, the thickness of first core 742 of the dual core waveguide 760 is thickness-matched to substantially receive a signal from the optoelectrical devices from which the signals are received.

It is to be understood that the thickness, the number of films, and the refractive index for the films in dielectric stack 760 can vary and remain within the scope of the current invention. The refractive index of silicon oxynitride films can vary in the range of 1.4 to 2.02. As the concentration of nitrogen in deposited silicon oxynitride films is minimized, the refractive index approaches the index of refraction of silicon dioxide, 1.445. Conversely, as the concentration of oxygen is minimized in the deposited films, the refractive index approaches the index of refraction of silicon nitride, 2.02. The index of refraction can thusly be varied in the range of 1.445 to 2.02 by varying the stoichiometric concentration of silicon, oxygen, and nitrogen in each of the deposited layers, and in the overall film structure of the lower waveguide core 742. In embodiments, the index of refraction for the constituent films 743, 744 in the repeating dielectric film stack 742a, for example, are varied in the range of 1.445 to 2.02 to produce thick film structures of 2000 to 25000 nm, or greater, and that provide low stress and low optical signal losses, in the dielectric film stacks 700. And in yet other embodiments, a distribution of the index of refraction of the films in the lower waveguide core 742 is provided. In an embodiment, for example, the first layer in the lower waveguide core 742 is deposited with a low value, 1.6 for example, and the index of refraction for subsequently deposited layers in the stack above this first layer is progressively increased until the midpoint or approximate midpoint in the thickness of the lower waveguide core 742 is reached. At or near the midpoint of the film structure of the lower waveguide core 742, the index of refraction is greater than the first layer, say 1.7 for example. Then, in subsequently deposited films in the lower waveguide core 742, above the midpoint, the index of refraction is progressively decreased until the top layer of the bottom waveguide core 742 structure is reached. In this example, the profile of the index of refraction is varied, such that a profiled structure in the index of refraction is formed. Other profiles can also be formed in other exemplary embodiments. Alternatively, the thickness of the films in the structure can be varied, and in yet other embodiments, both the thickness and the index of refraction can be varied.

In an embodiment, the lower core 742 includes a repeating stack 742a with a first layer 743 of silicon oxynitride with thickness of 60 nm and an index of refraction of 1.7 and a second layer 744 of silicon oxynitride with thickness of 500 nm and an index of refraction of 1.65. Repeating dielectric stack structure 742a is repeated in an embodiment 13 times for a total thickness for dielectric film stack 742 of 7280 nm. It is to be understood that the total number of repeating film stacks 742a can vary. In some embodiments, the number of repeating film stacks 742a is three to twenty. In some other embodiments, the repeating film stack 742a is such to produce a total dielectric film structure 742 that in some embodiments is greater than 2000 nm in thickness and in some embodiments less than 25000 nm. In yet other embodiments, the total dielectric film structure 742 is in the range of 8000 to 12000 nm. In yet other embodiments, the number of repeating film stacks is two or more and the thickness of the lower core 742 is greater than 2000 nm and less than 25000 nm. In yet other embodiments, the lower core 742 of the dual core planar waveguide structure 760 is thickness matched to substantially receive an optical signal from a mounted optical fiber 580 or an optoelectrical device that is used to deliver a signal to the lower core 742 of the dual core waveguide structure 760.

In some embodiments, the thickness for the first film 743 is in the range of 5 nm to 1000 nm. In some other embodiments, the thickness of the second film 744 is in the range of 5 nm to 1000 nm. In these and other embodiments, the thickness of the dielectric film structure 742, which is the sum of the thicknesses of the repeating film structures 742a, is greater than 2000 nm in thickness. In yet other embodiments, the thickness of the sum of the repeating film structures 742a is in the range of 4000 to 10000 nm. In yet other embodiments, the thickness of the sum of the repeating film structures 742a is thickness-matched or substantially thickness-matched to the core of a mounted optical fiber 580 or to the size of an optical signal 502 from an optoelectrical or optical device from which the lower core of the planar waveguide 742 receives all or a portion of the signal.

It is to be understood that the number of films, the film thicknesses, the refractive indices, and the resulting composition of the films in the lower core 742 can be varied and remain within the spirit and scope of the inventive dual core waveguide structure 760. In embodiments, the use of a multiplicity of films provides low stress and low optical loss for signals transmitted through waveguides that are fabricated from the inventive dielectric stack structure in the dual core waveguide structure 760. In this regard, in some embodiments, an initial repeating film structure 742a is used for two or more of the films in the dielectric stack 742, and a different repeating film structure 742a is used for another two or more films in the same dielectric film structure to produce the lower core 742. It is to be further understood that an initial repeating film structure 742a can be used for two or more of the films in the lower core 742, and a different repeating film structure 742a, can be used for another two or more films, and then any number of additional repeating film structures 742a with the same or different repeating film structures can be used for two or more additional films in the film structure 742 and remain within the scope and spirit of the embodiments. In the foregoing discussion, the variations in the first film 743 and second film 744 can be produced with one or more variations in the refractive index, the thickness, and the composition or stoichiometry of the films.

It is also to be understood that in some embodiments, first film 743 in the repeating film structure 742a can include one or more films and remain within the scope of the invention. In an embodiment, first film 743 in repeating film structure 742a, for example, is 500 nm in thickness with a refractive index of 1.7. In another embodiment, first film 743 includes a first part that is 250 nm in thickness with a refractive index of 1.7 and a second part that is 250 nm in thickness with a refractive index of 1.65. In yet another embodiment, the first film 743 in the repeating film structure 742a has a refractive index of 1.68 with a first partial thickness that is 250 nm and a second partial thickness that is deposited in a separate process step from the first, for example, and that is also 250 nm in thickness for a combined thickness of 500 nm for the two partial films of the first film 743 of repeating film structure 742a.

In some embodiments, the first film 743 has a graded refractive index or stoichiometric composition. Gradations in the composition of the first film 743 of the repeating film structure 742a, for example, remain within the scope of the current invention. In some embodiments, the refractive index varies through part or all of the thickness of the first film 743. Similarly, in some embodiments, the stoichiometric composition varies through part or all of the thickness of the first film 743. Variations in the refractive index or the stoichiometric composition of the first film 743 within the thickness of this film remain within the scope of the current invention.

It is also to be understood that in some embodiments, second film 744 in the repeating film structure 742a can include one or more films and remain within the scope of the invention. In an embodiment, second film 744 in repeating film structure 742a, for example, is 500 nm in thickness with a refractive index of 1.7. In another embodiment, second film 744 includes a first part that is 250 nm in thickness with a refractive index of 1.7 and a second part that is 250 nm in thickness with a refractive index of 1.65. In yet another embodiment, the second film 744 in the repeating film structure 742a has a refractive index of 1.68 with a first partial thickness that is 250 nm and a second partial thickness that is deposited in a separate process step from the first, for example, that is also 250 nm for a combined thickness of 500 nm for the two partial films of the second film 744 of the repeating film structure 742a.

In some embodiments, the second film 744 has a graded refractive index or stoichiometric composition. Gradations in the composition of the second film 744 of the repeating film structure 742a, for example, remain within the scope of the current invention. In some embodiments, the refractive index varies through part or all of the thickness of the second film 744. Similarly, the stoichiometric composition varies through part or all of the thickness of the second film 744. Variations in the refractive index or the stoichiometric composition of the second film 744 within the thickness of this film remain within the scope of the current invention.

In yet other embodiments, the extent of the gradations in the first or second film can be such that the first or second film need not be included. That is, in some embodiments, a single layer repeating structure 742a is formed by grading the stoichiometry of the film 743 and then repeating the deposition of the graded layer 742a until the full thickness of the lower waveguide core is formed. And in yet other embodiments, one or more graded single layers 743 with one or more gradation in one or more film properties comprise the repeating structure 742a-742c to form the full thickness of the lower core 742 of the dual waveguide structure 760.

In some embodiments, repeating structure 742 has an unequal number of first layers 743 and second layers 744. In some embodiments, repeating structure 742a includes a first layer 743 positioned between two second layers 744.

In embodiments, top spacer layer 750 is one or more layers of silicon oxide or silicon oxynitride as shown in inset (iii) FIG. 7b. In some embodiments, single spacer layer 750a is a layer of one type of material, such as silicon dioxide. In other embodiments, single spacer layer 750a is a layer of silicon oxynitride. In yet other embodiments, the single spacer layer 750a is a layer of silicon oxynitride with refractive index of 1.55 and with a thickness of 500 nm. In yet other embodiments, the single spacer layer 150a is a layer of silicon oxynitride with refractive index of 1.6 and with a thickness of 500 nm. In yet other embodiments, single spacer layer 750a is a layer of silicon oxynitride with thickness in the range of 0 to 1000 nm. Although in some embodiments, a spacer layer 750*a* is included in the structure, in some other embodiments, the spacer layer 750 can be combined with other layers above or below the spacer layer, can be made very thin, or is not included.

In some embodiments, spacer layer 750 is a composite spacer layer 750*b* of one or more layers of silicon oxynitride or silicon dioxide. In an embodiment, composite spacer layer 750*b* includes two layers of silicon oxynitride with thicknesses of 250 nm and with an effective refractive index of approximately 1.55. In some embodiments, the sum of the thicknesses of the two layers in composite spacer layer 750*b* is in the range of 0 to 1000 nm.

Similarly, in some embodiments, the spacer layer 750 is a composite layer 750*c* of three or more layers with the same or different thicknesses and refractive indices, that when combined, provide a total thickness in the range of 0 nm to 1000 nm and an effective refractive index in the range of 1.4 to 2.02. The index of refraction of the spacer layer, in some embodiments, is 1.6. In some other embodiments, the index of refraction of the spacer layer is less than the index of refraction of the lower core. In other embodiments, the index of refraction of spacer layer 750, relative to the index of refraction of the lower core 742 of the dual core waveguide 760, is such that the optical signal is weakly coupled between the upper core 754 and lower core 742 of the dual waveguide structure. In some embodiments, the index of refraction of spacer layer 750, or the index of refraction of the composite layer for embodiments with a composite spacer layer 750*c*, is greater than the index of refraction of the lower core 742 to promote the coupling or transfer of the optical signal from the lower core 742 of the dual core waveguide 760 to the upper core 754. Certain design parameters of the dual core waveguide 760 will affect the selection of the relative indices of refraction of the lower core 742, the spacer 750 between the upper core 754 and lower core 742, and the upper core 754 of the dual core waveguide 760, as well as the other layers in the overall structure of the dual core planar waveguide structure 760.

The thickness of the spacer layer 750 can vary, and in some embodiments, provides mechanical spacing required to align the upper waveguide core 754 to optoelectrical or optical devices in proximity to the upper waveguide core 754. In embodiments, the index of refraction is lower than that of the lower waveguide core 742 and the upper waveguide core 754. In other embodiments in which one or more of the lower waveguide core 742 and the upper waveguide core 754 is a composite structure comprised of multiple layers, the index of refraction of the spacer layer 750 is lower than that of the lower waveguide core 742 and the upper waveguide core 754. In some embodiments, the spacer layer 750 is a cladding layer for either or both of the lower waveguide core 742 and the upper waveguide core 754.

In some embodiments, the upper core 754 of the dual core waveguide 760 is a single layer of silicon oxynitride. In some embodiments, the upper core 754 of the dual core waveguide 760 is a single layer of silicon oxynitride with an index of refraction in the range of 1.4 to 2.02. In some embodiments the upper core 754 of the dual core waveguide 760 is formed of a multiplicity of films as described herein for the formation of the lower core 742 of the dual core waveguide 760. In embodiments, the upper core 754 of the dual core waveguide 760 is limited in thickness to maintain stable single mode propagation of the transmitted optical signal. The thickness of the upper waveguide core 754 that is required to provide stable single mode propagation can vary with the wavelength of the optical signals.

Generally, as the thickness of a planar waveguide is increased, the likelihood for a propagating optical signal in the dual waveguide structure to transition between multiple available and allowed modes increases. That is to say, that while the number of available propagation modes for a small waveguide can be limited in some configurations to a single propagation mode, the number of available propagation modes for larger waveguides increases as the cross-sectional area of a waveguide is increased. And, as the cross-sectional area of the larger waveguides is increased, and additional propagation modes become possible, the likelihood of a transition to one of these alternative propagation modes increases. It is therefore beneficial to limit the thickness of the upper waveguide core 754 to dimensions that are sufficiently large to enable single mode propagation yet not so thick as to enable propagation in undesirable higher order propagation modes. The range of thickness of the upper core 754 of the dual core waveguide 760, in embodiments, is such that the propagation mode is limited to that which is required by the photonic integrated circuit within which the dual core waveguide is implemented. In other embodiments, the range of thickness is limited to that which will provide single mode propagation of the optical signals for which the photonic integrated circuit is designed or utilized. The thickness of the upper waveguide core 754 that is required to provide stable single mode propagation can vary with the wavelength of the optical signals.

In embodiments, the upper core 754 of the dual core waveguide 760 is in the range of thickness from 0.5 to 2.5 microns for optical signals in the range of 1300 to 1600 nm. In other embodiments, the thickness of the upper core 754 of the dual core waveguide 760 is in the range of 0.25 to 5 microns. The actual thickness of the upper core 754 of the dual core waveguide 760 can vary depending on the specific application for which the dual core waveguide 760 is utilized, the distance of the pathway through which the optical signals must travel, and the amount of curvature in the optical waveguide core 754, for example. In embodiments, the index of refraction and the thickness of the upper core 754 of the dual core waveguide 760, are selected to enable single mode propagation for the wavelength of the propagating optical signal 502.

Additionally, in embodiments, the tapered region 557 of the dual core waveguide 560, along with or independently of other design elements, is used to aid in directing the optical signal 502 between the upper core 554 and lower cores 542 of the dual core waveguide 560 as required, and the thickness of the upper core 754 in the tapered region 557 will vary as described herein.

Referring again to FIG. 7, and to insets (ii) and (iii) in FIG. 7*a*, some embodiments of the upper core 754 are shown. In some embodiments, upper core 754 of the dual core waveguide 760 is one or more layers of silicon dioxide or silicon oxynitride. In other embodiments, the upper core 754*a* is a single layer of silicon oxynitride, 2000 nm in thickness, with an index of refraction of 1.7. In some embodiments, upper core 754*a* is a single layer of a single material, such as silicon dioxide. In yet other embodiments, the upper core 754*a* is a layer of silicon oxynitride with refractive index of 1.68 with thickness of 1800 nm. In yet other embodiments, upper core 754*a* is a layer of silicon oxynitride with thickness in the range of 500 to 2500 nm.

Upper core 754 in some embodiments is a composite layer 754*b* of one or more layers of silicon oxynitride or silicon dioxide. In an embodiment, composite upper core layer 754*b* includes two layers of silicon oxynitride with thicknesses of 1000 nm and with an effective refractive index of approximately 1.70. In some embodiments, the sum of the thicknesses of each of the two layers in composite upper core layer 754b is in the range of 1 to 1250 nm.

Similarly, the upper core layer 754 can be a composite layer 754c of three or more layers with the same or differing thicknesses and refractive indices, that when combined, provide a total thickness in the range of 500 nm to 2500 nm and an effective refractive index in the range of 1.4 to 2.02. Multiple layers in the upper core 754 of the dual waveguide structure can lead to a reduction in residual stresses in the dual waveguide structure 760, and therefore, by increasing the number of layers in some embodiments, the level of stress in the overall dual waveguide film structure 700 can be reduced or minimized relative to bulk films.

In embodiments, a stack of dielectric films forms an upper core 754 of the inventive dual core planar waveguide structure 760 through which optical signals can propagate. In some embodiments, the upper core 754 is a layered structure of silicon oxynitride films.

In some embodiments, the upper core 754 of the dual core waveguide 760 is a composite structure of silicon oxynitride films. In some embodiments, a stack of layers is used to form the upper core 754 similar to embodiments comprised of the stacks of layers described for the lower core 742 as in inset (ii) in FIG. 7a. The use of multiple layers such as repeating film structures 742a, 742b, and 742c can enable the formation of thick lower waveguide core structures 742 with low residual stress levels and with low optical loss characteristics. The low optical loss characteristics are of particular importance for planar waveguide applications. Similar approaches to those used in the formation of the lower waveguide 742 can be utilized in the formation of the upper waveguide 754 as described herein.

In an embodiment, the dielectric stack 754 has a repeating stack 754d of two dielectric films in which the constituent films within the repeating stack structure 754d are of differing refractive indices. Differences in the refractive indices can occur, for example, from changes in the stoichiometric composition of the films. In embodiments, the changes in the stoichiometry of the films in the repeating film structure 754d is accomplished with changes in one or more of the process conditions that include such parameters as gas flow, gas mixtures, power level, temperature, and pressure, among others, used in chemical vapor deposition processes for the formation of the films in the repeating film structure 754d. In an exemplary embodiment, the repeating stack structure 754d includes a first film 743 of 90 nm of silicon oxynitride with an index of refraction of 1.65 and a second film 744 of 50 nm of silicon oxynitride with an index of refraction of 1.7. In another embodiment, the repeating structure 754d includes a first film 743 of 40 nm of silicon oxynitride with an index of refraction of 1.7 and a second film 144 of 50 nm of silicon oxynitride with an index of refraction of 1.65. In yet another embodiment, the repeating structure 154d includes a first film 743 of 60 nm of silicon oxynitride with an index of refraction of 1.7 and a second film 744 of 100 nm of silicon oxynitride with an index of refraction of 1.65. It is to be understood that the order of the first film 743 and the second film 744 in embodiments can be reversed and remain within the scope and spirit of the invention. Multiple layers of the repeating stack 754d are deposited or otherwise formed to provide the ultimate thickness of the upper waveguide core 754.

In another embodiment, the dielectric stack 754 is formed from a repeating stack 754e of three two dielectric films in which the constituent films 745-747 within the repeating structure 754e are of differing refractive indices, and in some embodiments, of the same or differing thicknesses. In an exemplary embodiment, repeating stack 754e includes a first film 745 of 40 nm of silicon oxynitride with an index of refraction of 1.7, a second film 746 of 50 nm of silicon oxynitride with an index of refraction of 1.68, and a third film 747 of 20 nm of silicon oxynitride with an index of refraction of 1.65. In other embodiments, other combinations of film thicknesses and indices of refraction for each film in the repeating stack 754e are used. Multiple layers of the repeating stack 754e are deposited or otherwise formed to provide the ultimate thickness of the upper waveguide core 754.

In yet other embodiments, the repeating stack 754f of the upper core 754 includes more than three layers for which the index of refraction in each layer differs relative to adjacent layers to achieve the total film thickness of the upper core 754 of the dual core waveguide structure 760. In the inset (ii) in FIG. 7a, embodiments are shown for which the repeating stack 754f in the upper core 754 is comprised of a first layer 748i, a second layer 748ii, a third layer 748iii, and additional layers through 748n, where n is the nth layer of a multilayered upper waveguide core 754 comprised of multiple layers of the repeating stack 754f. The repeating stack 754f is formed and repeated, wholly or in part, as necessary until an ultimate thickness is provided for the upper core 754 of the dual core waveguide 760. In an exemplary embodiment in which a large number of individual layers 748i-748n is used to form the upper core 754 of the dual core waveguide 760, and for which the overall thickness of the upper waveguide core 754 is 2.4 microns, a repeating stack of 12 layers, each 100 nm in thickness (in which case n=12) is used in which the repeating structure 754f need only be repeated twice to achieve the overall upper waveguide core thickness of 2.4 microns.

In yet other embodiments, the repeating structure 754f of the upper waveguide core 754 has a layered film structure that does not repeat because the combined thickness of the films in the repeating structure 754f provides the overall film thickness for the upper core 754 of the dual core waveguide 760. In an exemplary embodiment, a repeating stack is comprised of 24 films, each 100 nm in thickness, and for which the total thickness of the repeating stack 754f corresponds to the thickness of the overall film stack of 2.4 microns (for 100 nm thick films, n=24). By contrast in an embodiment, for example, in which the repeating film structure 754f has two constituent films (n=2) with a combined thickness of 600 nm, the stack is repeated 4 times to reach an overall thickness of 2.4 microns for the upper waveguide film stack 754. Multiple layers in a repeating structure 754d-754f can facilitate a reduction in stress in the upper waveguide core 754, and ultimately in the overall dielectric film structure 700 in comparison to bulk films. That is, the number of layers that comprise the upper core 754 of the dual waveguide structure 760 facilitates a reduction in the stress levels in the overall structure 700. The programmability of modern production equipment for the deposition of dielectric films has enabled wide flexibility in the number and thickness of films that can be programmed into a process recipe for the formation of film structures. This capability of modern film-deposition production equipment enables the formation of both large numbers of films, as in embodiments for repeating structure 754f comprised of layers 754i through 754n, for which n is a large number, and of large numbers of repetitions of multilayer film sets as in repeating structure 754b, comprised of a pair of films that is repeatedly deposited or otherwise formed a large number of times to achieve the required film thickness of the upper waveguide core 754.

Further clarification is provided with a comparison of embodiments comprised of a two-layer repeating structure 754d and a six-layer repeating structure 754f. In embodiments, for example, for which the repeating film structure 754d has two constituent films of 300 nm each for a combined thickness of 600 nm, the stack must be repeated 3 times to obtain an overall thickness of 1.8 microns for the upper waveguide core 754. (2 layers/repeating structure×3 repetitions=6 total layers in waveguide 754); also (2×300 nm=600 nm×3 repetitions=1.8 microns.)) By comparison, in embodiments for which the overall thickness of the upper waveguide is also 1.8 microns, a repeating stack 754f of six constituent layers of 150 nm each requires that the overall repeating structure need only be repeated twice to achieve the targeted upper core thickness of 1.8 microns ((6 layers/repeating structure×2 repetitions=12 total layers in waveguide 754); also, (6×150 nm=900 nm×2 repetitions=1.8 microns.))

In yet other embodiments, the repeating structure 754f of upper core 754 has a layered film structure that does not repeat because the total number of films in the repeating stack provides the overall film thickness for the full thickness of the upper core 754. For example, in an embodiment for which the upper waveguide core is 2 microns, a repeating stack 754f comprised of 20 layers of silicon oxynitride that are 100 nm in thickness each, does not require any repetitions to provide the targeted thickness of the upper core 754.

In some embodiments of the upper core 754 of the dual core waveguide 760, the repeating film structure 754f is a composite structure of repeating stacks. In embodiments with a repeating stack structure, the overall thickness of the upper core 754 is the combined thickness of the repeating stack 754d, 754e, 754f multiplied by the number of times that the repeating stack is repeated. For example, the repeating film structure 754d for an embodiment in which the first layer 743 is 100 nm and the second layer 744 is 50 nm has a total repeating stack thickness of 150 nm and when repeated 10 times, the resulting combined film thickness for the upper core stack 754 is 1500 nm ((100 nm+50 nm)× 10=1500 nm)). Similarly, in another embodiment, the repeating film structure 754d, which has a first layer 743 that is 40 nm with a refractive index of 1.7, and which has a second layer 744 that is 50 nm in thickness with a refractive index of 1.65, has a combined thickness of 90 nm, and when repeated 20 times, has a resulting combined film thickness for an upper core thickness of 1800 nm ((50 nm+40 nm)× 20=1800 nm)).

Generally, the overall thickness of the upper core 754 is such that the propagation of optical signals in the upper core 754 is limited to a single propagation mode. The use of multiple film layers in the upper core 754 of the dual core waveguide 760 can provide low stress in the resulting film structure and enables thick dual core waveguide structures 700 to be formed.

It is to be understood that the thickness, the number of films, and the refractive index for the films in the upper core 754 can vary and remain within the scope of the current invention. The refractive index of silicon oxynitride films can vary in the range of 1.4 to 2.02. As the concentration of nitrogen in deposited silicon oxynitride films is minimized, the refractive index approaches the index of refraction of silicon dioxide, 1.445. Conversely, as the concentration of oxygen is minimized in the deposited films, the refractive index approaches the index of refraction of silicon nitride, 2.02. The index of refraction can thusly be varied in the range of 1.445 to 2.02 by varying the stoichiometric concentration of silicon, oxygen, and nitrogen in the deposited films. In embodiments, the index of refraction for the constituent films 743, 744 in the upper core 754, for example, are varied in the range of 1.445 to 2.02 to produce film structures of approximately 500 to 2500 nm, and that provide low stress and low optical signal losses. In some embodiments, the index of refraction, and in some embodiments the effective index of refraction, in the upper core 754 is greater than the index of refraction or effective index of refraction of the lower core 742.

In other embodiments, the upper core 754 of the dual core waveguide 760 includes a repeating stack 754d with a first layer 743 of silicon oxynitride with thickness of 60 nm and an index of refraction of 1.7 and a second layer 744 of silicon oxynitride with thickness of 50 nm and an index of refraction of 1.68. Repeating stack structure 754d is repeated in an embodiment 20 times for a total thickness for the upper core 754 of 2200 nm. It is to be understood that the total number of repeating film stacks 754d can vary. In some embodiments, the number of repeating film stacks 754d is three to twenty. In some other embodiments, the repeating film stack 754d is such to produce a total thickness of the upper core 754 that in some embodiments is greater than 500 nm in thickness and in some embodiments less than 3000 nm. In yet other embodiments, the total thickness of the upper core 754 is in the range of 800 to 2000 nm. In yet other embodiments, the number of repeating film stacks is two or more and the thickness of the upper core 754 is greater than 100 nm and less than 5000 nm.

In some embodiments, the thickness for the first film 743 is in the range of 5 nm to 1000 nm. In some other embodiments, the thickness of the second film 744 is in the range of 5 nm to 1000 nm. In these and other embodiments, the thickness of the upper core 754, which is the sum of the thicknesses of the repeating film structures 754d-754f, is greater than 2000 nm.

In some embodiments, an initial repeating film structure is used for two or more of the films in the upper core 754, and a different repeating film structure is used for another two or more films in the same dielectric film structure to produce the overall repeating film structure 754f of the upper core 754. It is to be further understood that an initial repeating film structure can be used for two or more of the films in the upper core 754, a different repeating film structure, can be used for another two or more films in the same dielectric film structure of the upper core 754, and then any number of additional repeating film structures with the same or different repeating film structures can be used for two or more additional films to produce composite repeating structure 754f for the upper core dielectric film structure 754 and remain within the scope and spirit of the embodiments. In the foregoing discussion, the variations in the first film 748 and second film 749 can be produced with one or more variations in the refractive index, the thickness, and the composition or stoichiometry of the films.

It is also to be understood that in some embodiments, first film 743 in the repeating film structure 754d can include one or more films and remain within the scope of the invention. In an embodiment, first film 743 in repeating film structure 754d, for example, is 50 nm in thickness with a refractive index of 1.7. In another embodiment, first film 743 includes a first part that is 250 nm in thickness with a refractive index of 1.7 and a second part that is 250 nm in thickness with a refractive index of 1.65. In yet another embodiment, the first film 743 in the repeating film structure 754d has a refractive index of 1.68 with a first partial thickness that is 250 nm and a second partial thickness that is deposited in a separate process step from the first, for example, and that is also 250 nm in thickness for a combined thickness of 500 nm for the two partial films of the first film 743 of repeating film structure 754d.

In some embodiments, the first film 743 has a graded refractive index or stoichiometric composition. Gradations in the composition of the first film 743 of the repeating film structure 754d, for example, remain within the scope of the current invention. In some embodiments, the refractive index varies through part or all of the thickness of the first film 743 used in the formation of the repeating stack structures for the upper core 754. Similarly, in some embodiments, the stoichiometric composition varies through part or all of the thickness of the first film 743. Variations in the refractive index or the stoichiometric composition of the first film 743 within the thicknesses of these films remains within the scope of the current invention for the upper core 754 of the dual core waveguide structure 760.

It is also to be understood that in some embodiments, second film 744 in the repeating film structure 754a can include one or more films and remain within the scope of the invention. In an embodiment, second film 744 in repeating film structure 754d, for example, is 500 nm in thickness with a refractive index of 1.7. In another embodiment, second film 744 includes a first part that is 250 nm in thickness with a refractive index of 1.7 and a second part that is 250 nm in thickness with a refractive index of 1.65. In yet another embodiment, the second film 744 in the repeating film structure 754d has a refractive index of 1.68 with a first partial thickness that is 250 nm and a second partial thickness that is deposited in a separate process step from the first, for example, that is also 250 nm for a combined thickness of 500 nm for the two partial films of the second film 744 of the repeating film structure 754d.

In some embodiments, the second film 744 has a graded refractive index or stoichiometric composition. Gradations in the composition of the second film 744 of the repeating film structure 754d, for example, remain within the scope of the current invention. In some embodiments, the refractive index varies through part or all of the thickness of the second film 744. Similarly, the stoichiometric composition varies through part or all of the thickness of the second film 744. Variations in the refractive index or the stoichiometric composition of the second film 744 within the thickness of this film remain within the scope of the current invention for the upper core 754 of the dual core waveguide 760.

In some embodiments, the repeating structure used in the formation of the upper core 754 of the dual core waveguide 760 has an unequal number of first layers 743 and second layers 744. In some embodiments, repeating structure 742 includes a first layer 743 positioned between two second layers 744.

Optional top layer 758 is one or more layers of a dielectric material such as silicon dioxide, for example. Optional layer 758, in some embodiments is a layer of silicon dioxide with thickness of 200 nm and a refractive index of 1.445. In some embodiments, the film thickness of the top layer is in the range of 0 to 5000 nm. In some embodiments, silicon oxynitride is used in the optional top layer 758. In embodiments, the index of the refraction of the optional layer 758 is lower than the index of refraction of the adjacent underlayer 754. In some embodiments, the upper layer is a waveguide cladding layer. In yet other embodiments, another dielectric material or combination of materials such as silicon nitride, aluminum nitride, or aluminum oxide is used. In yet other embodiments, no optional top layer 758 is provided in the stack 700. In yet other embodiments, the optional layer 758 is a portion of a hermetic seal that is formed on the planar waveguide structure 700.

Referring to FIG. 7b, a three-dimensional perspective view of the exemplary structure shown in FIG. 7a is shown. The arrow in FIG. 7b shows the typical direction of propagation for optical signals traveling along the axis of a planar waveguide structure formed from embodiments of the stacked film structures as described herein.

Figure 8:
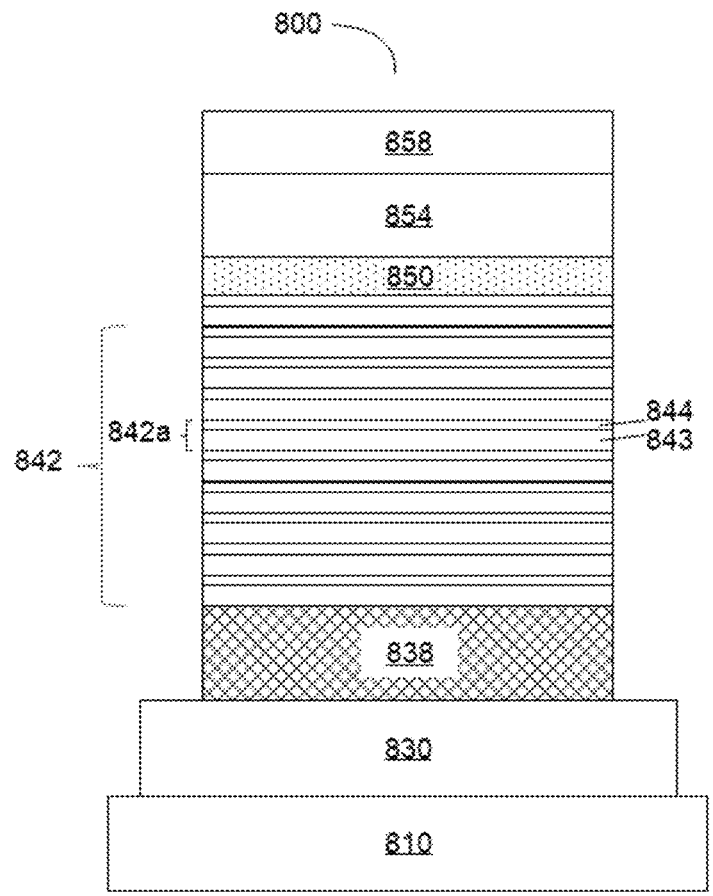
FIG. 8. Cross sectional schematic drawing of an exemplary dual core waveguide structure.

In FIG. 8, a cross-sectional schematic illustration is shown for an exemplary embodiment of the inventive dual waveguide structure 800. FIG. 8 shows some specific features and layers in an embodiment of the dual waveguide structure 800. A thick buffer layer 830 is shown over a substrate 810. In this exemplary embodiment, the substrate 810 is, for example, a silicon substrate. In other embodiments, the same or other substrates are used. In an exemplary embodiment, the buffer layer 830 is a layer of silicon dioxide that is 5500 nm in thickness with an approximate index of refraction of 1.5. In other embodiments, silicon oxynitride or another material is used for the buffer layer 830. In yet other embodiments, other thicknesses and other refractive indices are used for the buffer layer 830. Above the buffer layer 830 in FIG. 8 is a spacer layer 838. In the exemplary embodiment, the spacer layer 838 is a layer of silicon oxynitride, 500 nm in thickness with an index of refraction of 1.6. Above the spacer layer 838 is lower waveguide core 842 consisting of repeating structure 842a. The repeating structure 842a is comprised of a first layer 843 and a second layer 844. In an exemplary embodiment, the first film 743 is a silicon oxynitride film with a thickness of 900 nm an index of refraction of 1.6 and a second silicon oxynitride film 744 with a thickness of 50 nm and an index of refraction of 1.7. The repeating structure 842a is repeated ten times to form the lower core 842 of the exemplary embodiment of the dual core waveguide 860 with a thickness of 9.5 microns. Above the lower core 842 of the dual core waveguide 860 is a spacer layer 850. In the exemplary embodiment, the spacer layer 850 is a layer of silicon oxynitride with an index of refraction of 1.6 and a thickness of 200 nm. In other embodiments, other spacer layer thicknesses are used with either higher or lower indices of refraction. Above the spacer layer 850 in the exemplary embodiment, is the upper waveguide core layer 854 of the dual core waveguide 860. In the exemplary embodiment, the upper core 854 is a silicon oxynitride layer with an index of refraction of 1.7 and a thickness of 2000 nm. Above the upper waveguide core 854 in the exemplary embodiment shown in FIG. 8 is top layer 858. In this exemplary embodiment of a dual core waveguide structure 800, the top layer is a silicon oxynitride cladding layer, 900 nm in thickness, with an index of refraction of 1.6. In other embodiments, other thicknesses of the top layer are used with the same or other indices of refraction.

Figure 9:
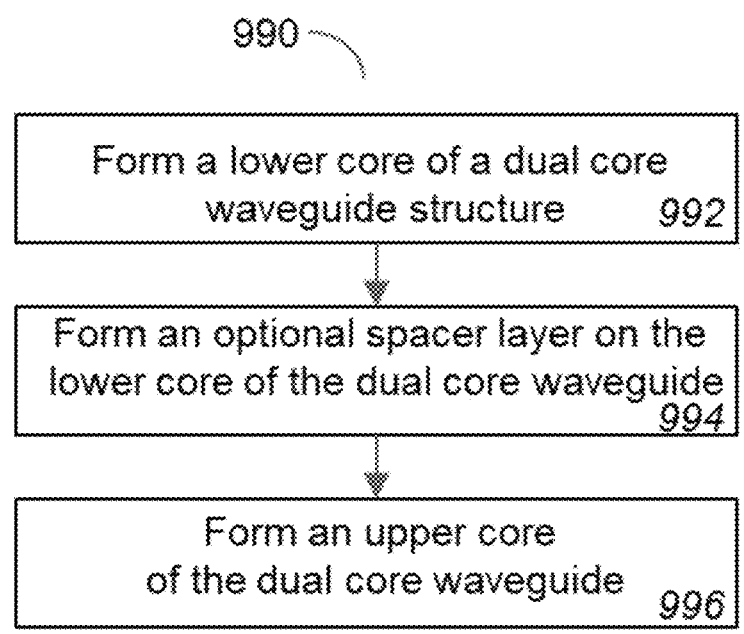
FIG. 9. Process flow diagram for the formation of embodiments of the dual core waveguide.

In FIG. 9, flow diagram 990 is shown for the formation of the inventive dual core waveguide 700 for some embodiments. In the flow chart 990, a first core of the dual core waveguide structure 700 is a lower waveguide core 742 and this first core 742 is formed 992 on substrate 710. In some embodiments, one or more of a buffer layer 730 and a bottom spacer layer 738 is formed on the substrate 710 prior to the formation of the lower core 742. A spacer layer formation step 994 follows the lower core formation step 992. In some embodiments, the spacer layer 750 influences the magnitude of the signal coupling between the lower core 742 and the upper core 754 of optical signals propagating in the dual core waveguide portion 760 of the waveguide structure 700. An upper core 754 is formed in upper core formation step 996 following the spacer layer formation step 994 to form a dual core waveguide 760 in some embodiments. The lower waveguide core 742, the spacer layer 750, and the upper core 754 form the primary structural components of the dual core waveguide structure 760. Specific details of the lower waveguide core 742, the spacer layer 750, and the upper waveguide core 754 of the dual core waveguide structure in embodiments are provided herein in the discussion of FIG. 7 and elsewhere.

Figure 10:
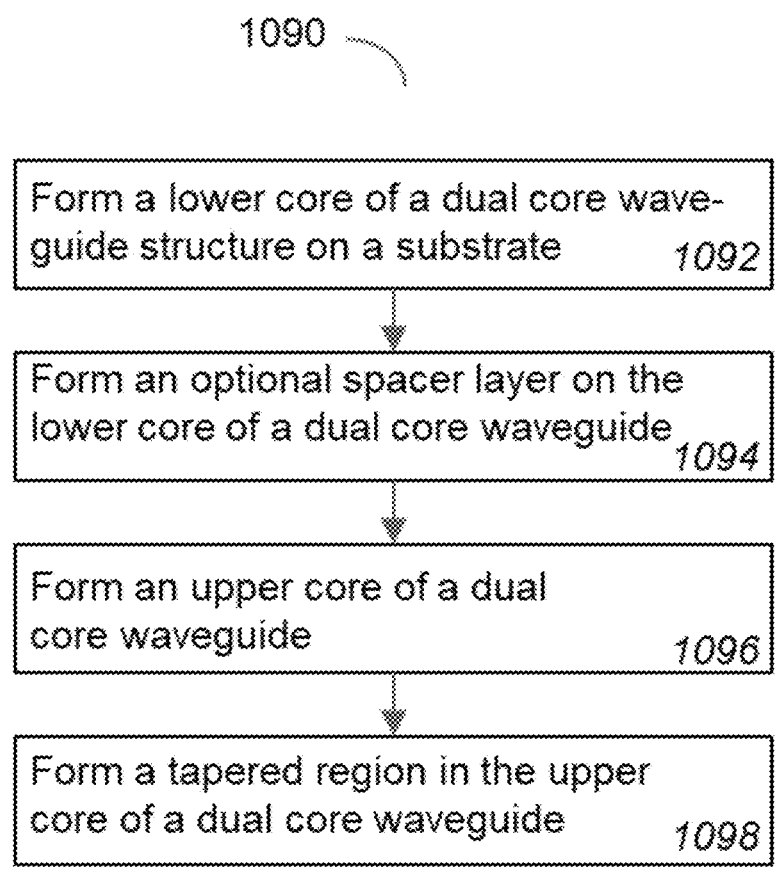
FIG. 10. Process flow diagram for the formation of embodiments of the dual core waveguide.

Referring to FIG. 10, a flow diagram 1090 for the formation of embodiments of the inventive dual core waveguide structure 700 in some embodiments that includes a tapered region 557, to facilitate the formation of an optical device such as a spot size converter, for example, is provided. In the flow diagram 1090, a first core of the dual core waveguide structure 700 is formed in first core formation step 1092 on a substrate 710. In embodiments, the first core of the dual core waveguide 700 is lower waveguide core 742. In some embodiments, one or more of a buffer layer 730 and a spacer layer 738 are formed on the substrate 710 prior to the formation of the bottom core 742 of the dual core waveguide 760. In some embodiments, a spacer layer 750 is formed on the first core 742 of the dual core waveguide structure 700 in spacer layer formation step 1094. The spacer layer 750, in some embodiments, can influence the magnitude of the coupling between the lower waveguide core 742 and the upper waveguide core 754 in the dual core waveguide structure 700. An upper core 754 of the dual core waveguide 700 is formed on the spacer layer 750 in upper core formation step 1096. Optional layers such as a top cladding layer 758 as described herein, are provided in some embodiments. Taper formation step 1098 of the upper core 754 of the dual core waveguide 700 follows the spacer layer formation 1096. The taper 557 in the upper waveguide core 754 enables the transition of optical signals from the lower waveguide core 742 to the upper core 754 of the dual core waveguide 700 in device structures such as a spot size converter. In regions in which the upper core 754 is thinned, to approximately 0.5 microns in some embodiments, the upper waveguide core 754 is weakly coupled to the lower core 742, and signals traveling in the dual core waveguide structure propagate substantially in the thick bottom core 742 of the dual waveguide structure. In the tapered portion 557 of the upper waveguide core 554, 754 of the dual core waveguide 700, in which the thickness of the upper core waveguide 754 increases in thickness along the path of the optical signals propagating in the optical circuit, as shown for example in FIG. 5, the coupling of the optical signal 502 between the lower waveguide core 742 and the upper waveguide core 754 is decreased to the extent that coupling between the upper core 754 and lower waveguide core 742 is eliminated, minimized, or reduced to an extent that signal processing is substantially independent of the lower core 742. The tapering of the upper core 754 of the dual core waveguide 700 can be an increasing taper, in which the upper waveguide thickness is increased, or a decreasing taper, in which the upper waveguide thickness is decreased, or both. Increasing or decreasing the thickness of the upper core 754 of the dual core waveguide 700 along the path of the optical signal influences the magnitude of the coupling between the two waveguide cores for optical signals propagating in the dual core waveguide structure 700.

One or more portions of the upper waveguide 754 is increased in thickness, and one or more portions of the upper waveguide 754 is decreased in thickness along the optical pathway in some embodiments as the requirements for the optical circuits that utilize the dual core waveguide necessitate.

Embodiments in which the part of the upper waveguide structure at one or more portions of the upper waveguide 754 is increased in thickness, and part of the upper waveguide structure at one or more portions of the upper waveguide 754 is decreased in thickness include optical devices such as spot size converters often used at the entry points and exit points of arrayed waveguides and other optical devices, for example. The dual core waveguide structure 800 with tapered sections 557 in the upper core 754 can function as a spot size converter. Spot size converters are frequently used in the conversion of the optical signal size from a large waveguide, such as an optical fiber, for example, to a smaller waveguide, such as a single mode planar waveguide.

Figure 11:
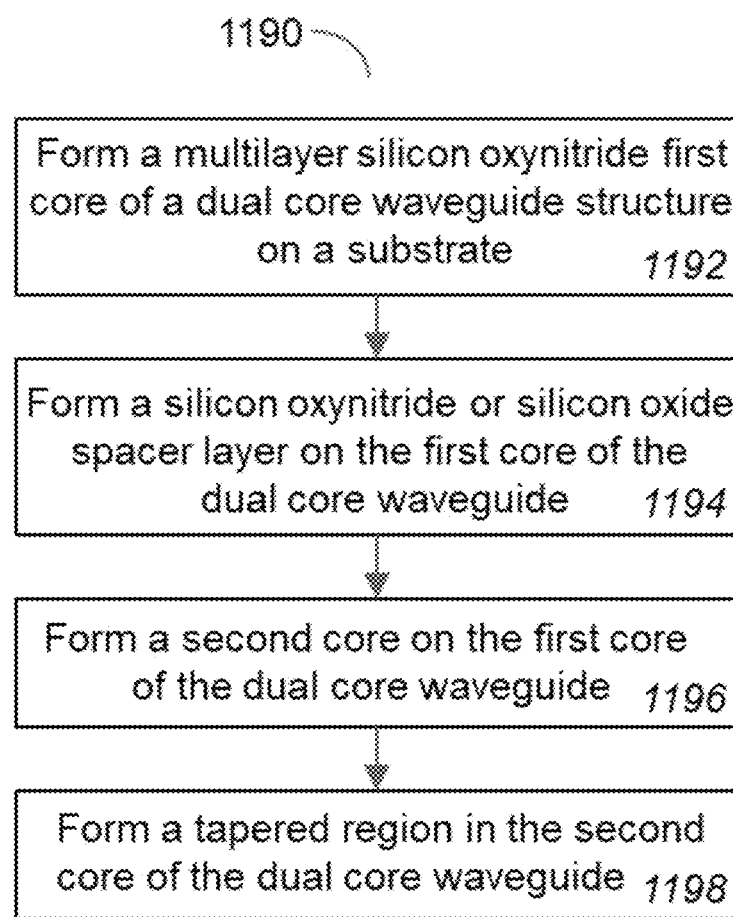
FIG. 11. Process flow diagram for the formation of embodiments of the dual core waveguide.

Referring to FIG. 11, a flow diagram 1190 for the formation of the inventive dual core waveguide 700 in some embodiments that includes a tapered region 557, to facilitate the formation of an optical device such as a spot size converter, for example, is provided. In the flow diagram 1190, a first core of the dual core waveguide structure 700 is formed in first core formation step 1192 on a substrate 710. In embodiments, the first core of the dual core waveguide 700 is lower waveguide core 742, and is formed from a layered structure of silicon oxynitride films. In some embodiments, one or more of a buffer layer 730 and a spacer layer 738 are formed on the substrate 710 prior to the formation of the bottom core 742 in bottom core forming step 1192 of the dual core waveguide 700. A spacer layer 750 of silicon oxynitride is formed on the first core 742 of the dual core waveguide structure 700 in spacer layer formation step 1194. The spacer layer 750, in some embodiments, influences the extent of the coupling between the lower waveguide core 742 and the upper waveguide core 754 of the dual core waveguide 700. An upper waveguide core 754 of the dual core waveguide 700 is formed on the spacer layer 750 in upper core formation step 1196. In some embodiments, the upper core 754 is a silicon oxynitride layer. In other embodiments, the upper core 754 is a polymer layer. In yet other embodiments, the upper core 754 is a dielectric material such as silicon dioxide. Optional layers such as a top cladding layer 758 as described herein, are formed on the upper waveguide core 754 in some embodiments. Taper formation step 1198 of the upper waveguide core 754 of the dual core waveguide 700 follows the upper core formation step 1196. The tapered section 557 in the upper waveguide core 754 enables the transition of optical signals from the lower waveguide core 742 to the upper core 754 of the dual core waveguide 700. In regions in which the upper core 754 is thinned, to approximately 0.5 microns in some embodiments, optical signals propagating in the upper waveguide core 754 can be weakly coupled to the lower waveguide core 742. In these regions with the thinned upper waveguide core 755, optical signals traveling in the dual core waveguide structure propagate substantially in the thick bottom core 742 of the dual waveguide structure. In the tapered portion 557 of the upper core 554, 754 of the dual core waveguide 700, in which the thickness of the upper core waveguide 754 increases in thickness along the path of optical signals propagating in the optical circuit, as shown in FIG. 5, the coupling of the optical signal between the lower waveguide core 742 and the upper waveguide core 754 is decreased to the extent that coupling between the upper core 754 and lower waveguide core 742 is eliminated, minimized, or reduced to an extent that signal processing is substantially independent of the lower core 742. The tapering of the upper core 754 of the dual core waveguide 700, in the direction of signal propagation, can be an increasing taper, in which the upper waveguide thickness is increased, or a decreasing taper, in which the upper waveguide thickness is decreased, or both. Increasing or decreasing the thickness of the upper core 754 of the dual core waveguide 700 along the path of the optical signal influences the magnitude of the coupling between the two waveguide cores for optical signals propagating in the dual core waveguide structure 700. For thin upper core layers of silicon oxynitride, of approximately 0.5 microns for example, optical signals propagating in the dual core structure 700 are weakly coupled in some embodiments. As the thickness is increased, to approximately 2 microns in the case of silicon oxynitride films, for example, optical signals that are transitioned through the tapered section 557 become substantially decoupled. Embodiments in which the part of the upper waveguide structure at one or more portions of the upper waveguide 754 is increased in thickness, and part of the upper waveguide structure at one or more portions of the upper waveguide 754 is decreased in thickness include optical devices such as spot size converters often used at the entry points and exit points of arrayed waveguides and other optical devices, for example. The dual core waveguide structure 700 with tapered sections 557 in the upper core 754 can function as a spot size converter. Spot size converters are frequently used in the conversion of the optical signal size from a large waveguide, such as an optical fiber, for example, to a smaller waveguide, such as a single mode planar waveguide.

Embodiments of the dual core waveguide 700 are enabled with thick waveguide formation steps such as those described herein for the silicon oxynitride materials. The dual waveguide structure 700 provides a means for substantially coupling a thick planar waveguide formed on a substrate to an optical fiber 580 or to an optical or optoelectrical device mounted in proximity to the planar waveguide. Optical signals are transferred from optical fibers, in some embodiments for example, to the thick planar lower cores. Signals propagating in the lower cores of the dual core structure 700 are weakly coupled to the upper core. Optical signal processing of the propagating signal is facilitated with the movement of the signal from the thick planar multimode lower core 742 of the dual core waveguide 700 to the single mode upper core 754 of the dual core waveguide 700 particularly for optical waveguides that require bends or curvature in the planar waveguide. Arrayed waveguides, for example, require curved pathways as a means for separating an optical signal comprised of multiple wavelengths into the constituent optical signals. In thin, single mode waveguides, the optical signals propagating through the portions of the optical devices in which the waveguides have curvature can be subject to signal degradation and loss. This loss in signal integrity in arrayed waveguides, as well as in other optical devices that have curved pathways, is reduced or eliminated in embodiments with the upper and lower cores of the dual core waveguide 700 allow for substantially decoupled signal propagation. Decoupling occurs in embodiments for thick upper waveguide cores of approximately two microns in cases for which silicon oxynitride is used to form the dual waveguide structure 700. The improvement in signal integrity is anticipated from the decoupling of the signals propagating in the two waveguide cores as the upper core 754 is increased in thickness from approximately 0.5 microns to approximately 2 microns in some embodiments.

In embodiments, the dual core dielectric film structures can be formed using chemical vapor deposition (CVD) methods, for example. Chemical vapor deposition (CVD) and plasma enhanced chemical vapor deposition (PECVD), for example, enable the formation of the dielectric stack structures described in FIG. 7. In embodiments, the formation of the dual core waveguide structures in FIG. 7 requires the capability to control the levels of stress in the stack structure to enable the required thicknesses for the bottom core 742 to substantially match to the diameter of aligned single mode fibers 580, for example.

The capability to control the measured film stress using PECVD in the formation of dielectric film stacks of silicon oxynitride is shown in FIG. 12. In FIG. 12*a*, the measured film stress is shown for a range of thicknesses for dielectric film stacks that were fabricated using PECVD. FIG. 12*a* shows that embodiments of a composite film structure can provide stress levels of approximately 20 MPa and less for embodiments as thick as approximately 18 microns. Low stress in films thicker than 18 microns are also possible. The effectiveness of the approach of utilizing a stacked structure of silicon oxynitride, or other dielectric materials, for forming thick waveguides in the range of practical interest is demonstrated with the data in FIG. 12*a*. Additional supporting data are provided in FIG. 12*b*, in which the variation in the measured stress for a set of films in which the refractive index was varied is shown. For the measured films from which the data is provided in FIG. 12*b*, the refractive index was varied by varying the gas flows in a PECVD silicon oxynitride deposition process. Each data point in FIG. 12*b* is obtained from a deposited film in which the gas mixture in the deposition process was varied in a controllable way relative to other films from which the data points in FIG. 12*b* were obtained. The data show, that by varying the gas flow, and hence the refractive index, the measured stress level in the deposited films can be varied over a wide range, and in a controllable manner. The variation in the refractive index, an easily measurable parameter, shows how the variation of a measurable characteristic of a film can affect the measured stress. The capability to control the measured stress is necessary in compensating for stresses in the film structure to produce an overall film stress for the stack structure. Stress levels of approximately 20 MPa or less are generally considered acceptable in thick planar waveguide structures. In embodiments, the approach of providing films with both tensile and compressive stresses into the overall film structure is utilized rather than an approach of attempting to deposit a single layer, for example, at the zero-stress intersection of the fitted line shown in FIG. 12*b*. Overall stress levels in composite film structures are kept within specified levels by varying the type of stress ("+" or "−" values of film stress as shown in FIG. 12*b*) and the thickness of each of the films as described in embodiments in FIG. 7 to alleviate the accumulation of stress for the thick film structures required for thick waveguides.

Although conceivably possible, relatively low stress levels are very difficult to achieve in films of a single thick layer of material such as silicon dioxide or silicon oxynitride. The introduction of the multilayer film structure, as described in FIG. 7, enables thick structures with low stress to be formed, however. In FIG. 12*b*, the measured stress levels for deposited silicon oxynitride films are shown for films of various refractive indices. As shown, the refractive index is a convenient means for assessing variations in film properties for deposited films. The capability to achieve control of the stress in the individual films over a wide range, allows for the fabrication of the thick dielectric film structures (1000-25000 nm, and greater) required for use as planar waveguides. In embodiments, stress levels are controlled in planar waveguide structures to minimize deformation of the substrates upon which the thick dielectric stacks are deposited and to prevent delamination of the films, for example. Using the capability to vary the stress in the films, stacks of layers can be formed in which stress in the growing film structure can be compensated for with stresses that counter the stress in the film. For example, if the stress at a given thickness is compressive, then a film with tensile stress can be deposited to compensate for the residual stress in the film. The use of the compensating films in the film stack as required to meet the overall residual stress specification, <20 MPa for example, offers an alternative to the growth of a single bulk film with low stress, and allows for the formation of very thick dielectric stack structures of up to 10 microns and greater. In addition to magnitude and type of stress in a given film, proper selection of the thickness of each of the deposited layers provides an additional means for controlling the ultimate stress in the overall stack structure 700.

In addition to the low stress levels required for optical communication applications, fabricated waveguides must also exhibit low optical losses. Optical loss is a measure of the reduction in the strength of an optical signal as it propagates through a waveguide or optical device. For practical applications, desirable loss specifications are typically less than 1 dB/cm for a planar waveguide, for example.

Referring to FIG. 13, measured optical losses from embodiments of the dielectric stack structures are shown. Optical signal losses for practical use in planar waveguide structures of less than approximately 1 dB/cm are desirable. FIG. 13*a* shows optical loss levels of less than approximately 1 dB/cm for a number of films for which the measured effective refractive indices are shown. In addition to the properties of the dielectric stack structure itself, the buffer layer also has an influence on the measured optical signal loss. FIG. 13*b* shows how the thickness of the buffer layer in some embodiments affects the measured optical losses. As the thickness of the buffer layer is increased in these embodiments, the resulting optical losses are reduced to values of much less than 1 dB/cm. The data in FIGS. 12 and 13 were obtained from single core waveguide structures fabricated from thick dielectric film structures that were not dual core waveguide structures, although the methods for controlling the stress in the upper waveguide core are similar to those used in the formation of single core waveguides.

Referring to FIG. 14, steps in the formation of embodiments of the dielectric films and film structures are provided. In FIG. 14*a*, forming step 1493 is a process of forming embodiments of the dielectric stack 700 of silicon oxynitride films at low temperature having low stress and low optical loss. Low temperature in FIG. 14*a* refers to the temperature of the deposition of the films used in the fabrication of the dielectric stacks, namely less than 500° C. in some embodiments, and in other embodiments, less than or approximately equal to 300° C. Low stress in FIG. 14*a* refers to stress levels in the deposited films in film structure 700 of less than or equal to approximately 20 MPa, either compressive or tensile. Low optical loss in FIG. 14*a* refers to optical losses in embodiments of deposited dielectric film stacks 700 of less than approximately 1 dB/cm. The forming step 1493 provides for the formation of thick structures of dielectric silicon oxynitride films with low stress, and suitable for use in the transmission of optical signals with low loss.

Referring to FIG. 14*b*, the forming steps 1495 in embodiments for which each individual layer in the dielectric stack 700 of silicon oxynitride films is deposited at low temperature, and with low stress and low optical loss is shown. Low temperature in FIG. 14*b* refers to the temperature of the deposition of the films used in the fabrication of the dielectric stacks, namely less than 500° C. in some embodiments, and in other embodiments, less than or equal to 300° C. Low stress in FIG. 14*b* refers to stress levels in the deposited films of less than or equal to approximately 20 MPa, either compressive or tensile. Stress levels of less than 20 MPa in deposited films ensure minimal substrate deformation and reduce the likelihood that the films will delaminate. Low optical loss in FIG. 14*b* refers to optical losses in embodiments of deposited dielectric film stacks 700 of less than approximately 1 dB/cm. Forming step 1495 provides for the formation of thin composite films of dielectric silicon oxynitride deposited sequentially at low temperatures of less than 500° C. to form the thick dielectric stack structures 700 with low stress, and suitable for use in the transmission of optical signals with low loss.

Referring to FIG. 14*c*, steps in the formation of dual core planar waveguides from a forming step 1497 and a patterning step 1499 are shown for some embodiments. Formation of the individual dielectric films and the dielectric film structures 1497 for the inventive stack structure 700 are shown that include the formation of a dielectric stack of silicon oxynitride films on a substrate 710 with a stack structure that includes a buffer layer 730, one or more optional bottom spacer layers 738, a repeating stack of one or more dielectric layers to form bottom waveguide core 742, an optional spacer layer 750, an upper waveguide core 754 comprised of a one or more layers, and an optional top layer 758. Embodiments for the forming of the dielectric film and film structures 1497 utilize one or more of forming step 1493 and forming step 1495. Patterning step 1499 is combined in embodiments with forming step 1497 on the resulting dielectric stack to form one or more planar waveguide structures on a substrate from the dielectric stack structures 700. Patterning steps can include the use of established photoresist patterning processes, in which photosensitive layers are used either directly as a means for transferring a pattern with subsequent dry or wet etch processing, or via a hard mask in which the photoresist is first used to transfer a pattern to a hard mask layer that is then used to transfer the waveguide pattern from the hard mask layer to the dielectric stack layer. Processes for photoresist patterning and subsequent wet and dry etching of film structures are well established for those skilled in the art of dielectric film patterning techniques. Patterning steps can also include the steps required to thin and taper the upper waveguide core 754 as described herein to form, for example, a spot size converter.

Typical deposition processes for dielectric films used in semiconductor device manufacturing include chemical vapor deposition (CVD), plasma enhanced chemical vapor deposition (PECVD), metalorganic chemical vapor deposition (MOCVD), physical vapor deposition (PVD), atomic layer deposition (ALD), among others.

In embodiments, deposition of the dielectric film structure 700 is accomplished using PECVD. In other embodiments, deposition of the inventive dielectric film structure 700 is accomplished using one or more of the thin film deposition techniques that include chemical vapor deposition (CVD), plasma enhanced chemical vapor deposition (PECVD), metalorganic chemical vapor deposition (MOCVD), physical vapor deposition (PVD), and atomic layer deposition (ALD).

Process parameters such as the process pressure, substrate temperature, and process power levels, as well as the selection of precursor gases and the flows of these and other gases used in the process, among others, can each affect the resulting properties of the deposited films. In the fabrication of nitrogen-containing films such as silicon nitride and silicon oxynitride, for example, precursors such as ammonia gas ($NH_3$), a source of nitrogen, and silane ($SiH_4$), a source of silicon, are combined in a plasma environment to facilitate the formation of the thin silicon nitride films. The ammonia and silane can be further combined with one or more oxidizing gases such as oxygen ($O_2$), nitric oxide (NO), and nitrous oxide ($N_2O$) to incorporate oxygen into the growing films to form silicon oxynitride. The properties of the silicon nitride and the silicon oxynitride films can be affected by the specific selection of gases in the process mixture and the ratio of the specific gas flows in the mixture. Residual impurities, such as hydrogen, can also affect the properties of the deposited films, particularly through the formation of nitrogen-hydrogen bonds in the deposited films. In embodiments, a process is provided to fabricate dielectric film structure 700 in which one or more nitrogen precursors that do not contain hydrogen are used in the formation of thin films of silicon nitride and silicon oxynitride to reduce the residual hydrogen concentration in the deposited films.

Figure 15:
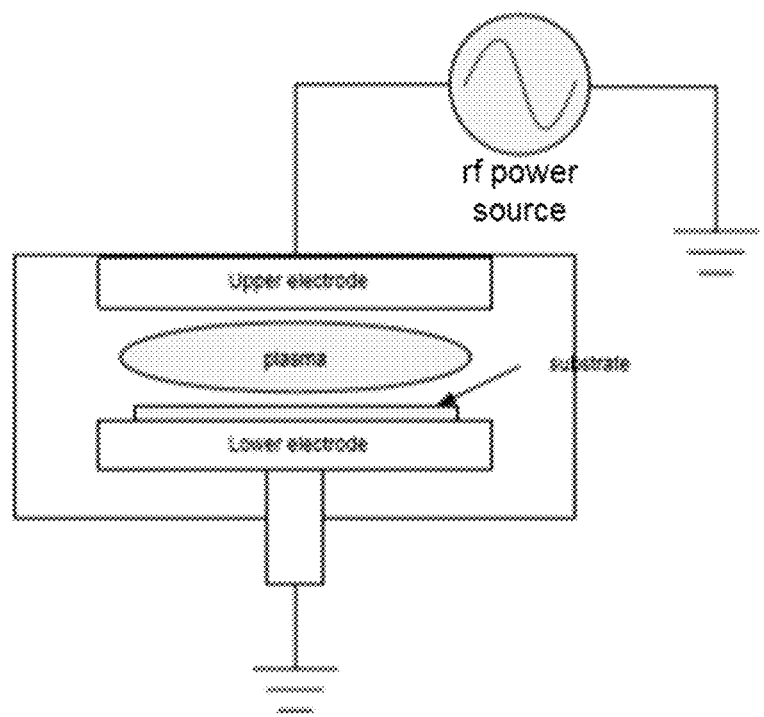
FIG. 15. Schematic drawing of a typical plasma enhanced chemical vapor deposition system.

In embodiments, a plasma enhanced chemical vapor deposition (PECVD) system, as shown for example in the schematic drawing in FIG. 15, is used to deposit silicon oxynitride film structures 700. PECVD processes are most typically performed under vacuum conditions with a selection of precursor gases specific to the types of films that are targeted for deposition. Substrates are most typically heated to elevated temperatures. In the configuration shown in FIG. 15, radio frequency (rf) power is capacitively coupled to the electrode opposite to that on which the substrate resides during the process. In the PECVD system depicted in FIG. 15, substrates reside on the lower electrode during processing, and the rf power is applied to the upper electrode. In embodiments in which the power is applied to the upper electrode, the substrate is not subjected directly to high energy ion bombardment as would be anticipated if the substrate were to be placed on the rf powered electrode.

In other embodiments, the electrode upon which the substrate resides during the deposition process is powered. Powering of the substrate can lead to energetic ion bombardment during processing, and can contribute to the level of residual stress in deposited films.

In an embodiment of the present invention, multilayer dielectric film structure 700 is formed using PECVD technology with a process chemistry that utilizes hydrogen-free nitrogen and oxygen precursors to yield planar waveguides with low optical loss and low stress. PECVD technology is widely used in semiconductor and optical device fabrication. Much of the equipment used in the manufacturing of semiconductor devices can be used in the fabrication of optical devices and the use of the term "semiconductor device fabrication" herein is intended to include optical device fabrication.

In embodiments, the dielectric film stack 700 is deposited onto a substrate using PECVD technology at temperatures in the range of 200-500° C. In other embodiments, the substrate temperature during deposition of the dielectric film structure 700 is in the range of approximately 250-400° C. In yet other embodiments, the dielectric film stack 700 is deposited onto a substrate using PECVD technology at temperatures of approximately 300° C. And in yet another embodiment, the dielectric film stack 700 is deposited at or approximately 300° C. using a gas mixture of silane, nitrogen, and nitrous oxide. In yet another embodiment, the dielectric film stack is deposited using a gas mixture of silane, nitrogen, and oxygen. In yet another embodiment, the dielectric film stack 700 is deposited at or approximately 300° C. using a gas mixture of silane, nitrogen, and nitric oxide.

In general, a gas mixture used in the deposition of silicon oxynitride films must contain at least the primary stoichiometric constituents or elements of the film, namely, silicon, oxygen, and nitrogen. Control of the deposited dielectric film properties is achieved, in part, with the control of the gas flows and mixture ratios of the constituent precursor gases in the deposition system. In an embodiment, for example, silane gas ($SiH_4$) is used as a precursor to provide the silicon, nitrogen gas ($N_2$) is used as a precursor for nitrogen, and oxygen gas ($O_2$) is used as a precursor for oxygen. In embodiments, the independent control of one or more of the gas flows, the ratios of the gases, and the partial pressures of these three gases in the deposition system can provide a means for independent control of the ratio of the three elements, namely Si, N, and O, in the deposited films. Other PECVD system parameters can also affect the stoichiometry of the resulting films.

In embodiments, silane gas, one of the most commonly used precursors for the deposition of silicon and silicon-containing thin films in epitaxial and chemical vapor deposition processes in semiconductor device fabrication, is provided as a source for silicon in the deposited film structure 700. In other embodiments, one or more of a silicon precursor that includes dichlorosilane, trichlorosilane, methylsilane, silicon tetrachloride, chlorosilane, dichlorosilane, and trichlorosilane is utilized as a silicon precursor in the deposited dielectric film structure 700.

In embodiments, a silicon-containing precursor gas that may or may not contain hydrogen, is combined with a hydrogen-free precursor gas for nitrogen, and a hydrogen-free precursor gas for oxygen to produce the oxynitride layers in the dielectric stack structure 700. In other embodiments, silane ($SiH_4$) is used as the silicon precursor in the PECVD deposition of silicon oxynitride films. In yet other embodiments, silane is used as the silicon precursor and is mixed with hydrogen-free precursors for nitrogen and oxygen to form films of silicon oxynitride.

In addition to the source of silicon in one or more of the precursors in the deposition gas mixture, precursors for embodiments with silicon oxynitride in the dielectric film structure 700 include one or more of an oxygen-containing precursor, a nitrogen-containing precursor, and a precursor that contains both oxygen and nitrogen. Precursors that contain both oxygen and nitrogen elements in embodiments include nitrous oxide, nitric oxide, nitrogen dioxide, dinitrogen tetraoxide, and mixtures of these gases, for example. In other embodiments, a nitrogen-containing precursor that does not contain oxygen is used in combination with an oxygen-containing precursor that does not contain nitrogen. In an embodiment, nitrogen gas ($N_2$) is the nitrogen-containing precursor and is combined with oxygen gas ($O_2$) as the oxygen-containing precursor, and further combined with silane or another silicon-containing precursor described herein in a plasma enhanced chemical vapor deposition system. In yet other embodiments, a nitrogen-containing precursor such as nitrogen gas is combined with one or more precursors that contain both oxygen and nitrogen, such as nitrous oxide and nitric oxide, or a mixture thereof, and further combined with silane or another silicon-containing precursor as described herein in a plasma enhanced chemical vapor deposition system to form the silicon oxynitride layers in dielectric stack 700. In yet other embodiments, an oxygen-containing precursor such as oxygen gas is combined with one or more precursors that contain both oxygen and nitrogen, such as nitrous oxide and nitric oxide, and further combined with silane or another silicon-containing precursor in a plasma enhanced chemical vapor deposition system or other deposition system as described herein to form dielectric stack 700. Oxygen-containing precursors include atomic oxygen, molecular oxygen, ozone, carbon monoxide, and carbon dioxide.

And in yet other embodiments, one or more of argon, helium, neon, xenon, nitrogen, and oxygen is added to the gas mixtures described herein in embodiments as a diluent. Diluents are often utilized in semiconductor deposition processes to slow the deposition rate, to enhance the ignition of the plasma in plasma-based processes, to improve deposition uniformity, and to alter or modify the energy absorption profile of the gaseous species in the plasma, among other potential benefits. Addition of one or more diluents listed herein to the processes described herein remains within the scope of the current invention.

In embodiments, the use of hydrogen-free, nitrogen and oxygen precursors in the deposition of the dielectric film stacks 700 yields low stress silicon oxynitride film structures from which waveguides can be formed that exhibit low optical signal loss.

In other embodiments, low stress, low optical loss silicon oxynitride film structures are formed using plasma enhanced chemical vapor deposition with a gas mixture that contains one or more of each of a silicon-containing precursor, a nitrogen-containing precursor, and an oxygen-containing precursor.

Figure 16:
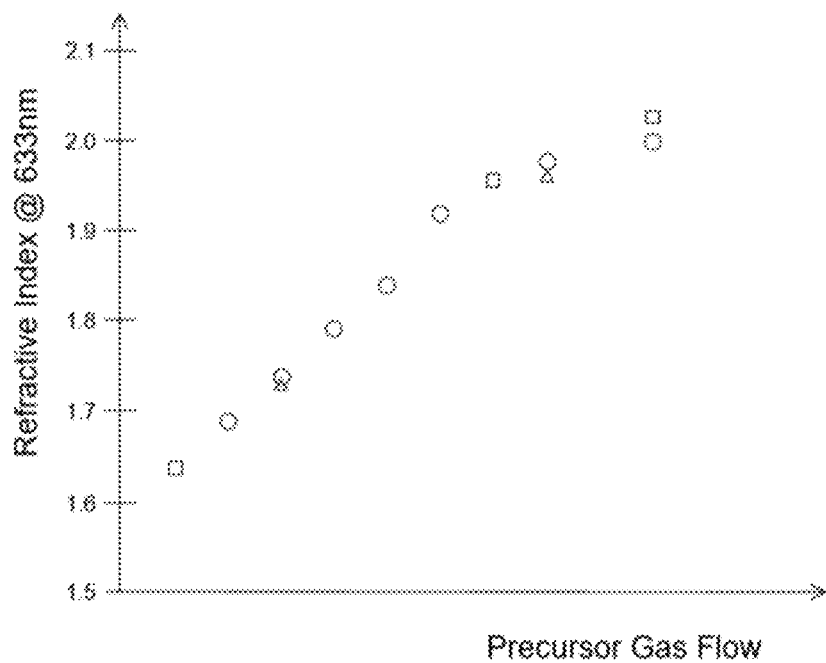
FIG. 16. Measured refractive index for waveguide structures that were deposited in a PECVD module over a range of gas flows for the silicon-containing precursor.

Referring to FIG. 16, a plot of the refractive index is shown for silicon oxynitride films deposited using such a gas mixture in a PECVD system. The ordinate in the plot in FIG. 16 shows the flow rate of a molecular precursor gas that contains silicon and the abscissa shows the refractive indices for a measurement wavelength of 633 nm that correspond to specific values of the precursor gas flow rate used in the deposition of multilayer dielectric stack structures. The plot includes sample data that show the variation in a representative optical property, namely the refractive index, for silicon oxynitride films that were deposited over a range of gas flows for the silicon-containing precursor, holding other gas flows and PECVD system parameters constant. The capability to control film parameters such as the refractive index, is reflective of the capability to control the stress level as is made apparent with the data shown in FIG. 12b.

The data provided in FIG. 16, when combined with the measured stresses over a similar range of refractive indices as provided in FIG. 12b, demonstrate the benefits of providing the means to control both the optical properties (refractive index) and mechanical properties (stress) of deposited films with variation of the gas flow mixture in a PECVD deposition process. The range of gas mixtures shown in the exemplary sample data shown in FIG. 16, produced with variations in the silicon-containing precursor gas flow, provide a wide range of measured refractive indices for silicon oxynitride films. The variation in the measured refractive index are shown in FIG. 12b to produce the low values of residual stress in deposited silicon oxynitride films, and that a crossover or intersection point of zero stress can be produced at a specific value of the silicon-containing precursor gas flow. The innovation provided using the processes described herein should become increasingly apparent in embodiments in which the achievable optical and mechanical properties are further combined with the inventive superlattice stack structures described herein for the dielectric stack structures 700 as described in FIG. 7. Combinations of refractive index and film thickness yield stack structures in embodiments that have low stress and low optical loss when deposited with PECVD processes that do not contain hydrogen in the nitrogen and oxygen precursor gases.

In embodiments of the PECVD processes described herein, a dielectric stack structure 700 is provided wherein the ratios of the precursor gases in the PECVD process are configured to achieve a stress level of less than approximately 20 MPa in magnitude. In other embodiments, the dielectric stack structure 700 is a structure of silicon oxynitride layers deposited in a PECVD system using a process that contains silane, nitrogen, and nitrous oxide wherein the ratios of these precursor gases are configured to achieve a stress level that is less than or approximately 20 MPa. In embodiments, control of the stress is achieved with the control of the PECVD gas mixture ratio in combination with the deposited film thicknesses for each of the individual layers in the dielectric film structure 700, as described in examples provided herein. Alternatively, other PECVD system parameters can be shown to produce a similar means for controlling the stress in the silicon oxynitride layers.

In embodiments of the dielectric stack structures 700, for example, the stoichiometric concentrations of the individual layers are selected, as reflected in the measured refractive index of the individual layers in the stack structure, and optimized with the layer thicknesses to produce low stress film structures with low optical signal loss characteristics. In the formation of the stacked dielectric structure 700, the total effective refractive index and the stress level in the film stack 700 are affected by the number of layers, the characteristics of the interfaces between the layers, the stoichiometric concentration, the resulting density of the deposited films, and the presence of impurities in the deposited films. This suggests that the measured refractive index may not be unique. Although the refractive index provides an effective method for characterizing the effect of changes in process parameters such as the gas flow on the optical properties of the deposited dielectric films, multiple stoichiometric concentrations may exist for the elemental constituents of the silicon oxynitride layer for a given value of refractive index. Nonetheless, the refractive index is an effective means for providing a measure of changes in the film properties, and most notably, a measure of the residual stress in deposited films.

The data shown in FIG. 16 are provided for demonstrative purposes in that the process parameters such as plasma power, gas pressure, substrate temperature, and gas ratios in the PECVD system can influence the measured refractive index. The effects of the variation in the refractive index are likely a reflection of the variation in the stoichiometric concentrations and perhaps the density of the deposited films. It is important to note, therefore, that the refractive index may not be unique to a single stoichiometric combination of silicon, oxygen, and nitrogen in the silicon oxynitride layers.

Variations in the embodiments in which the dielectric stack structure 700 is formed with the silicon, oxygen, and nitrogen precursors as described herein remain within the scope of the current invention.

In embodiments, the low stress, low optical loss dielectric film structures 700 are formed using plasma enhanced chemical vapor deposition with a gas mixture that does not include hydrogen-containing precursors for either nitrogen, oxygen, or both, or that includes concentrations of these gases that are low enough so as to not require high temperature processing of greater than 500° C. for example, or high thermal budget processes, to achieve the low optical signal losses of less than approximately 1 dB/cm in waveguides fabricated from the dielectric stack structure 700. The use of hydrogen-containing, oxygen and nitrogen precursors, such as ammonia, for example, can lead to high levels of optical loss for deposition processes of less than approximately 500 C. In some embodiments, a small amount of hydrogen-containing nitrogen or oxygen precursor gas, or both, of approximately 5-10% or less of the total precursor gas flow, is added to the PECVD gas mixture. In these embodiments, the concentrations of hydrogen-containing nitrogen and oxygen precursors could be low enough so as to not require high thermal budget processes to achieve the low optical signal losses of less than 1 dB/cm in waveguides fabricated from the dielectric stack structure 700. In yet other embodiments, a nitrogen-containing precursor such as nitrogen gas is combined with a small amount of a hydrogen-containing precursor gas, such as ammonia, for example, and one or more precursors that contain both oxygen and nitrogen, such as nitrous oxide and nitric oxide, and further combined with silane or another silicon-containing precursor as described herein in a plasma enhanced chemical vapor deposition system to form the silicon oxynitride layers in the dielectric stack 700. In these embodiments, the amount of ammonia in the process should be sufficiently low, less than approximately 10% of the total gas flow for example, so as to not require high temperature processing of greater than 500° C. for example, or processing with high thermal budget processes, to achieve the low optical signal losses of less than 1 dB/cm in waveguides fabricated from the dielectric stack structure 700. Although increases in the optical signal loss are anticipated, the inclusion of small amounts of ammonia to the gas mixture can increase the deposition rate of the silicon oxynitride films.

FIG. 12*b* shows the variation in the measured stress levels in deposited silicon oxynitride films over a range of measured refractive index for these films. The data in FIG. 12*b* show that the stress in the deposited films using embodiments of the processes described herein can be varied over a wide range between compressive stress and tensile stress with the crossover at 0 MPa in the measured stress observed at the transition between the films being in tension and compression. In embodiments, the stress in each layer of the inventive stack structures is varied such that the total stress in the dielectric film structure as shown in FIG. 7 is less than approximately 20 MPa. The stresses in each of the layers of the inventive stack structure as described in FIG. 7, is controlled in embodiments by varying the gas ratio, as for example as shown in FIG. 12*b*, and by varying the corresponding thickness of each of the layers such that the total stress in the resultant film stack is less than approximately 20 MPa. Examples of combinations of specific refractive indices, produced with variations in the nitrogen to nitrous oxide gas ratio, are described herein. Additionally, the thickness of each layer can be used to compensate for the buildup of stresses in the dielectric film stack 700.

In embodiments, when the use of hydrogen-free nitrogen and oxygen precursors is combined in the deposition chemistry with substrate temperatures during deposition of less than 400° C. in embodiments, and of approximately 300° C. in yet other embodiments, the resulting film stacks can be produced that exhibit stress levels of less than approximately 20 MPa. Additionally, in embodiments, the film stacks are subsequently patterned to form optical waveguides that provide low losses for optical signals propagating within these waveguides. Examples of embodiments of the deposited dielectric film stacks are described herein, and in particular, are described in the relevant discussion of FIG. 7 described herein.

In embodiments, the stack of silicon oxynitride films is formed onto a substrate using a PECVD process for which the process parameters, including the precursor gas ratios, are configured to achieve a stress level of less than 25 MPa, and in preferred embodiments less than 20 MPa. Measured stress levels in the deposited film stacks of less than 20 MPa greatly reduce the potential for either the substrate to deform, the deposited films to delaminate, or for some other undesired effect to manifest in either the dual core waveguide 760 or a substrate, interposer, or subassembly that includes the dual core waveguide 760. Substrate deformation and film delamination are just two forms of damage that can occur when stresses in the deposited film structures are not adequately controlled. In embodiments, the deposited dielectric film stacks with stress levels of less than 20 MPa are patterned into one or more of waveguides and optical devices.

In yet other embodiments, a stack of silicon oxynitride films are formed onto a substrate using a PECVD process for which the gas ratios are configured to achieve a stress level of less than 20 MPa and for which the process chemistry includes a silicon-containing precursor that may or may not contain hydrogen, and one or more molecular precursors that contain nitrogen or oxygen elements that contains little or no ammonia or other hydrogen-containing gas. In embodiments, the deposited film stacks with stress levels of less than 20 MPa that are deposited using non-hydrogen-containing nitrogen and oxygen gas sources are patterned into one or more of waveguides and optical devices.

In yet other embodiments, a stack of silicon oxynitride films are formed onto a substrate using a PECVD process for which the gas ratios are configured to achieve a stress level of less than 20 MPa and for which the process chemistry does not include ammonia or other hydrogen-containing gas, other than silane. Silane ($SiH_4$) is widely used in industry for the deposition of silicon-containing films and is used in some embodiments. In embodiments, the deposited film stacks with stress levels of less than 20 MPa, that are deposited using non-hydrogen-containing nitrogen and oxygen gas sources such as nitrogen, oxygen, nitric oxide, and nitrous oxide, for example, are patterned into one or more of waveguides and optical devices.

In embodiments, the gas pressure in the PECVD system during the deposition of the silicon oxynitride films is in the range of 1 mT to 100 Torr to produce dielectric film stack structures. In other embodiments, process pressures are in the range of 50 mTorr to 2 Torr. In yet other embodiments, process pressures are in the range of 100 to 5000 mTorr. The process pressure need not be the same for every step in the deposition sequence required to produce the full dielectric film structure 700.

In embodiments, the total gas flows during deposition of dielectric stack structure 700 is in the range of 5 sccm to 5000 sccm. In some embodiments, the silane gas flow is in the range of 3-1000 sccm. In other embodiments, the silane gas flow, or other silicon-containing precursor gas, is in the range of approximately 10-100 sccm.

In embodiments, the nitrogen and oxygen precursor gas flows can vary over a wide range. In some embodiments, the nitrogen and oxygen precursor gas flows are in the range of 0 to 5000 sccm.

In some embodiments, for which nitrogen is combined with nitrous oxide or nitric oxide, the nitrogen gas flow and nitrous oxide gas flows are in the range of 0 to 5000 sccm.

And in some other embodiments, for which oxygen is combined with nitrous oxide or nitric oxide, the oxygen gas flow and nitrous oxide gas flows are in the range of 0 to 5000 sccm.

In a PECVD system, the input power to the plasma can vary over a wide range. Typical input power for the dielectric stacks in embodiments is approximately 25-2000 W. In some embodiments, the input power during plasma enhanced deposition steps is in the range of 200 to 700 W. In yet other embodiments, the input power during plasma enhanced deposition steps is in the range of 500 to 1200 W. The process power need not be kept constant for the deposition of each of the films in the dielectric stack structure 700 but can vary from step to step, or within a deposition step.

In embodiments, one or more frequencies in the range of 1 kHz to 1 GHz can be used for the rf power provided to the plasma. In an embodiment, a frequency of 13.56 MHz is used to generate the plasma. In other embodiments, other frequencies or combinations of frequencies are used to generate the plasma. In some other embodiments, rf power with a frequency of approximately 27 MHz is applied to the powered electrode. In a preferred embodiment, 13.56 MHz rf power is applied to the upper electrode with the substrate residing on a grounded electrode during the deposition of the dielectric film structure 700. In other embodiments, the electrode upon which the substrate resides during the deposition process is not grounded. In yet other embodiments, the power is applied to both the upper and lower electrodes, divided either equally or unequally between the two electrodes.

Power can be delivered to the PECVD system in either capacitive or inductive operational modes and remain within the scope of the current invention. For inductive-coupled PECVD systems, the plasma is typically generated with power that is delivered to the plasma via an antenna and the substrates upon which the films structures 700 are deposited typically reside on a bottom electrode similar to that shown in the capacitively coupled configuration shown in FIG. 15.

Inert gases, such as argon and helium, are added to the gas mixture in one or more steps of the PECVD process in some embodiments, to yield dielectric film stacks with low stress and low optical loss. Inert gases are frequently added to deposition process chemistries to modify film properties, such as the stoichiometry or density of the film. In embodiments, argon is added to a gas mixture of silane, nitrous oxide, and nitrogen. In yet other embodiments, helium is added to the gas mixture of silane, nitrous oxide, and nitrogen. In yet other embodiments, one or more of argon and helium is added to a process gas mixture that includes a silicon-containing precursor gas that may or may not contain hydrogen, a nitrogen precursor that does not include hydrogen in the nitrogen-containing precursor gas molecule or molecules, and an oxygen precursor gas that does not contain hydrogen in the oxygen-containing precursor gas molecule or molecules. Examples of nitrogen precursors that do not include hydrogen include molecular nitrogen ($N_2$), nitrous oxide ($N_2O$), and nitric oxide (NO). Examples of oxygen precursors that do not include hydrogen include molecular oxygen ($O_2$), nitrous oxide ($N_2O$), nitric oxide (NO), carbon monoxide (CO), and carbon dioxide ($CO_2$).

Commercially available deposition systems such as the APM PECVD model manufactured by SPTS provide advanced programmability for the deposition of the overall dielectric film structure 700 and for each step in the deposition process. The programmability of commercially available deposition systems enables automated operation of the system hardware that includes, for example, the mass flow controllers, the source power supply or supplies, the temperature controllers, and the pressure controllers. The process parameters such as, for example, the gas flow rates, the power level or levels, the pressure, the substrate temperature, among other parameters for each step in the deposition of a film structure can be programmed into a process recipe. Use of programmable and commercially available deposition systems is widely used in the industry and the use of programmable deposition systems is anticipated and with the scope of the current invention.

Figure 17:
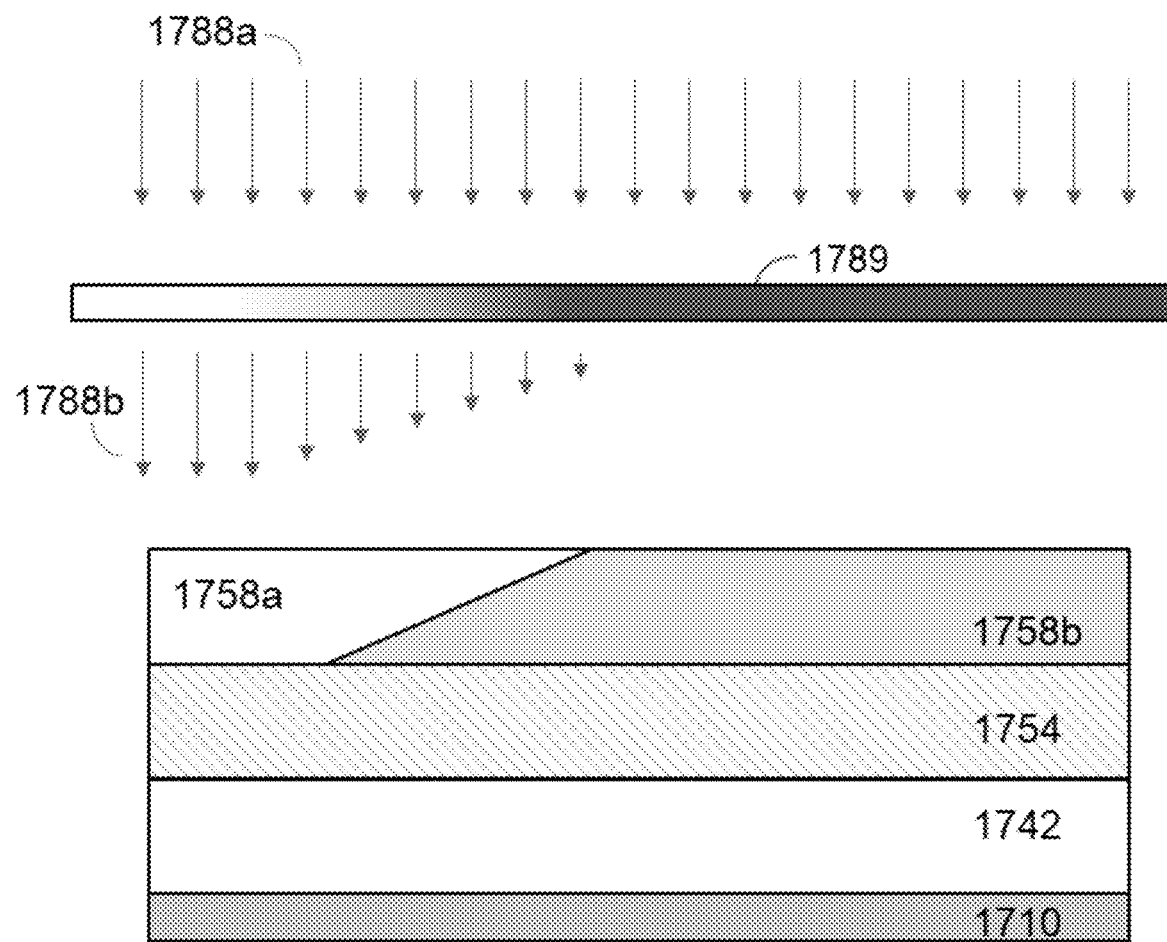
FIG. 17. Cross sectional schematic drawing of a system for gray scale lithographic patterning of a photoresist layer.

In embodiments, the formation of spot size converters in which the dual waveguide structure described herein is implemented, requires the formation of tapered regions 557, which can be fabricated in a number of ways. In some embodiments, gray scale lithographic patterning techniques are used with an etch process for forming the thinned portion 555 and the tapered portion 557 in the upper waveguide core 554. Referring to FIG. 17, a schematic drawing of key elements of a gray scale lithographic patterning operation is shown. In FIG. 17, light source 1788*a* is incident upon gray-scale reticle 1789 to produce a position-dependent light pattern of varying intensity incident on light sensitive photoresist layer 1758. The variation in intensity can be achieved, for example, by varying the opacity of the reticle 1789 with position. Variation in the opacity of the reticle 1789 selectively inhibits the transmission of the light 1788*a* through the reticle 1789 to yield patterned light 1788*b* below the reticle 1789. Exposure of the photoresist layer 1758 changes the properties of this photosensitive layer 1758 so that the volume of the photoresist 1758*a* exposed to the light source is removable in a suitable developer solution, thus forming a gradient in the mask layer. In the exemplary process shown in FIG. 17, the light exposed regions 1758*a* are removed after exposure to a photoresist developer solution and the shaded region 1758*b* remains after exposure to the photoresist developer solution (commonly referred to in industry as a "negative" photoresist.)

A three-dimensional depiction of the remaining feature after light exposure and subsequent exposure to a developer solution to remove the light exposed regions 1758*b* is shown in FIG. 18*a*. FIG. 18*a* shows the shape of a patterned photoresist mask layer after exposure using a form of gray scale lithography. Other gray scale lithographic techniques are used in other embodiments to produce the tapered mask layer 1758*b* shown in FIG. 18*a*. In other embodiments, for example, the tapered mask layer 1758*b* in the photosensitive mask layer 1758 is produced using a photoresist exposure in which the properties of the light-exposed portions of the photosensitive layer 1758 are such that exposure to the light sensitizes the layer 1758 to the developer solution (commonly referred to in industry as a positive photoresist.) Light exposure is known to produce cross-linking of the polymer chains in the photoresist. The cross-linking in the photoresist, when combined with a suitable developer solution enables the formation of patterned regions in the photoresist. The use of gray-scale masking during the exposure of the photoresist to the lithographic patterning tool enables gradations in the intensity of the exposure, and hence the depth to which the incident light is able to penetrate into the photoresist layer during an exposure. The tapered regions in the photoresist in embodiments are thus formed using the variation in light intensity to which the photoresist is exposed combined with the exposure to the suitable developer solution.

Figure 18:
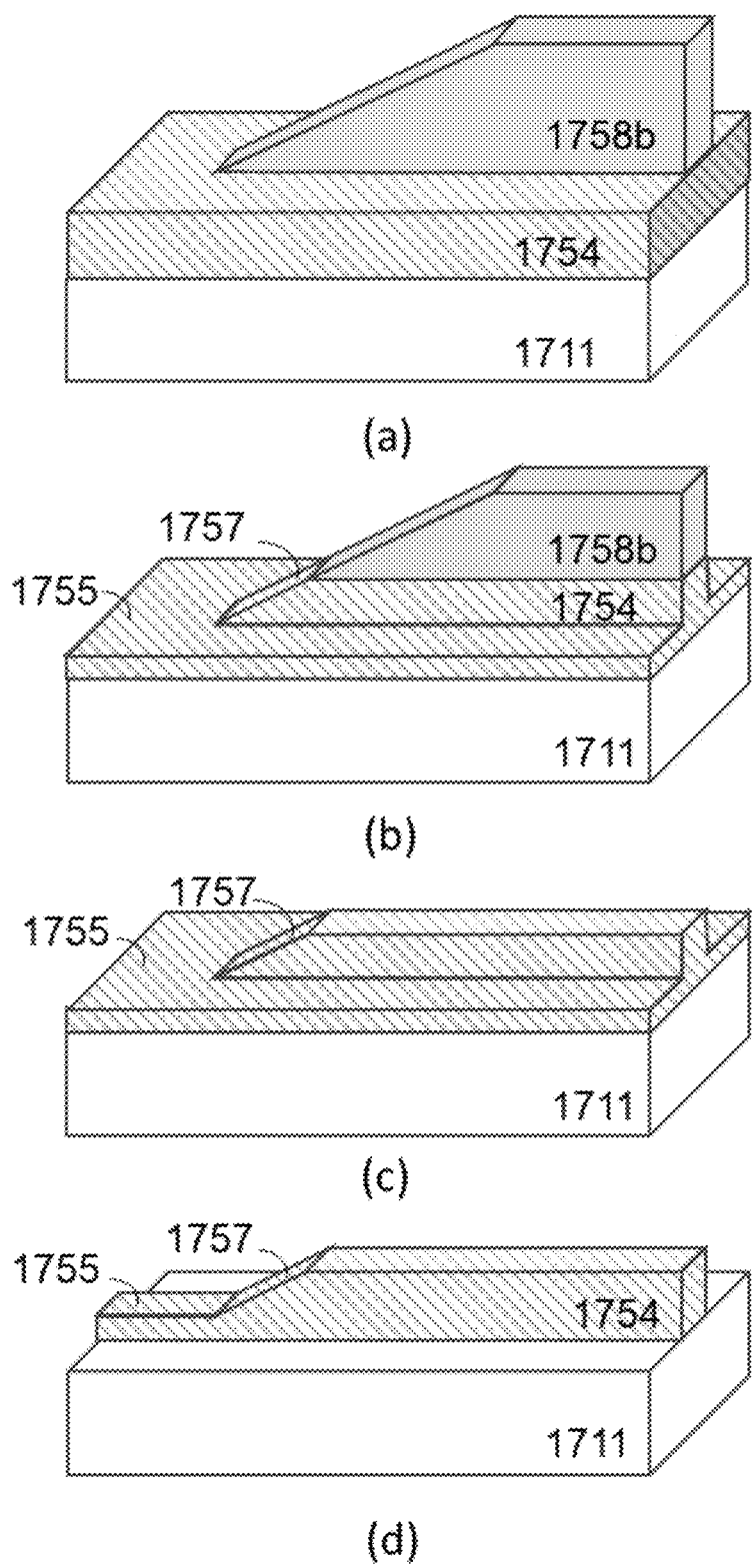
FIG. 18. Embodiment using gray scale lithographic process for forming the thinned portions and the tapered portions of the upper waveguide core: (a) patterned mask layer, (b) after etching of the upper waveguide core, (c) after mask removal, and (d) after subsequent lithography and etching to pattern the thin section of the upper waveguide core.

Also shown in FIG. 18*a* is the upper waveguide core 1754 and substrate 1711. The upper waveguide core 1754 is comprised of the layer or layers as described herein for upper waveguide core 754 of film structure 700. In the embodiment shown in FIG. 18, the structure does not include an upper spacer layer 758. In some embodiments in which a gray scale lithographic technique is used to form the tapered portion of the upper waveguide core, an upper spacer layer is present between the photosensitive layer 1758 and the upper waveguide core 1754. Substrate 1711, as shown in FIG. 18, includes all of the layers below the upper waveguide core 754 (including layers 730, 738, 742, 750, if present) and including the substrate 710, as described herein, for example, for the structure 700. In the embodiment depicted in FIG. 18, the upper waveguide core 1754 is patterned using a gray scale lithographic technique.

Referring to FIG. 18*b*, the schematic drawing shows the tapered photoresist from FIG. 18*a* after exposure to an etch process to form the tapered features, as well as untapered features, in the upper waveguide core 1754. In portions of the structure in which the untapered mask layer remains, the full thickness of the upper waveguide core 1754 remains. In the areas of the structure in which the waveguide layer 1754 has been exposed to the etch process, a thinner layer 1755 remains as shown. In embodiments, the substrate 1711 includes substrate 710 and all of the layers above the substrate 710 and below the upper waveguide core 754 including buffer layers, spacer layers, and lower waveguide core as described herein. In some embodiments that utilize silicon oxynitride layers in the upper waveguide core 1754, plasma processing is used with fluorinated gas chemistries to etch the silicon oxynitride. Combinations of carbon tetrafluoride ($CF_4$), trifluoromethane ($CHF_3$), sulfur hexafluoride ($SF_6$), octafluorocyclobutane ($C_4F_8$), Argon (Ar), oxygen ($O_2$), among others, are commonly used in the art for patterning of silicon oxide, silicon nitride, and silicon oxynitride films and are used in embodiments in combination with gray-scale lithography to produce the etched structure shown in FIG. 18*b*. Plasma process modules, or plasma reactors as they are sometimes referred, can be capacitively coupled, inductively coupled, or microwave sources. The capacitively-coupled modules can be parallel plate modules with single or multiple frequency excitation. Dry etching of dielectric materials such as silicon oxide, silicon nitride, and silicon oxynitride films are well known in the art. In embodiments, the plasma etch process is combined with gray scale lithographically patterned photoresist to produce the tapered structure features in the upper waveguide core 1754 as shown in FIG. 18*b*. Exposure of the thinnest end of the tapered region (left side as shown) in the mask layer 1758*b*, in embodiments, causes the mask layer to recede during the etch which increases the exposure of the area below the mask as the mask recedes to produce the taper in the upper waveguide core layer 1754. It is important to note that the tapered portion of the structure shown in FIG. 18 is the portion of the embodiment that generally requires and benefits from the use of gray scale lithographic patterning. Production of the vertical or near vertical sidewalls does not require gray scale techniques. It is also important to note that the vertical or near-vertical faces shown at the right of the patterned feature 1758*b* in FIG. 17 and FIG. 18 can be extended to produce intact or substantially intact upper waveguide cores for the routing of optical signals as required by the optical device. Referring, for example, to FIG. 5 and FIG. 6, the non-tapered portions of the patterned feature 1758*b* can be used to produce a patterned waveguide structure such as that required to produce an arrayed waveguide. In other embodiments, all or part of other optical devices that require tapered features can use gray scale lithographic techniques as described in FIG. 17 and FIG. 18, for example, to form the tapered sections.

Referring to FIG. 18*c*, the upper waveguide core is shown after the etch and the removal of any remaining mask layer that may have remained after the etch exposure. FIG. 18*c* shows the thinned areas 1755 of the upper waveguide core and the tapered regions 1757 of the upper waveguide core 1754. In the embodiment depicted in FIG. 18*c*, the thinned portions 1755 are shown as they might appear after the tapered feature with an etch that produces the vertical faces on the sides of the upper waveguide core 1754. In some embodiments, the etch that produces the taper is separate from the etch that produces the vertical faces. The exemplary embodiment of the gray scale lithographic process is intended to show a method to produce the tapered section 1757. In other embodiments, multiple patterning steps may be used to produce the specific features required for the optical waveguide structure such as the tapered feature 1757 and the vertical faces of the upper waveguide core 1754.

In FIG. 18*d*, an embodiment is shown in which the upper waveguide core has been subsequently repatterned and exposed to an etch process to pattern the thin section 1755 of the upper waveguide core 1754. In this figure, the upper waveguide core 1754 is shown after patterning and etching step to form a resulting dual core waveguide structure similar to the structures shown in FIG. 4*c*.

The exemplary gray scale lithographic method described herein is an example of a sequence of steps that are used to form the thinned sections 555 and the tapered sections 557 in the upper waveguide core 1754 of a dual core waveguide, as might be used in the formation of a spot size converter or other optical device structure for use in an optical or optoelectronic circuit. Other embodiments using gray scale lithography are anticipated and within the scope of the current invention.

Other standard lithographic patterning techniques without gray scale patterning are used in other embodiments. In an embodiment, standard lithographic patterning is combined with an aspect ratio dependent etch process to form the thinned portion 555 and the tapered portion 557 in the upper waveguide core 554. In FIG. 19, an embodiment is shown that illustrates the effect that the combination of a lithographic patterning step with an aspect dependent etch process has on the formation of a tapered portion of a dual core waveguide. Referring to FIG. 19*a*, a masked area 1961 is exposed to a light source through an optical reticle to produce the pattern shown in the top view of FIG. 19*a*. The darker shaded area 1954 in FIG. 19*a* is the exposed upper waveguide core layer 1954 within the cavity in the photoresist layer that has been formed, for example in an embodiment, upon exposure to a developer solution to remove the light-exposed resist. Upon exposure to the developer solution, the cavity is formed and underlying layer 1954 is revealed. The cross-section detail A-A' in FIG. 19*a* shows an embodiment of a stack structure comprised of the substrate 1910, the lower core 1942 of the dual core waveguide and the upper waveguide core 1954 with the opened mask layer 1961 and the exposed surface of the underlying layer 1954. The underlying layer 1954 is an upper core of a dual core waveguide 760. In embodiments, other layers are present between the mask layer 1961 and the upper core 1954 of the dual core waveguide as described herein, for example, for the structure 700 shown in FIG. 7. Mask layer 1961, in some embodiments, is a combined structure of a photosensitive photoresist layer and any components of the overall dual core waveguide structure 700 that reside between the photosensitive mask layer and the upper waveguide core layer 1954. In some embodiments, the mask layer 1961 includes a hard mask layer. In other embodiments, the mask layer 1961 includes one or more of a photoresist layer, a hard mask layer, and capping layer 758. In other embodiments, the layer 1961 includes a portion of upper waveguide core 1954. In embodiments in which the mask layer 1961 includes layers other than photoresist, suitable etch processes are used to remove these layers within the cavity to expose upper waveguide core layer 1954 as shown schematically in the top view and the Section A-A' views in FIG. 19a.

Referring to the top view shown in FIG. 19b, an embodiment of the dual core waveguide structure 1954 is shown after an etch process to pattern the upper waveguide core 1954 of the dual core waveguide structure, and to form thinned upper waveguide core section 1955 and tapered upper waveguide core 1957. The etched areas of the upper waveguide core 1954 are indicated. In an embodiment, the upper waveguide core 1954 is exposed to a plasma etch process with process chemistry and conditions such that the vertical etch rate, or the etch depth, is dependent on the width of the opening. These types of processes are commonly referred to as aspect ratio dependent etch processes and understood by those skilled in the art of thin film etch processing. Plasma etch process conditions are employed in embodiments, so as to produce the highest etch rate in the widest region of the etch area (at the leftmost edge). As the open area becomes narrower, following along the horizontal section of line B-B' from left to right, the etch rate or etch depth of the dual waveguide structure using the applicable etch process conditions decreases. The decreasing etch rate with opening width, known in the industry as an aspect ratio dependent etch process, is used in some embodiments, to produce the tapered section 1957 as shown in the cross-sectional view in FIG. 19b. Also shown in the cross-section in FIG. 19b is the partially etched portion 1955 of the upper waveguide core 1954. As is the case with the embodiments illustrated in FIG. 18, the embodiment shown in FIG. 19 can be used to produce the tapered portion 1957 of an upper waveguide core 1954 as is used for example in a spot size converter or other optical device or part of an optical device. Multiple structures as shown in FIG. 18 and FIG. 19 can be combined to produce a device or combination of devices using the inventive planar dual core waveguide 700.

In some embodiments, the present invention discloses an optical device for processing an optical signal 502 from an optical fiber 580. The optical device can be configured to be directly coupled to the core 582 of the optical fiber 580 using a dual waveguide configuration. The dual waveguide can include a first waveguide 542 having a thickness comparable with a thickness of the core 582 of the optical fiber 580. Thus the first waveguide 542 can be directly coupled with the core 582 of the optical fiber 580 due to the thickness matching. For example, the core 580 of the optical fiber 580 can have a thickness between 5 and 10 microns for single mode optical signal propagation. The first waveguide 542 can have a matching thickness, for example the first waveguide 542 can also have a thickness between 5 and 10 microns. The matching thickness can allow the optical signal 502 from the core 582 of the optical fiber 580 to be transmitted to the first waveguide 542.

The dual waveguide 560 can include a second waveguide 554 disposed adjacent to the first waveguide along a length of the first waveguide 542. For example, the second waveguide 554 can be on top or under the first waveguide 542. The second waveguide 554 can include a first portion 555 which is configured to be weakly coupled to the first waveguide 542 to share the optical signal 502 in the first waveguide 542 that is transmitted from the optical fiber 580. The length of the first portion 555 can be configured to optimize an optical signal propagation between the first waveguide 542 and the second waveguide 554. The first portion 555 can have an index of refraction greater than an index of refraction of the first waveguide 542, for example, to facilitate the coupling between the second portion of the second waveguide 554 and the first waveguide 542, for example, to promote a signal propagation from the first waveguide 542 to the first portion 555 of the second waveguide 554.

The second waveguide 554 can include a second portion which is configured to further transmit the optical signal 502 partly received in the first portion 555. The second portion of the second waveguide 554 can be configured to be decoupled from the first waveguide 542, for example, there is no signal sharing between the second portion of the second waveguide 554 and the first waveguide 542.

The second waveguide 554 can have multiple thicknesses, such as one or more thicknesses for the first portion 555, and a thickness for the second portion. The thicknesses of the second waveguide 554 can be smaller than that of the first waveguide 542. Since the first waveguide 542 has a large thickness, for example, a thickness having comparable dimension with the core 582 of the optical fiber 580, optical signal propagation in the first waveguide 542 can be susceptible to multimode propagation, for example, there can be undesirable optical modes generated in the first waveguide 542, even with the single mode optical signal coming from the single mode optical fiber 580. Thus, the thicknesses of the second waveguide 554 can be optimized for single mode signal propagation, such as configured to promote single mode signal propagation with a thickness equal or less than 3 microns.

The first portion 555 of the second waveguide 554 can have one or more thicknesses. The thicknesses of the first portion 555 can be configured so that the first portion 555 is coupled, for example, weakly coupled, to the first waveguide 542, such as by having thicknesses equal or less than about 3 microns, less than 1 micron, or less than 0.5 micron.

The thickness of the second portion of the second waveguide 554 can be configured so that the second portion is decoupled from the first waveguide 542, such as by having a thickness greater than about 0.5 or 1 micron.

The optical device can be configured to receive an optical signal 502 from an optical fiber 580, or can be configured to send an optical signal 502 to an optical fiber 580. For example, an optical signal 502 can be sent from the optical fiber 580 to the first waveguide 542, through the weakly coupling portions of the second waveguide 555, 557, and transferred substantially to the second portion of the second waveguide 554. Alternatively, an optical signal can be sent from the second waveguide 554, through the weakly coupling portions of the second waveguide 555, 557, transferred to the first waveguide 542, and then to the optical fiber 580.

In some embodiments, a waveguide, such as the first waveguide 542 or second waveguide 554, can include one or more layers configured for optical signal propagation. The waveguide can further include other layer, such as buffer layers or cladding layers, which can be configured to confine the signal in the propagation core. Other layers can be included, depending on the needs of the waveguide. For example, a layer can be disposed between the first and second waveguides, which is configured to improve the weak coupling between the first and second waveguides.

In some embodiments, the first portion of the second waveguide 554 can include an adiabatic transition section 557, which is configured to transition the second waveguide 554 from a thickness or range of thicknesses that allows coupling with the first waveguide 542 to the second portion, which has a thickness that provides a decoupling with the first waveguide 542. The adiabatic transition section 557 can have a tapered thickness from a thinner thickness, for example, a thickness that allows coupling with the first waveguide 542, to a thicker thickness, for example, a thickness that does not provide coupling with the first waveguide 542, which is the thickness of the second portion of the second waveguide 554.

The first portion of the second waveguide 554 can include only an adiabatic transition section 557, for example, a tapered section connected to a thicker second portion of second waveguide 554. Alternatively, the second waveguide 554 can include a first portion that can include a flat portion 555 and an adiabatic transition section 557, for example, the second waveguide 554 can include a first portion 555 that can have a first part having a flat thickness, which is then coupled to a second part having a tapered section connected to the second portion. Thus, the flat portion can have a zero length in the case of a first portion that only includes the adiabatic transition section 557. The flat portion 555 and the adiabatic portion 557 can be configured to optimize signal propagation from the first waveguide 542 to the second portion of the second waveguide 554.

In some embodiments, the first waveguide 542 can be formed by depositing a waveguide layer on a substrate. Other layers can be included, such as a buffer layer under the waveguide layer. The second waveguide 554 can be formed by depositing a thinner waveguide on the first waveguide 542. Other layers can be included, such as a layer disposed between the first and second layer for optimizing the signal coupling between the first waveguide 542 and the second waveguide 554. After depositing the thin waveguide layer, the thin waveguide layer can be patterned to form the second portion of the second waveguide 554. The patterning process can form the second portion, together with forming an outline for the first portion 555,557. For example, the patterning process can form an outline of the second waveguide 554, for example, removing lateral portions of the thin waveguide layer outside the outline of the first and second portions. The lateral patterning can form the second portion of the second waveguide 554, and the lateral shape of the first portion 555, 557, with the first portion still needing vertical patterning. The lateral shape of the first portion can then be patterned to form the first portion. For example, the flat portion 555 of the first portion, if there is one, can be etched vertically to achieve an appropriate thickness.

In some embodiments, the dual core waveguide structure can be patterned using a gray scale lithography process or an aspect ratio dependent etch process, especially for the adiabatic transition section 557. The flat portion 555 and the second portion of the second waveguide 554 can have a flat top surface, which can be patterned by an etch process using a conventional lithography mask, for example, a mask that allows uniform etching on exposed areas. The adiabatic transition section 557 can have a tapered surface, which can be patterned by an etch process using a gray scale lithography process or an aspect ratio dependent etch process, for example. The gray scale lithography mask or the aspect ratio dependent mask can also include a portion of the conventional mask, in order to etch both the adiabatic transition section 557, the flat portion 555, and the second portion of the second waveguide 554 at a same time using a same mask.

In addition to the thickness taper in the adiabatic transition section 557, the first portion can have a horizontal taper, for example, to allow a low loss transition from a width comparable with the dimension of the core 582 of the optical fiber 580 to a smaller width optimized for single mode signal propagation in the second portion of the second waveguide 554. The first waveguide 542 is configured to be coupled with the optical fiber 580, with a thickness and a width having a comparable dimension with the core 582 of the optical fiber 580. Thus, at the location near the coupling area between the core 582 of the optical fiber 580 and the first waveguide 542, the width of the second waveguide 554 can be similar to that of the first waveguide 542. The width of the second waveguide 554 is then tapered in the width direction, such as tapered in the flat portion 555 and in the adiabatic transition section 557. The horizontal taper can be a smooth taper, or can be a piecewise taper, such as a first taper in the flat portion 555 and a second taper in the adiabatic transition section 557.

In some embodiments, the first waveguide can include a repeated stack of two or more SiON layers on a buffer layer. The two or more layers can have at least two layers having different indexes of refraction. The first waveguide 542 can include a repeated stack of two or more SiON layers. The two or more layers can include layers having different indexes of refraction. Each layer of the buffer layer and the layers of the repeated stack comprises a stoichiometry of Si, O, and N to provide a stress having a magnitude less than or equal to 20 MPa. The first waveguide 542 can include a repeated stack of two or more SiON layers. The two or more layers can include layers having different indexes of refraction. Each layer of the buffer layer and the layers of the repeated stack comprises a level of impurity or a level of homogeneity to provide an optical loss less than or equal to 1 dB/cm.

In some embodiments, the present invention discloses an optical device for coupling an optical signal from an optical fiber 580 to a photonic integrated circuit, including an optoelectronic device. The optical device can be configured to be directly coupled to core of the optical fiber 580 using a dual waveguide configuration, having a first waveguide 542 coupled to a second waveguide 554. The output of the second waveguide 554 can be coupled, directly or indirectly through an intermediate component, to the photonic integrated circuit.

The optical device can be configured to receive an optical signal 502 from an optical fiber 580, or can be configured to send an optical signal 502 to an optical fiber 580. For example, an optical signal 502 can be sent from the optical fiber 580 to the first waveguide 542, through the weakly coupling portions 555,557 of the second waveguide 554, and transferred to the second portion of the second waveguide 554, and then to the photonic integrated circuit. Alternatively, an optical signal 502 can be sent from the photonic integrated circuit to the second waveguide 554, through the weakly coupling portions 555, 557 of the second waveguide 554, and transferred to the first waveguide 542 and then to the core 582 of the optical fiber 580.

The optical signal 502 can be processed in the optical device, for example, at the second portion of the second waveguide 554, which is coupled to the first portion. The second portion of the second waveguide 554 can include an array waveguide, a grating, a filter, a blocker, a prism, a combiner, a multiplexer, a de-multiplexer, a splitter, an echelle grating, or a combination thereof. Thus, an optical signal 502 can be transmitted from the optical fiber 580, and then processed at the second portion of the second waveguide 554 of the optical device, before sending to the photonic integrated circuit.

In some embodiments, the present invention discloses an optical device for coupling different optical fibers, for example, from one or more first optical fibers 580 to one or more second optical fibers 580. The optical device can be configured to be directly coupled to the optical fibers 580 using a dual waveguide configuration. The dual waveguide can include a first portion 555,557 of a second waveguide 554 weakly coupled to a first part of a first waveguide 542, which is directly coupled to one or more first optical fibers 580. The dual waveguide can include a second portion of the second waveguide 554 weakly coupled to a second part of the first waveguide 542, which is directly coupled to one or more second optical fibers 580.

The optical device can be configured to convey an optical signal 502 between one or more first optical fibers 580 to one or more second optical fibers 580. For example, one or more optical signals 502 can be sent from the one or more first optical fibers 580 to the first waveguide 542, through a first weakly coupling portion 555,557 of the second waveguide 554, transmitted to the second waveguide 554, and then through the second waveguide 554 back to the first waveguide 542 through a second weakly coupling portion 557, 555, and then to the one or more second optical fibers 580. Alternatively, one or more optical signals 502 can be sent from the one or more second optical fibers 580 to the first waveguide 542, through a first weakly coupling portion 555,557 of the second waveguide 554, transferred to the second portion of the second waveguide 554, through the second waveguide 554, back to the first waveguide 542 through a second weakly coupling portion 557,555, and then to the one or more first optical fibers 580.

The optical signal 502 can be processed in the optical device, for example, at the second portion of the second waveguide 554, which is coupled to the first portion 555, 557. The second portion of the second waveguide 554 can include an array waveguide, a grating, a filter, a blocker, a prism, a combiner, a multiplexer, a de-multiplexer, a splitter, an echelle grating, or a combination thereof. Thus, optical signals 502 can be transferred from optical fibers 580, and then processed at the second portion of the second waveguide of the optical device, before sending to the other optical fibers.

The forgoing description of embodiments is provided for the purposes of illustration, but this description is not intended to be exhaustive or to limit the invention to the precise forms disclosed. Many modifications and variations will be apparent to a practitioner skilled in the art. Embodiments were chosen and described in order to best illustrate the principles of the invention and its practical application, thereby enabling others skilled in the art to understand the invention. The various embodiments described have been presented by way of example, and not limitation. It will be apparent to persons skilled in the relevant art that various changes in form and detail can be made therein without departing from the spirit and scope of the invention. The breadth and scope of the invention should not be limited by any of the above-described exemplary embodiments, but rather should be defined only in accordance with the following claims and their equivalents.

What is claimed is:

1. An optical device comprises
a first waveguide,
wherein the first waveguide has a first thickness comparable with a thickness of an optical fiber core and configured for directly coupling with the optical fiber;
a second waveguide,
wherein the second waveguide is disposed adjacent to the first waveguide along a length of the first waveguide,
wherein the second waveguide comprises a first portion, wherein the first portion has a second thickness configured so that the first portion is weakly coupled to the first waveguide for signal propagation with the first waveguide,
wherein the second waveguide comprises a second portion, wherein the second portion has a third thickness configured so that the second portion is decoupled from the first waveguide,
wherein the second thickness and the third thickness are smaller than the first thickness,
wherein the first portion comprises a flat section having the second thickness,
wherein the first portion further comprises an adiabatic transition section having a tapered thickness from the second thickness to the third thickness,
wherein the adiabatic transition section is configured for optimal signal propagation between the flat section and the second portion.

2. An optical device as in claim 1,
wherein the optical device is configured to accept an optical signal from the optical fiber to the first waveguide and transmit to the second waveguide, or
wherein the optical device is configured to transmit an optical signal from the second waveguide and transmit to the optical fiber through the first waveguide.

3. An optical device as in claim 1,
wherein the length of the first portion is configured to optimize a signal propagation between the first and second waveguides.

4. An optical device as in claim 1,
wherein a layer is disposed between the first and second waveguides,
wherein the layer comprises an index of refraction higher than the index of refraction of the first waveguide.

5. An optical device as in claim 1,
wherein the second waveguide has an index of refraction greater than an index of refraction of the first waveguide.

6. An optical device as in claim 1,
wherein the first thickness is between 5 and 10 microns,
wherein the second thickness is 1 micron or less,
wherein the third thickness is between 1 and 3 microns.

7. An optical device as in claim 1,
wherein the second and third thicknesses are configured to facilitate single mode optical signal propagation.

8. An optical device as in claim 1,
wherein the first portion comprises a horizontal tapered section between a width comparable with the thickness of the optical fiber core and a width of the second portion.

9. An optical device as in claim 1,
wherein the flat section comprises a horizontal tapered section between a width comparable with the thickness of the optical fiber core and a width of the adiabatic transition section,
wherein the adiabatic transition section comprises a horizontal tapered section between a width of the adiabatic transition section and a width of the second portion.

10. An optical device as in claim 1,
wherein the first waveguide comprises a repeated stack of two or more SiON layers on a buffer layer, wherein the two or more layers comprise at least two layers having different indexes of refraction.

11. An optical device as in claim 1,
wherein the first waveguide comprises a repeated stack of two or more SiON layers, wherein the two or more layers comprise layers having different indexes of refraction,
wherein each layer of the repeated stack comprises a stoichiometry of Si, O, and N to provide a stress having a magnitude less than or equal to 20 MPa.

12. An optical device as in claim 1,
wherein the first waveguide comprises a repeated stack of two or more SiON layers, wherein the two or more layers comprise layers having different indexes of refraction,
wherein each layer of the repeated stack comprises a level of impurity or a level of homogeneity to provide an optical loss less than or equal to 1 dB/cm.

13. An optical device comprises
a first waveguide,
　　wherein the first waveguide has a first thickness comparable with a thickness of an optical fiber core and configured for directly coupling with the optical fiber;
a second waveguide,
　　wherein the second waveguide is disposed adjacent to the first waveguide along a length of the first waveguide,
　　wherein the second waveguide comprises a first portion, wherein the first portion has a second thickness configured so that the first portion is weakly coupled to the first waveguide for signal propagation with the first waveguide,
wherein the second waveguide is configured to be directly or indirectly coupled to a photonic integrated circuit,
wherein the second waveguide comprises a second portion,
wherein the second portion comprises an array waveguide, a grating, a filter, a blocker, a prism, a combiner, a multiplexer, a de-multiplexer, a splitter, an echelle grating, or a combination thereof.

14. An optical device as in claim 13,
wherein the optical device is configured to accept an optical signal from the optical fiber to the first waveguide, to the second waveguide, and to the photonic integrated circuit, or
wherein the optical device is configured to transmit an optical signal from the photonic integrated circuit to the second waveguide and to the optical fiber through the first waveguide.

15. An optical device comprises
a first waveguide,
　　wherein the first waveguide has a first thickness comparable with a thickness of an optical fiber core and configured for directly coupling with the optical fiber;
a second waveguide,
　　wherein the second waveguide is disposed adjacent to the first waveguide along a length of the first waveguide,
　　wherein the second waveguide comprises a first portion, wherein the first portion has a second thickness configured so that the first portion is weakly coupled to the first waveguide for signal propagation with the first waveguide,
　　wherein the second waveguide comprises a second portion, wherein the second portion has a third thickness configured so that the second portion is decoupled from the first waveguide,
　　wherein the second thickness and the third thickness are smaller than the first thickness,
　　wherein the first portion comprises a horizontal tapered section between a width comparable with the thickness of the optical fiber core and a width of the second portion.

16. An optical device as in claim 15,
wherein a layer is disposed between the first and second waveguides,
wherein the layer comprises an index of refraction higher than the index of refraction of the first waveguide.

17. An optical device as in claim 15,
wherein the second waveguide has an index of refraction greater than an index of refraction of the first waveguide.

18. An optical device as in claim 15,
wherein the first portion comprises an adiabatic transition section having a tapered thickness from the second thickness to the third thickness.

19. An optical device as in claim 15,
wherein the first waveguide comprises a repeated stack of two or more SiON layers, wherein the two or more layers comprise at least two layers having different indexes of refraction.

20. An optical device as in claim 15,
wherein the second waveguide comprises an array waveguide, a grating, a filter, a blocker, a prism, a combiner, a multiplexer, a de-multiplexer, a splitter, an echelle grating, or a combination thereof.

* * * * *